US012131133B2

(12) United States Patent
Iwasaki

(10) Patent No.: US 12,131,133 B2
(45) Date of Patent: Oct. 29, 2024

(54) INFORMATION PROCESSING DEVICE SUPPORTING SOLVING PROBLEMS USING QUANTUM-RELATED COMPUTERS AND INFORMATION PROCESSING SYSTEM

(71) Applicants: KABUSHIKI KAISHA TOSHIBA, Tokyo (JP); TOSHIBA DIGITAL SOLUTIONS CORPORATION, Kawasaki (JP)

(72) Inventor: Motokazu Iwasaki, Chiba Chiba (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 78 days.

(21) Appl. No.: 17/553,774

(22) Filed: Dec. 16, 2021

(65) Prior Publication Data
US 2022/0107786 A1 Apr. 7, 2022

Related U.S. Application Data

(63) Continuation of application No. PCT/JP2020/022931, filed on Jun. 10, 2020.

(30) Foreign Application Priority Data

Jun. 17, 2019 (JP) .................................. 2019-112311

(51) Int. Cl.
*G06F 8/20* (2018.01)
*G01C 21/26* (2006.01)
(Continued)

(52) U.S. Cl.
CPC .............. *G06F 8/20* (2013.01); *G01C 21/26* (2013.01); *G06F 16/258* (2019.01); *G06Q 40/06* (2013.01)

(58) Field of Classification Search
CPC .......... G06F 8/20; G06F 16/258; G06Q 40/06
(Continued)

(56) References Cited

U.S. PATENT DOCUMENTS 7,823,121 B1 * 10/2010 Zarrinkoub ............... G06F 8/34
717/109
8,698,799 B2 * 4/2014 Miller ..................... G06T 15/40
345/422

(Continued)

FOREIGN PATENT DOCUMENTS

CA 3 017 275 A1 9/2017
JP 2016-51350 A 4/2016
(Continued)

OTHER PUBLICATIONS

Svore et al, "A Layered Software Architecture for Quantum Computing Design Tools", IEEE, pp. 74-83 (Year: 2006).*
(Continued)

*Primary Examiner* — Anil Khatri
(74) *Attorney, Agent, or Firm* — Finnegan, Henderson, Farabow, Garrett & Dunner, LLP

(57) ABSTRACT

An information processing device as an embodiment of the present invention is an information processing device that supports obtaining a solution to a problem using a quantum-related computer, and includes: a development unit that executes a modeling tool, which enables a user to describe at least one problem model for a first problem, and a programming tool which enables the user to design a conversion program for converting the first problem into a data format that can be input to the quantum-related computer using the at least one problem model; and a conversion unit that executes the conversion program for an input second problem and converts the second problem into the data format.

31 Claims, 31 Drawing Sheets

(51) Int. Cl.
  *G06F 16/25* (2019.01)
  *G06Q 40/06* (2012.01)
(58) Field of Classification Search
  USPC ................................................. 717/104–121
  See application file for complete search history.

(56) References Cited

U.S. PATENT DOCUMENTS

| | | | | |
|---|---|---|---|---|
| 9,098,292 | B1* | 8/2015 | Zhang | G06F 8/35 |
| 9,268,670 | B1* | 2/2016 | Lachwani | G06F 11/3684 |
| 9,411,559 | B2* | 8/2016 | Avadhanula | G06F 8/34 |
| 9,804,827 | B2 | 10/2017 | Hayashi et al. | |
| 9,870,277 | B2* | 1/2018 | Berkley | G06F 11/0724 |
| 10,282,674 | B2* | 5/2019 | Adachi | G06N 5/01 |
| 10,713,582 | B2 | 7/2020 | Dadashikelayeh | |
| 10,826,845 | B2* | 11/2020 | Dadashikelayeh ... | G06F 9/5083 |
| 10,846,448 | B1* | 11/2020 | Pikus | G06N 10/00 |
| 11,431,660 | B1* | 8/2022 | Leeds | G10L 15/22 |
| 11,502,995 | B2* | 11/2022 | Adam | H04L 63/20 |
| 11,537,381 | B2* | 12/2022 | Gambetta | G06F 8/65 |
| 11,697,641 | B2* | 7/2023 | Baeuchle | C07D 251/20 |
| | | | | 544/217 |
| 2018/0091440 | A1* | 3/2018 | Dadashikelayeh | H04L 63/20 |
| 2019/0026645 | A1* | 1/2019 | Correll | G05B 23/0278 |
| 2019/0164418 | A1 | 5/2019 | Neukart et al. | |

FOREIGN PATENT DOCUMENTS

| | | |
|---|---|---|
| JP | 2016-103282 A | 6/2016 |
| JP | 2019-513276 A | 5/2019 |

OTHER PUBLICATIONS

McCaskey et al, "Hybrid Programming for Near-term Quantum Computing Systems", IEEE, pp. 1-12 (Year: 2018).*

Wille et al, "IBM's Qiskit Tool Chain: Working with and Developing for Real Quantum Computers", IEEE, pp. 1234-1240 (Year: 2019).*

Perdomo-Ortiz et al, "Opportunities and challenges for quantum-assisted machine learning in near-term quantum computers", Quantum Sci. Technol. pp. 1-14 (Year: 2018).*

Rajpoot et al, "Study and Implementation of Quantum AI Algorithms and Comparison with Classical AI Algorithms", IEEE, pp. 124-129 (Year: 2023).*

Miranskyy, "Using Quantum Computers to Speed Up Dynamic Testing of Software", ACM, pp. 26-31 (Year: 2022).*

IT Architect Strongest Guidebook, Chapter 5, Part 2, pp. 104-109 (Nikkei Bus. Publications, 2016).

* cited by examiner

EXAMPLE OF PROBLEM LEVEL STRUCTURE: FINANCIAL PORTFOLIO OPTIMIZATION

IT IS DESIRED TO DETERMINE PORTFOLIO OF PASSIVE FUND SATISFYING PREDETERMINED CONSTRAINT. PORTFOLIO IS DESIRABLY LINKED TO TOKYO STOCK PRICE INDEX (TOPIX).

⇩

IT IS DESIRED TO DETERMINE STOCK AND NUMBER OF SHARES TO MINIMIZE TRACKING ERROR BENCHMARKING TOPIX IN ORDER TO MINIMIZE RISK.

} 60 THIS IS REAL PROBLEM 80 AND IS ALSO COMBINATORIAL OPTIMIZATION PROBLEM (LEVEL-2 PROBLEM MODEL 32c IN FIG. 2)

NOTE: STOCK PRICE DATA FOR PAST N YEARS RELATED TO PLURALITY OF STOCKS IS USED AS INPUT DATA 101

⇩

CONVERT COMBINATORIAL OPTIMIZATION PROBLEM (PROBLEM 60) INCLUDING CONSTRAINT CONDITION INTO HAMILTONIAN HAVING BINARY VARIABLE AS PARAMETER } PROCESS OF EXECUTING L2 CONVERSION PROGRAM 32a

⇩

INTERACTION COEFFICIENT $J_{ij}$ AND LOCAL MAGNETIC FIELD $h_i$ } LEVEL-3 PROBLEM MODEL 33c

⇩

PERFORM CONVERSION INTO INPUT DATA WITH RESPECT TO ISING MACHINE } PROCESS OF EXECUTING L3 CONVERSION PROGRAM 33a

⇩ INPUT

PERFORM CALCULATION WITH ISING MACHINE

FIG. 3

EXAMPLE OF REAL PROBLEM: FINANCIAL PORTFOLIO OPTIMIZATION

EXAMPLE OF INPUT DATA: STOCK PRICE DATA FOR PAST N YEARS RELATED TO PLURALITY OF STOCKS

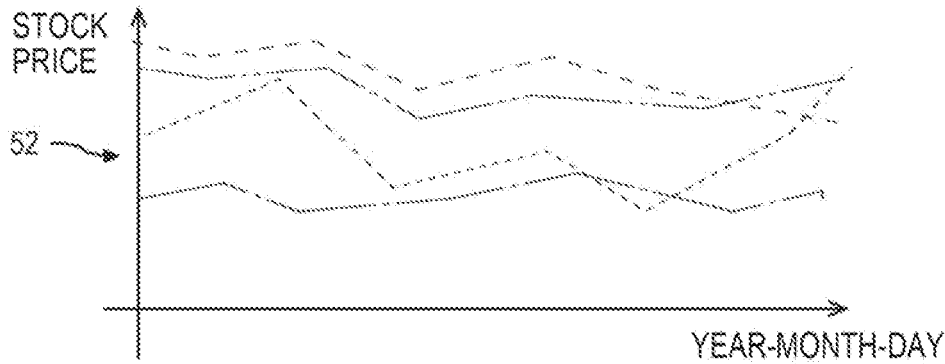

PROBLEM MAY INCLUDE VARIOUS CONSTRAINT CONDITIONS

EXAMPLE OF SOLUTION TO REAL PROBLEM:

○ $x_i$ THAT SATISFIES PORTFOLIO FOR MINIMIZING RISK OF min $f_1(x_i)$
○ $x_i$ THAT SATISFIES PORTFOLIO FOR MAXIMIZING RETURN OF max $f_2(x_i)$ HERE, $x_i = \{x_1, x_2, x_3, ..., x_n\}$ $f_1(x_i)$ AND $f_2(x_i)$ CORRESPOND TO OBJECTIVE FUNCTION OF COMBINATORIAL OPTIMIZATION PROBLEM EXAMPLE OF $f_1(x_i)$ IS CALCULATION FORMULA (TE FORMULA) OF TRACKING ERROR

| STOCK i | QUANTITY $x_i$ |
|---|---|
| i=1 | $x_1$ |
| i=2 | $x_2$ |
| i=3 | $x_3$ |
| i=4 | $x_4$ |
| i=5 | $x_5$ |
| : | : |

QUANTITY MAY BE NUMBER OF SHARES OR MAY BE RATIO RELATIVE TO TOTAL OF 1 (100%)

FIG. 4

EXAMPLE OF LOW-LEVEL MODEL: ISING MODEL

$$H = -\sum_{<i,j>} \mathbf{J}_{ij} s_i s_j - \sum_{i=1}^{N} \mathbf{h}_i s_i$$

| $h_1$ | 0.1 |
|---|---|
| $h_2$ | 0.0 |
| $h_3$ | 0.2 |
| ⋮ | ⋮ |
| $h_m$ | 0.0 |

EXAMPLE OF LOCAL
MAGNETIC FIELD $h_i$

|  | $s_1$ | $s_2$ | $s_3$ | ... | $s_m$ |
|---|---|---|---|---|---|
| $s_1$ |  | 0.2 | 0.1 | ... | 0.0 |
| $s_2$ | 0.2 |  | 0.2 | ... | 0.0 |
| $s_3$ | 0.1 | 0.2 |  | ... | 0.0 |
| ⋮ | ⋮ | ⋮ | ⋮ |  | 0.0 |
| $s_m$ | 0.0 | 0.0 | 0.0 | 0.0 |  |

EXAMPLE OF INTERACTION
COEFFICIENT $J_{ij}$

FIG. 5

EXAMPLE OF MIDDLE-LEVEL MODEL: DIRECTED GRAPH

EXAMPLE OF NUMERICAL EXPRESSION OF DIRECTED GRAPH

EXAMPLE OF L1 PROGRAM TABLE

| ID | FIRST CLASSIFICATION | SECOND CLASSIFICATION | THIRD CLASSIFICATION | OPTIMIZATION PROBLEM | FILE NAME |
|---|---|---|---|---|---|
| L2001 | FINANCE | PORTFOLIO OPTIMIZATION | RETURN MAXIMIZATION | HAMILTONIAN PATH PROBLEM | ... |
| L2002 | FINANCE | PORTFOLIO OPTIMIZATION | TE MINIMIZATION | HAMILTONIAN PATH PROBLEM | ... |
| L2003 | FINANCE | PORTFOLIO OPTIMIZATION | RETURN MAXIMIZATION | SAT | ... |
| L2004 | FINANCE | PORTFOLIO OPTIMIZATION | TE MINIMIZATION | SAT | ... |
| ... | ... | ... | ... | ... | ... |

EXAMPLE OF L2 PROGRAM TABLE

FIG. 13

| ID | OPTIMIZATION PROBLEM | DEDICATED COMPUTER | FILE NAME |
|---|---|---|---|
| L3001 | HAMILTONIAN PATH PROBLEM | QUANTUM ANNEALING MACHINE | |
| L3002 | HAMILTONIAN PATH PROBLEM | HW ISING MODEL EMULATOR | ... |
| L3003 | HAMILTONIAN PATH PROBLEM | SW ISING MODEL EMULATOR | ... |
| L3004 | HAMILTONIAN PATH PROBLEM | GATE QUANTUM COMPUTER | ... |
| L3005 | SAT | QUANTUM ANNEALING MACHINE | ... |
| L3006 | TSP | ISING MODEL EMULATOR | ... |
| ... | | | |

EXAMPLE OF L3 PROGRAM TABLE

FIG. 14

INFORMATION PROCESSING DEVICE SUPPORTING SOLVING PROBLEMS USING QUANTUM-RELATED COMPUTERS AND INFORMATION PROCESSING SYSTEM

CROSS REFERENCE TO RELATED APPLICATION

This application is continuation application of International Application No. JP2020/022931, filed on Jun. 10, 2020, which claims priority to Japanese Patent Application No. 2019-112311, filed on Jun. 17, 2019, the entire contents of which are incorporated herein by reference.

FIELD

Embodiments of the present invention relate to an information processing device and an information processing system.

BACKGROUND

In recent years, development of various computers using quantum mechanical phenomena has been advanced. Examples of such a computer include a gate quantum computer, an Ising machine, and the like. As the Ising machine, for example, a computer using quantum annealing phenomena, a computer using an optical parametric oscillator, and the like are known. In addition, a computer (referred to as a quantum phenomenon emulator), which emulates quantum mechanical phenomena by a Neumann computer, a hardware circuit such as an FPGA, a program, or a combination thereof, has also been developed. In the future, a new type of quantum computer or a new type of quantum phenomenon emulator is likely to be realized. Both the quantum computer and the quantum phenomenon emulator have a feature of a computer that utilizes quantum mechanical phenomena using some methods. In the present specification, a computer having such a characteristic, a combination of computers having such a characteristic, or a combination of a computer having such a characteristic and a computer (non-quantum computer) not having such a characteristic is referred to as a "quantum-related computer".

In addition, development of a computer (PUBO solver) that solves polynomial unconstrained binary optimization has also been advanced. Both the quantum-related computer and the non-quantum computer have been proposed as the PUBO solver.

Some real-world, such as social, industrial, political, and business, problems are difficult to solve within a practical time with classical computers. For example, it is known that such a problem exists in real problems of a type that can be described as a combinatorial optimization problem. Therefore, research and development for solving real problems, which have been difficult to handle so far, within a practical time using a quantum-related computer or a PUBO solver have been advanced.

However, the complexity of the real world has hindered the application of the quantum-related computer or PUBO solver to solving the real problems. For example, expertise or experience is required in order to accurately define and describe a problem. In addition, systems in the real world are mutually dependent and affected. There has been a demand for reflection of the dependence relationship and influence relationship between systems in program development and service provision.

BRIEF DESCRIPTION OF DRAWINGS

FIG. 3 is a diagram illustrating a first example of a level structure of a problem.

FIG. 4 is a diagram illustrating an example of a real problem.

FIG. 5 is a diagram illustrating an example of a low-level model.

FIG. 13 is a diagram illustrating an example of an L2 program table.

FIG. 14 is a diagram illustrating an example of an L3 program table.

DETAILED DESCRIPTION

Figure 1:
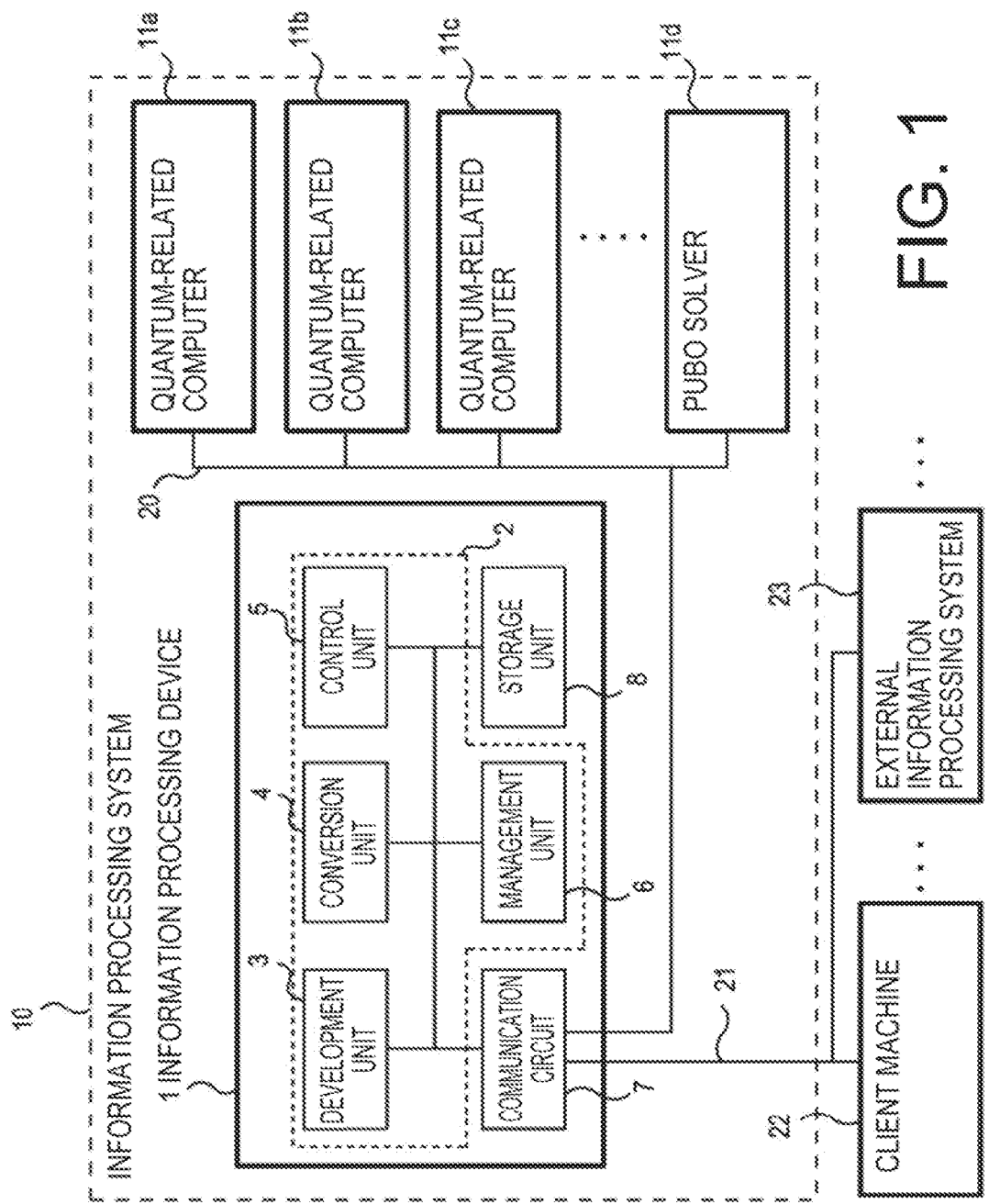
FIG. 1 is a block diagram illustrating a configuration example of a system according to a first embodiment.

According to one embodiment, an information processing device is an information processing device that supports obtaining a solution to a problem using a quantum-related computer, and includes: a development unit that executes a modeling tool, which enables a user to describe at least one problem model for a first problem, and a programming tool which enables the user to design a conversion program for converting the first problem into a data format that can be input to the quantum-related computer using the at least one problem model; and a conversion unit that executes the conversion program for an input second problem and converts the second problem into the data format.

Hereinafter, embodiments of the present invention will be described with reference to the drawings. In addition, the same components will be denoted by the same reference signs, and a description thereof will be omitted as appropriate.

First Embodiment

An information processing system according to a first embodiment to be described hereinafter supports solving a real problem that can be described as, for example, a combinatorial optimization problem using a quantum-related computer. However, this application is merely an example for the description, and has no intention to limit an application scope of the information processing system to the case of solving the real problem that can be described as the combinatorial optimization problem.

In order to solve the real problem using the quantum-related computer, it is necessary to convert the real problem into a problem model or data in a predetermined format that can be processed by the quantum-related computer. There may be a case where significant variation or simplification of the problem is required based on expertise and experience. For example, in a case where data is input to the quantum-related computer in a format of an Ising model, the problem is converted into a quadratic expression where a parameter is a binary variable. Patent Literature 1 discloses an information processing system that converts a problem specified by a user into an Ising model and causes an arithmetic device to search for the Ising model.

However, many of real problems involve the real-world complexity. In order to accurately define and describe a real problem, expertise or practical experience in a field of the real world where the problem exists is required. For example, in order to define and describe a real problem of optimization of a certain financial portfolio, the financial portfolio and expertise related thereto or practical experience of portfolio design are required. On the other hand, in order to create a problem model or data in a format that can be solved by a quantum-related computer, expertise or practical experience regarding the quantum-related computer and a mathematical field related thereto (for example, a combinatorial optimization problem) is required. Therefore, in order to develop a computer program that converts a real problem into a problem model or data in the format that can be solved by the quantum-related computer or a computer program that automatically performs such conversion, it is necessary to integrate expertise or experience in a plurality of related fields. This is work that is difficult and requires a lot of man-hours for an interested party.

In addition, it is required to use different input/output formats of data depending on types of quantum-related computers in some cases. For example, pieces of data in different formats are likely to be input between a computer using a quantum annealing phenomenon and a gate quantum computer. If a conversion program is developed for each type of quantum-related computer, the man-hours increase.

A format of a real problem and a format of a problem model or data that can be input to a quantum-related computer are often greatly divergent from each other. The real problem needs to be converted into the problem model or data that can be input to the quantum-related computer in order to utilize the quantum-related computer. The system according to the present embodiment enables a user to convert a real problem into a problem model or data for a quantum-related computer in stages through describing a series of a plurality of different levels of problem models.

Hereinafter, an example of a plurality of stages in modeling of a problem is illustrated. In the first stage, the user describes, for example, a high-level (Level 1) problem model in which a real problem is expressed in an expression format (for example, a text, a graph, a mathematical formula, or the like) that is easy for a human to understand with support of the system. In the second stage, the user describes a middle-level (Level 2) problem model mathematically and strictly described as a combinatorial optimization problem, for example, based on the high-level problem model with the support of the system. Then, in the third stage, the user describes a low-level (Level 3) problem model or data in a format that can be input to the quantum-related computer based on the middle-level problem model described as the combinatorial optimization problem with the support of the system.

Then, the system inputs data obtained from the low-level problem model to the quantum-related computer, and the quantum-related computer calculates a solution in a predetermined format. Thereafter, with the support of the system, the user inversely converts the low-level solution output from the quantum-related computer into a solution to the real problem in stages. For example, the low-level solution can be inversely converted into a middle-level solution, such as, for example, a solution to the above-described combinatorial optimization problem, and the middle-level solution can be inversely converted into the solution (a high-level solution) of the real problem. In this manner, the user can perform conversion in two directions in stages, that is, the conversion from the high level to the low level of the problem and the inverse conversion from the low level to the high level of the solution to the problem.

The conversion of the problem and the inverse conversion of the solution require participation of a plurality of experts having knowledge in a plurality of related fields, such as a background of the real problem, the combinatorial optimization problem, and the quantum-related computer, and require a lot of man-hours. Fields of the real world related to real problems can be diverse, such as finance, logistics, transportation, and life science. In addition, there is a possibility that a plurality of users utilize quantum-related computers in various forms. The system according to the present embodiment provides a function of performing conversion of a problem (that is, problem modeling) and inverse conversion of a solution in stages. In addition, it is possible to facilitate sharing, collaboration, and the like of conversion work by the plurality of experts and the plurality of users, and to reuse a product of development as a component. As a result, the system according to the present embodiment contributes to promotion of utilization of the quantum-related computer.

In order to further promote the utilization of the quantum-related computer, it is desired to develop programs (a conversion program and an inverse conversion program) that automatically execute the conversion of the problem and the inverse conversion of the solution. With the conversion program and the inverse conversion program, the user is relieved of trouble of manually performing the conversion of the problem and the inverse conversion of the solution. The system according to the present embodiment supports development of the conversion program and the inverse conversion program performed by the user. For example, the system according to the present embodiment enables the user to refer to problem models at different levels. As a result, it is possible for the user to more easily develop a conversion program for creating input data with respect to the quantum-related computer from a desired real problem and an inverse conversion program for converting an output solution of the quantum-related computer into a solution to the desired real problem. In addition, the system according to the present embodiment enables the users to share already developed conversion program and inverse conversion program, and related knowledge (for example, problem models at the respective levels) and know-how obtained in a development process. For example, a conversion/inverse conversion program already developed for a certain real problem can be used by a user who intends to develop a conversion/inverse conversion program for the same or similar real problem. Hereinafter, the system according to the present embodiment having the function of developing and executing the conversion/inverse conversion program will be described in more detail.

The system according to the present embodiment can perform a process of obtaining a solution using the quantum-related computer. The quantum-related computer is a computer that utilizes quantum mechanical phenomena (hereinafter, referred to as quantum phenomena) using some methods such as generated physical phenomena, emulation, and simulation. There are a plurality of types of the quantum-related computers. An example is a computer (referred to as an Ising machine) that obtains a lowest energy state (ground state) of an Ising model. The Ising machine is further classified into a quantum annealing machine using a superconducting quantum bit, a computer using an optical parametric oscillator, a computer that emulates quantum annealing phenomena, and the like.

In addition, the quantum-related computer may be a computer using a hardware circuit such as a gate quantum computer, an FPGA, and a graphics processing unit (GPU). In addition, the quantum-related computer may be a combination of a plurality of computers using quantum phenomena. In addition, the quantum-related computer may be a combination of a computer using quantum phenomena and a computer (non-quantum computer) not using quantum phenomena. For example, a system in which a computer using quantum phenomena and a computer executing a metaheuristic algorithm are combined to complement and enhance a function of the former is also included in the quantum-related computer. Examples of the metaheuristic algorithm include a Simulated Annealing method, a local search method such as taboo search, particle swarm optimization (PSO), a genetic algorithm, and the like. The metaheuristic algorithm may be implemented by a program or may be implemented by a hardware circuit. That is, a system, implementation, and an architecture of the quantum-related computer are not particularly limited.

Note that the system according to the present embodiment may perform a process of obtaining a solution using a computer (PUBO solver) that can solve polynomial unconstrained binary optimization (PUBO). Some of the above-described quantum-related computers (for example, some Ising machines) can solve the polynomial unconstrained binary optimization, and thus, can be also said to be PUBO solvers. However, the PUBO solver may be a computer that does not correspond to the above-described quantum-related computers. The PUBO solver may calculate a value of a binary variable by executing a program on a Neumann computer. In addition, the PUBO solver may be implemented by combining an IMAN-type computer and a hardware circuit such as an FPGA, an ASIC, and a GPU. That is, a configuration of the PUBO solver is not particularly limited.

The system according to the present embodiment can handle a plurality of types of real problems. An example is the real problem that can be converted into a combinatorial optimization problem. There are a plurality of types of the combinatorial optimization problem. Examples thereof include a shortest path problem, a traveling salesman problem, and a Hamiltonian path problem. In the shortest path problem, a path having the smallest total weight among paths between two nodes is obtained in a weighted graph. In the traveling salesman problem (TSP), a path having the smallest total weight is obtained among paths that pass through all nodes only once and return to a node at a start point in a weighted undirected graph. In the Hamiltonian path problem, a path passing through all nodes only once is obtained for an arbitrary graph. In addition, among the Hamiltonian path problems, a problem in which a node at a start point of a path and a node at an end point of the path are the same node is referred to as a Hamiltonian cycle problem. The above problems are merely examples. Therefore, the real problem may be converted into another type of combinatorial optimization problem.

Next, the above-described Ising model will be described. In the Ising model, a function of energy is expressed by a quadratic polynomial of a plurality of variables $s_i$ (i=1, 2, . . .) each having a binary value of either +1 or −1. The following Formula (1) represents a Hamiltonian H which is the function of energy.

[Formula 1]

$$H = -\sum_{\langle i,j \rangle} J_{ij} s_i s_j - \sum_{i=1}^{N} h_i s_i \qquad (1)$$

Here, $J_{ij}$ is a matrix of interaction coefficients between spins. Each of $s_i$ and $s_j$ is a binary variable (spin) and has a value of either +1 or −1. A vector of a local magnetic field at each spin is denoted by $h_i$. The above-described Formula (1) is a quadratic expression for $s_i$ and $s_j$. However, an Ising model including a third-order or higher-order term of spin may be used. It can be said that the Ising model including the third-order or higher-order term of spin physically includes a multi-body interaction.

The Hamiltonian H in Formula (1) corresponds to an objective function in the combinatorial optimization problem. An optimal solution of the Ising model is a combination (vector) of binary variables having the minimum energy. The Ising model has been mainly used as a model of a ferromagnet or a phase transition phenomenon. A parameter of the Ising model is a binary variable, and is easily converted into a discrete variable used in the combinatorial optimization problem. For this reason, in recent years, cases of solving a combinatorial optimization problem by the Ising model have increased. The Ising model corresponds to a data format that can be input to the quantum-related computer. In a case where a quantum-related computer of a type other than the Ising machine is used, an inputtable data format may be a format different from the Ising model.

Hereinafter, a configuration example of the system according to the present embodiment will be described.

FIG. 1 is a diagram illustrating the configuration example of the system according to the present embodiment. The system of FIG. 1 includes an information processing system 10, a client machine 22, and an external information processing system 23. The information processing system 10, the client machine 22, and the external information processing system 23 are connected via a network 21.

The information processing system 10 includes an information processing device 1 and one or more quantum-related computers (In the illustrated example, a plurality of quantum-related computers 11a, 11b, and 11c of the same type or different types). In addition, the information processing system 10 may include a PUBO solver 11d. The information processing device 1, the quantum-related computers 11a to 11c, and the PUBO solver 11d are connected via a network 20. At least any of the quantum-related computers 11a to 11c or the PUBO solver 11d may be installed outside the information processing system 10. In this case, the quantum-related computer or the PUBO solver is connected to the information processing device 1 via the network 21. FIG. 1 illustrates three quantum-related computers and one PUBO solver. However, the number of quantum-related computers and the number of PUBO solvers are not particularly limited. In the description according to the first embodiment, a case of obtaining a solution to a problem using the quantum-related computer will be described as an example. However, in a case where a solution is obtained using the PUBO solver, the quantum-related computer in the following description may be replaced with the PUBO solver.

The information processing device 1 includes a processing circuit 2, a communication circuit 7, and a storage unit 8. Examples of the processing circuit 2 include a processor that executes a program and various commands. However, the processing circuit 2 may be another type of hardware circuit such as an FPGA and an ASIC. In addition, the processing circuit 2 may be a combination of a plurality of types of hardware circuits. The processing circuit 2 includes a development unit 3, a conversion unit 4, a control unit 5, and a management unit 6 as internal constituent elements.

The information processing device 1 supports obtaining a solution to a problem using the quantum-related computer. For this purpose, the information processing device 1 supports development of a program (conversion program) for conversion of a problem and a program (inverse conversion program) for inverse conversion of a solution performed by a user. In a case where a conversion program and an inverse conversion program corresponding to a real problem have already been developed, an outline of processing executed by the information processing device 1 is as follows.

First, the user inputs data of the real problem to the information processing device 1 using the client machine 22. The information processing device 1 executes the developed conversion program using the data of the real problem as an input. Data in a format that can be input to the quantum-related computer is output from the conversion program, and the quantum-related computer obtains a solution based on the data. Then, the inverse conversion program is executed using the solution obtained by the quantum-related computer as an input. The inverse conversion program generates a solution to the real problem input by the user and returns the solution to the client machine 22 of the user.

The user can operate the quantum-related computer using an interface (for example, a GUI, a CLI, or an API) provided by the management unit 6 of the information processing device 1. In addition, the information processing device 1 may provide the user with an interface for performing data sharing, transmission and reception of data, and the like between the external information processing system 23 and the information processing system 10.

Next, an outline of processing executed by the information processing device 1 in a case where it is necessary to develop the conversion program and the inverse conversion program corresponding to a real problem will be described.

First, the information processing device 1 supports the user in creating problem models at a plurality of levels in stages for a desired real problem. Then, the information processing device 1 supports the user in developing the conversion program and the inverse conversion program based on the created problem models at the plurality of levels. Therefore, the development unit 3 of the information processing device 1 supports the stepwise creation of the problem models (problem modeling) and development (programming) of the conversion program and the inverse conversion program described above.

The development unit 3 includes a plurality of modeling tools configured to create the problem models at the plurality of levels, and a programming tool configured to create the conversion program and the inverse conversion program based on the problem models. The development unit 3 stores problem models, a conversion program, and an inverse conversion program obtained in the past development process, and data related to knowledge and know-how attached thereto in the storage unit 8. In addition, the development unit 3 may provide a library to the user so that the above-described data can be used in a subsequent development process. The user can operate an interface provided by the management unit 6 and use the modeling tools, the programming tool, and the library.

That is, the development unit 3 can execute the modeling tools and the programming tool. The modeling tool enables the user to describe at least one problem model for a problem. The programming tool enables the user to design a conversion program that converts a problem into a data format that can be input to the quantum-related computer using at least one problem model. In addition, the programming tool enables the user to create an inverse conversion program for inversely converting a solution of the quantum-related computer calculated for the problem into a solution to the problem.

The conversion program and the inverse conversion program which have been developed by the user and are corresponding to a specific real problem are stored in the storage unit 8. The conversion program and the inverse conversion program stored in the storage unit 8 are deployed in the conversion unit 4 to be in an executable state. When data of a real problem of the same type as the above-described real problem is input from the client machine 22 in this state, the conversion unit 4 uses the data of the real problem as an input and executes the conversion program, and the conversion program converts the data of the real problem into data that can be processed by at least any of the quantum-related computers. The control unit 5 causes at least any of the quantum-related computers to calculate a solution. For example, in a case where the conversion program and the inverse conversion program already stored in the storage unit 8 can be applied to a real problem input by the user, the real problem input by the user and the real problem corresponding to the conversion program and the inverse conversion program can be said to be the same type of real problem. That is, the control unit 5 inputs the problem converted into the data format that can be input to the quantum-related computer to the quantum-related computer, and acquires the solution of the quantum-related computer. The solution of the quantum-related computer stored in the storage unit 8 can be referred to from the conversion unit 4 by the control unit 5.

Then, the conversion unit 4 executes the inverse conversion program using the solution output from the at least one quantum-related computer as an input, and inversely converts the solution of the quantum-related computer into a solution to the real problem input by the user. The conversion unit 4 may return the inversely converted solution to the client machine 22. The client machine 22 can access the conversion unit 4 via the communication circuit 7 and download the solution to the real problem from the information processing device 1. Note that the developed conversion program and inverse conversion program may be exchanged to a system different from the information processing device 1 and executed in the system.

That is, the conversion unit 4 executes the conversion program for a problem input by the user, and converts the problem into a data format in the quantum-related computer. In addition, the conversion unit 4 executes the inverse conversion program using a solution of the quantum-related computer calculated for the problem as an input, and outputs a solution converted by the inverse conversion program as a solution to the problem.

Next, a configuration and a function of the development unit 3 will be described with reference to FIG. 2. In particular, modeling tool 31 to 32 at a plurality of levels, a programming tool 34, a conversion program 41, and an inverse conversion program 42 illustrated in FIG. 2 will be described.

Figure 2:
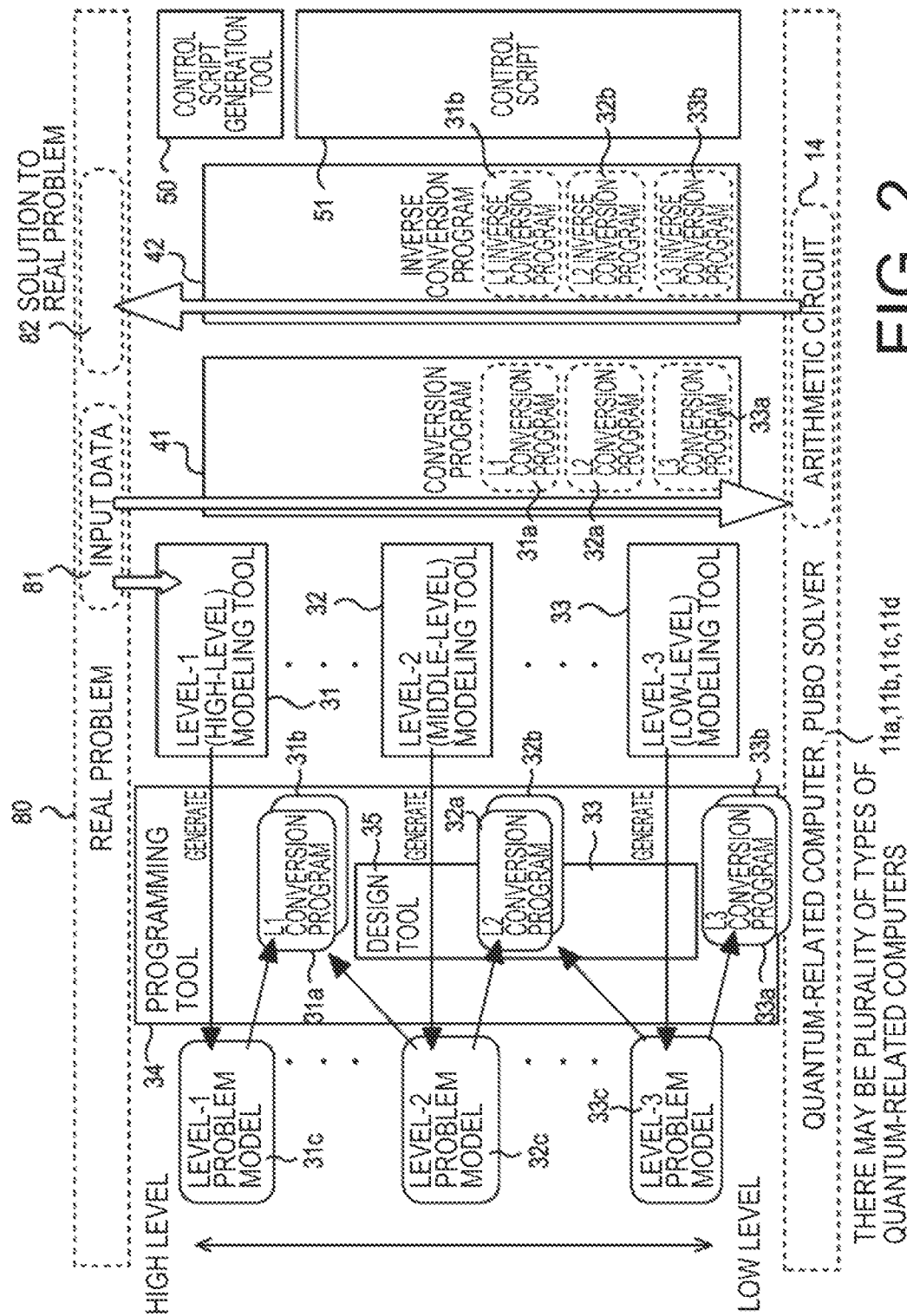
FIG. 2 is a diagram illustrating an example of a modeling tool and a program at each level.

In FIG. 2, the level 1 (high-level) modeling tools 31, the level 2 (middle-level) modeling tools 32, and the level 3 (low-level) modeling tools 33 are illustrated from a high level to a low level. Here, a level closest to a real problem 80 is referred to as the high level, and a level closest to the format executable by the quantum-related computer is referred to as the low level. In addition, a level between the high level and the low level is referred to as a middle level. Therefore, a larger number related to a level is closer to the format that can be input to the quantum-related computer in the example of FIG. 2. Note that the three levels illustrated in FIG. 2 are examples, and there may be modeling tools at two levels (for example, Level 1 and Level 3 in FIG. 2), or there may be modeling tools at more than three levels (for example, a plurality of intermediate levels obtained by further dividing Level 2 in FIG. 2 into finer stages, Level 1, and Level 3).

The modeling tool according to each level supports the user such that a problem model of the corresponding level can be described. The modeling tool according to each level includes templates or samples that may be used by the user to describe a problem model, for example, for each type of problem that is likely to correspond to the level. Then, the modeling tool according to each level can present these templates or samples to the user. The template or sample of each of types of problems includes, for example, a plurality of items constituting a problem model, descriptions of matters to be described in the respective items, description examples (models) thereof, and the like. The template or sample may also be attached with an example of problem models that were created in the past for the same type of problem. As a result, the user can describe the problem models at the respective levels for his/her own problem using a template or a sample of a type suitable for his/her own problem and/or the problem models created in the past.

In addition, each of the modeling tools may be commonly used for a plurality of types of problem groups having similar formats or characteristics, for example. Each of the modeling tools may include a program that automatically performs at least a part of modeling work. A problem type at each level may be defined based on an application field or may be defined based on a mathematical technique to be used. That is, a method of defining the problem type at each level is not particularly limited.

The user can describe a level-1 (highest-level) problem model 31$c$ using the level-1 modeling tool 31. In addition, the user can also describe a level-2 (middle-level) problem model 32$c$ using the level-2 modeling tool 32. Similarly, the user can describe a level-3 (lowest-level) problem model 33$c$ using the level-3 modeling tool 33. An example of the level-1 (highest-level) problem model 31$c$ is a model that describes a real problem using an expression format (for example, a natural language, a graph, a mathematical formula, or a combination thereof) that is relatively easy for the user to understand. An example of the level-3 (lowest-level) problem model 33$c$ is a model that describes a problem using an expression format (for example, the Ising model, that is, a mathematical formula or a coefficient sequence describing the Hamiltonian) suitable for generating data that can be input to a quantum-related computer. Therefore, Level 1 may be referred to as a source level, and Level 3 may be referred to as an object level. An example of the level-2 (middle-level) problem model 32$c$ is a model that describes a problem using an expression format (for example, a mathematical formula, a sequence of numbers, a table, a graph, or a combination thereof for mathematically representing a combinatorial optimization problem) that is convenient for use in an intermediate stage between the level-1 problem modeling and the level-3 problem modeling.

For most users, work is facilitated when adopting a procedure of performing higher-level modeling first and performing lower-level modeling by using a result thereof. In the example of FIG. 2, the user first creates the level-1 problem model 31$c$. Next, the user converts the level-1 problem model 31$c$ into the level-2 problem model 32$c$. Then, the user converts the level-2 problem model 32$c$ into the level-3 problem model 33$c$. In order to support the work based on this modeling procedure, a lower-level modeling tool among the modeling tools 31 to 33 may present the user with a problem model previously created in a higher-level modeling tool.

The programming tool 34 illustrated in FIG. 2 supports the user in developing the conversion program 41 and the inverse conversion program 42 based on the problem models 31$c$ to 33$c$ at the plurality of levels. The programming tool 34 has a function of presenting the user with information on the problem models 31$c$ to 33$c$ at the plurality of levels. In addition, the programming tool 34 also includes a design tool 35 that enables the user to design (code) the conversion program 41 and the inverse conversion program 42. For this reason, the user can develop the conversion program 41 and the inverse conversion program 42 using the design tool 35 while referring to the information on the problem models 31c to 33c at the plurality of levels.

Here, an example of a development environment provided to the user will be described. For example, the programming tool 34 presents the user with information on the level-1 problem model 31c and the level-2 problem model 32c. For this reason, the user can create a sub-conversion program (L1 conversion program) 31a and a sub-inverse conversion program (L1 inverse conversion program) 31b using the design tool 35 while referring to the problem models 31c and 32c. The sub-conversion program (L1 conversion program) 31a converts data representing a real problem into data representing a level-2 problem (for example, a mathematical combinatorial optimization problem). The sub-inverse conversion program (L1 inverse conversion program) 31b inversely converts data representing a solution to the level-2 problem into data representing a solution to the real problem.

In addition, the programming tool 34 presents the user with information on the level-2 problem model 32c and the level-3 problem model 33c. For this reason, the user can create a sub-conversion program (L2 conversion program) 32a and a sub-inverse conversion program (L2 inverse conversion program) 32b using the design tool 35 while referring to the problem models 32c and 33c. The sub-conversion program (L2 conversion program) 32a converts data representing a level-2 problem (for example, the mathematical combinatorial optimization problem) into data representing a level-3 problem (for example, the Ising model, that is, the Hamiltonian). The sub-inverse conversion program (L2 inverse conversion program) 32b inversely converts data representing a solution to the level-3 problem into data representing a solution to the level-2 problem.

In addition, the programming tool 34 presents the user with information on the level-3 problem model 33c and a data format that can be input to or output from the quantum-related computers 11a to 11c. As a result, the user can create a sub-conversion program (L3 conversion program) 33a and a sub-inverse conversion program (L3 inverse conversion program) 33b using the design tool 35 while referring to the problem model 33c and the data format that can be input to and output from the quantum-related computers 11a to 11c. The sub-conversion program (L3 conversion program) 33a converts data representing a level-3 problem (for example, the Hamiltonian of the Ising model) into data that can be input to the quantum-related computers 11a to 11c. The sub-inverse conversion program (L3 inverse conversion program) 33b inversely converts data representing a solution from the quantum-related computers 11a to 11c into data representing a solution to the level-3 problem.

The sub-conversion programs 31a to 33a and the sub-inverse conversion programs 31b to 33b at the plurality of levels created by the user are stored in the storage unit 8. The programming tool 34 integrates the sub-conversion programs 31a to 33a at the plurality of levels to generate the conversion program 41 that converts data of a real problem into the data format that can be input to the quantum-related computers 11a to 11c. In addition, the programming tool 34 integrates the sub-inverse conversion programs 31b to 33b at the plurality of levels to generate the inverse conversion program 42 that converts data of a solution output from the quantum-related computers 11a to 11c into data of a solution to the real problem.

The data format that can be input may vary depending on types of the quantum-related computers. For this reason, when a plurality of types of the quantum-related computers 11a to 11c are used, the user can prepare the L3 conversion program 33a and the L3 inverse conversion program 33b for each of the types of the quantum-related computers.

The programming tool 34 may present the user with information on an inputtable data format for each of the types of the quantum-related computers. In addition, the programming tool 34 may present the user with information on an output data format (data format of a solution) for each of the types of the quantum-related computers. For example, when a specific API needs to be used for execution of calculation by a specific quantum-related computer, the programming tool 34 displays specifications of the API. As a result, the user can code the L3 conversion program 33a while confirming the information on the inputtable data format. For example, the user can use the programming tool 34 to create a function of using data of a model at a higher level as an input and the level-3 problem model 33c as an output. Similarly, the user can code the L3 inverse conversion program 33b while confirming the information on the output data format.

Note that the user does not need to create all of the conversion program 41 (or the sub-conversion programs 31a to 33a at the respective levels) and the inverse conversion program 42 (or the sub-inverse conversion programs 31b to 33b at the respective levels) from the beginning as will be described later. For example, in a case where the conversion program 41 (or the sub-conversion programs 31a to 33a at the respective levels) and the inverse conversion program 42 (or the sub-inverse conversion programs 31b to 33b at the respective levels) that have been already generated are stored in the storage unit 8, the user may generate a necessary program by directly using the created programs, changing some of them, or combining them.

The conversion program 41 only needs to be capable of converting the data of the real problem into the data format that can be input to the quantum-related computer. The conversion program 41 does not necessarily include the sub-conversion programs 31a to 33a at the plurality of levels as in the above-described example. Similarly, the inverse conversion program 42 does not necessarily include the sub-inverse conversion programs 31b to 33b at the plurality of levels as in the above-described example. Therefore, the user may develop the conversion program 41 that directly converts the data of the real problem into the data format that can be input to the quantum-related computer using the programming tool 34 without passing through an intermediate level. In addition, the user may develop the inverse conversion program 42 that directly converts the data of the solution output from the quantum-related computer into the data of the solution to the real problem using the programming tool 34 without passing through an intermediate level. In addition, the user may use the programming tool 34 to develop sub-conversion programs at a larger number of (for example, four or more) levels than those in the above-described example, and integrate the sub-conversion programs to obtain the conversion program 41. In addition, sub-inverse conversion programs at a larger number of (for example, four or more) levels than those in the above-described example may be developed and integrated to obtain the inverse conversion program 42.

In this manner, the user can describe problem models at an arbitrary number of levels for each real problem, and generate an arbitrary number of sub-conversion programs and sub-inverse conversion programs. Then, the sub-conversion programs and the sub-inverse conversion programs can be integrated into the conversion program 41 and the inverse conversion program 42, respectively. For example, in a case where the user can directly convert the real problem into the data format executable by the quantum-related computer at one time, the user may immediately create the conversion program 41 and the inverse conversion program 42 without creating any sub-conversion program and any sub-inverse conversion program. In addition, in a case where there is an advantage for the user in performing two-stage conversion from the real problem to generate the data format executable by the quantum-related computer, the user may generate sub-conversion programs at two levels and the sub-inverse conversion programs at two levels, and integrate them into the conversion program 41 and the inverse conversion program 42, respectively. As will be described later, the number of necessary conversion stages can be determined by the user in accordance with circumstances such as a type, a content, and complexity of the real problem.

FIG. 2 illustrates a case (model case) where a data format executable by the quantum-related computer is generated when three-stage conversion is performed from a real problem. Hereinafter, work of problem modeling and programming at each level performed by the user will be described with this model case as an example. However, the number of levels (3) of the model case and processing performed at each level to be described hereinafter are merely examples. As described above, the number of levels may be less or more than that in the model case.

The user can use the level-1 modeling tool 31 to describe the level-1 (high-level) problem model 31c. For example, if there is a commonly used theoretical formula for the real problem 80, the theoretical formula may be used as the level-1 (high-level) problem model 31c. A model obtained by modeling the real problem 80 as a quadratic programming problem may be used as the level-1 (high-level) problem model 31c.

The user can also describe the level-2 (middle-level) problem model 32c using the level-2 modeling tool 32. As the level-2 problem model 32c, for example, a model mathematically describing a certain type of combinatorial optimization problem can be used. Examples of the combinatorial optimization problem include a shortest path problem, a traveling salesman problem, and a Hamiltonian path problem. Of course, another type of problem model may be used as the level-2 problem model 32c. In addition, the level-2 modeling tool 32 may have a function of dividing and describing one combinatorial optimization problem into a plurality of sub-models. When the level-2 problem model 32c is the combinatorial optimization problem, the level-2 problem model 32c may include data of a graph (graph data) including nodes and edges. The graph may be a directed graph or an undirected graph. The user may use a graph library (quantum-related library) to define the graph data and access the graph data. The graph library may include, for example, a function of outputting a list of the nodes, the number of the nodes, a list of the edges, the number of the edges, and information on a node connected with an edge. In addition, the graph library may include a function of performing adding a node to the graph, deleting a node from the graph, adding an edge between nodes, deleting an edge from between nodes, selecting an edge serving as a path, and excluding an edge from a path. Note that the graph library may be used by a modeling tool at a level other than Level 2 (the middle level).

The user can use the programming tool 34 to program the L1 (level-1) conversion program 31a based on the level 1 (high-level) problem model 31c and the level 2 (middle-level) problem model 32c. A processing content of the L1 conversion program 31a is not particularly limited. For example, the L1 conversion program 31a may convert data (for example, input data 81 input from the client machine 22) of the real problem 80 (the level-1 problem model 31c) into data of the level-2 problem model 32c. For example, the L1 conversion program 31a may convert the input data 81 into a certain objective function. For example, the L1 conversion program 31a may perform regression on the input data 81 to generate a certain regression equation. In this case, the regression equation corresponds to the objective function. Examples of a regression technique include linear regression, logistic regression, and regression with a regularization term.

When there is a constraint condition on the real problem 80, the user may use the level-1 modeling tool 31 to incorporate the constraint condition into the level 1 (high-level) problem model 31c. Then, the user can incorporate a process of determining the constraint condition into the L1 conversion program 31a using the programming tool 34.

The user can use the programming tool 34 to code the L1 (level-1) inverse conversion program 31b based on the level 1 (high-level) problem model 31c and the level 2 (middle-level) problem model 32c. In addition, the user may program the L1 (level-1) inverse conversion program 31b based on the L1 (level-1) conversion program 31a. A processing content of the L1 inverse conversion program 31b is not particularly limited. For example, the L1 inverse conversion program 31b may convert a solution of the level 2 (middle-level) model 32c into a solution 82 to the real problem (a solution of the level-1 problem model 31c). Examples of the solution 82 to the real problem are a reconstructed DNA sequence and a financial portfolio that minimizes the risk.

At least a part of the conversion process executed by the L1 inverse conversion program 31b may be an inverse process of at least a part of the conversion process executed by the L1 conversion program 31a. For this reason, the programming tool 34 may have a function of automatically generating a code for executing the inverse process of the L1 conversion program 31a during coding of the L1 conversion program. In this case, the user can reduce trouble of coding the L1 inverse conversion program 31b by utilizing the automatically generated code.

Each user does not need to newly generate the L1 conversion program 31a and the L1 inverse conversion program 31b from the beginning as will be described later. For example, in a case where generated conversion programs or inverse conversion programs are stored in the storage unit 8, the user may create a necessary program by editing a part of the created conversion program or inverse conversion program or combining the created conversion programs or inverse conversion programs. In addition, the user may use a part of the existing conversion program or inverse conversion program. Note that levels of the existing conversion program and inverse conversion program used by the user in such cases are not particularly limited.

In addition, the user can also use the level-3 modeling tool 33 to describe the level-3 (low-level) problem model 33c.

The user can use the programming tool 34 to code the L2 (level-2) conversion program 32a based on the level-2 problem model 32c and the level-3 problem model 33c. A processing content of the L2 conversion program 32a is not particularly limited. For example, the L2 conversion program 32a may convert data of the level-2 problem model (middle-level model) 32c into data of the level-3 problem model 33c.

The programming tool 34 may provide a library (support library) that supports development of the L2 conversion program 32a performed by the user. An example of the support library is a library that discretizes variables. As a result, each user can create a program that converts a continuous variable optimization problem into a discrete variable combinatorial optimization problem. In addition, the support library may provide a function of suppressing the scale of a combinatorial optimization problem. For example, the support library may provide a function of performing dimension reduction using a technique such as principal component analysis (PCA) or multi-dimensional scaling (MDS). A technique for the dimension reduction implemented in the support library is not particularly limited.

The support library may provide a function of dividing one combinatorial optimization problem into a plurality of problems. For example, a combinatorial optimization problem can be divided by fixing some variables, but a technique for the division is not particularly limited. Further, the support library may provide a function of deleting some of constraint conditions of a combinatorial optimization problem and alleviating the problem. The support library may be a library common to the above-described graph library, or may be a library that uses the functions of the above-described graph library by function call or the like. Note that the support library may be used by a modeling tool at a level other than Level 2 (the middle level).

The user can use the programming tool 34 to code the L2 (level-2) inverse conversion program 32b based on the level-2 problem model 32c and the level-3 problem model 33c. In addition, the user may program the L2 (level-2) inverse conversion program 32b based on the L2 (level-2) conversion program 32a. A processing content of the L2 inverse conversion program 32b is not particularly limited. For example, the L2 inverse conversion program 32b may convert data of a solution of the level-3 problem model 33c into data of a solution of the level-2 problem model 32c.

At least a part of the conversion process executed by the L2 inverse conversion program 32b may be an inverse process of at least a part of the conversion process executed by the L2 conversion program 32a. For this reason, the programming tool 34 may have a function of automatically generating a code for executing the inverse process of the L2 conversion program 32a during coding of the L2 conversion program. The user can reduce the trouble of coding the L2 inverse conversion program 32b by utilizing the automatically generated code.

Each user does not need to newly generate the L2 conversion program 32a and the L2 inverse conversion program 32b from the beginning as will be described later. For example, in a case where generated conversion programs or inverse conversion programs are stored in the storage unit 8, the user may generate a necessary program by editing a part of the generated conversion program or inverse conversion program or combining the generated conversion programs or inverse conversion programs. In addition, the user may use a part of the existing conversion program or inverse conversion program. Note that levels of the existing conversion program and inverse conversion program used by the user in such cases are not particularly limited.

In addition, the user can use the programming tool 34 to code the L3 (level-3) conversion program 33a based on the level-3 problem model 33c and information on a data format that can be input to the quantum-related computer. A processing content of the L3 conversion program 33a is not particularly limited. For example, the L3 conversion program 33a may convert data of the level-3 problem model (low-level model) 33c into data in the format that can be input to the quantum-related computer.

The user can use the programming tool 34 to code the L3 (level-3) inverse conversion program 33b based on the level-3 problem model 33c and information on a data format output from the quantum-related computer. In addition, the user may code the L3 (level-3) inverse conversion program 33b based on the L3 (level-3) conversion program 33a. A processing content of the L3 inverse conversion program 33b is not particularly limited. For example, the L3 inverse conversion program 33b may convert data of a solution output from the quantum computer into data of a solution of the level-3 problem model 33c.

At least a part of the conversion process executed by the L3 inverse conversion program 33b may be an inverse process of at least a part of the conversion process executed by the L3 conversion program 33a. For this reason, the programming tool 34 may have a function of automatically generating a code for executing the inverse process during coding of the L3 conversion program 33a. The user can reduce the trouble of coding the L3 inverse conversion program 33b by utilizing the automatically generated code.

The level-1 modeling tool 31, the level-2 modeling tool 32, and the level-3 modeling tool 33 store the created problem models in the storage unit 8. The programming tool 34 stores the created conversion program and inverse conversion program in the storage unit 8. Formats of the conversion program and the inverse conversion program are not particularly limited. For example, when the programming tool 34 has a function as a compiler, the programming tool 34 may generate a program in a binary format executable by a processor. Alternatively, the programming tool 34 may generate a file in an intermediate format before being binary. The programming tool 34 may generate a source code of a script language. The formats of the conversion and inverse conversion programs at the respective levels may be the same or different. A programming language used in the programming tool 34 is not particularly limited.

It is possible to generate a program (conversion program 41), which converts the data of the real problem 80 (input data 81) into the data in the format that can be input to the quantum-related computer, by combining the conversion programs at the respective levels. Similarly, it is possible to generate a program (the inverse conversion program 42), which converts the solution output from the quantum-related computer into the solution 82 to the real problem, by combining the inverse conversion programs at the respective levels.

Note that the case of creating the conversion program (inverse conversion program) based on the problem models at the two levels has been described in the example of FIG. 2. For example, in the case of the conversion program, a higher-level problem model corresponds to input data of the conversion program, and a lower-order problem model corresponds to output data of the conversion program. However, the above-described correspondence relationship is not necessarily satisfied. For example, a conversion program (inverse conversion program) may include a conversion process across problem models at three or more levels. For example, the user may use data corresponding to the level 1 (high-level) model 31c as an input and create a conversion program corresponding to the level 3 (low-level) model 33c.

Heretofore, the model case of FIG. 2 has been described on the assumption that the data format that can be input to the quantum-related computer is obtained if the conversion is performed three times from the real problem. Next, an example of conversion of a problem performed at the time of application to each field will be described.

FIG. 3 illustrates an example of a level structure of a problem in a case where the system according to the present embodiment is applied to optimize a financial portfolio.

For example, it is assumed that a user desires to determine an optimal portfolio of a passive fund satisfying a predetermined constraint condition. Examples of the constraint condition include a lower limit of the number of stocks that needs to be held, an upper limit of the number of stocks that can be held, an upper limit of the number of shares that can be held for each stock, and a lower limit of the number of shares that needs to be held for each stock. In addition, a constraint condition for grouping a plurality of stocks and selecting stocks of a portfolio at predetermined ratios from a plurality of groups may be set. Here, a method for the grouping is not particularly limited. In addition, the user desires to link the portfolio to the Tokyo stock price index (TOPIX) to minimize the risk of investment.

In order to achieve the above object, the user desires to benchmark TOPIX and determine stocks to be incorporated into a fund and the number of shares for each of the stocks such that a tracking error of the fund is minimized (a problem 60). The problem 60 corresponds to the real problem 80 in FIG. 2. In this case, it is necessary to determine stocks i that minimize the tracking error and the number of shares $x_i$ for each of the stocks using a calculation formula of the tracking error as an objective function $f_1(x_i)$. This problem 60 can be modeled as a combinatorial optimization problem from the beginning. When the real problem 80 can be modeled as the combinatorial optimization problem (for example, the level-2 problem model) from the beginning in this manner, a program (for example, the L1 conversion program 31a) that converts the real problem 80 into the combinatorial optimization problem is unnecessary. Similarly, a program (the L1 inverse conversion program 31b) that performs the corresponding inverse conversion is also unnecessary.

Note that the tracking error can be calculated using stock price data for the past N years related to a plurality of stocks as the input data 81 in the problem 60. A graph 52 of FIG. 4 illustrates an example of the stock price data for the past N years related to the plurality of stocks.

The user needs to convert the problem 60 into a data format that can be input to a quantum-related computer in order to solve the above-described problem 60 using the quantum-related computer. For example, in a case where the quantum-related computer is an Ising machine, the user may develop a program for converting the input data of the problem 60 (for example, the level-2 problem model 32c) (reference sign 81 in FIG. 2) into Formula (1) (for example, the level-3 problem model 33c) representing the Ising model having the binary variable as the parameter. This conversion program corresponds to the L2 conversion program 32a of FIG. 2. The user uses the level-3 modeling tool 33 to describe Formula (1) (the level-3 problem model 33c) of the Ising model corresponding to the problem 60 in order to develop the L2 conversion program 32a. Then, the user can use the programming tool 34 to develop the L2 conversion program 32a while referring to the combinatorial optimization problem (the level-2 problem model 32c) and Formula (1) of the Ising model (the level-3 problem model 33c). The interaction coefficient $J_{ij}$ and the local magnetic field $h_i$ in Formula (1) are obtained by the L2 conversion program 32a. The interaction coefficient $J_{ij}$ and the local magnetic field $h_i$ correspond to the level-3 problem model 33c in FIG. 2. Further, the user may develop a program for converting the level-3 problem model 33c into data in a format that can be input to the quantum-related computer. This conversion program corresponds to the L3 conversion program 33a of FIG. 2.

The user can reflect the constraint condition in the modeling of the problem 60. For example, the constraint condition may be reflected by adding a correction term to the calculation formula of the tracking error that is the objective function $f_1(x_i)$. In addition, correction in accordance with the constraint condition may be performed at the time of calculating the interaction coefficient $J_{ij}$ and the local magnetic field $h_i$.

In addition, the user may develop a program for inversely converting data in a predetermined format output from the Ising machine into a solution $(s_1, s_2, \ldots, \text{and } s_m)$ representing the ground state of Formula (1) (for example, the level-3 problem model 33c) of the Ising model. This inverse conversion program corresponds to the L3 inverse conversion program 33b illustrated in FIG. 2. Further, the user may develop a program for inversely converting the above solution $(s_1, s_2, \ldots, \text{and } s_m)$ into a solution of the combinatorial optimization problem. This inverse conversion program corresponds to the L2 inverse conversion program 32b illustrated in FIG. 2. Here, the solution to the problem 60 is, for example, the vector $x_i = \{x_1, x_2, x_3, \ldots, \text{and } x_n\}$ indicating a portfolio configuration with which minimization of the tracking error can be expected. Here, the subscript i indicates a stock to be incorporated into the portfolio, and a value of the vector $x_i$ indicates the quantity of each stock. The quantity of the stock may be the number of shares or may be indicated by a ratio relative to the total of 1. In addition, another unit may be used. The vector $x_i$ corresponds to the solution 82 to the real problem illustrated in FIG. 2.

When the L2 conversion program 32a, the L3 conversion program 33a, the L2 inverse conversion program 32b, and the L3 inverse conversion outward route program 33b for the financial portfolio optimization problem are developed as described above, these programs can automatically convert the input data 81 of the financial portfolio optimization problem into the input data of the Ising machine. In addition, these programs enable the output data of the Ising machine to be automatically converted into the solution 82 to the real problem.

The problem 60 of FIG. 3 is merely an example of the financial portfolio optimization problem. For example, as illustrated in the middle part of FIG. 4, there may be a case where it is desired to obtain a portfolio that maximizes return. When it is desired to maximize the return of a portfolio, the return can be set as an objective function $f_2(x_i)$. Even in a case where it is desired to solve such a problem, the user can perform problem modeling and development of a conversion program and an inverse conversion program in a procedure similar to that in the case of the problem 60 in FIG. 3 as illustrated in FIG. 4.

It has been assumed that the quantum-related computer to be used is the Ising machine in the description regarding the problem 60 in FIG. 3. FIG. 5 illustrates an example of a low-level model (the level-3 problem model 33c) used in a case where the quantum-related computer to be used is the Ising machine. The low-level model of FIG. 5 is the Ising model. The table 27 illustrates an example of the local magnetic field $h_i$. In addition, a table 28 shows an example of the interaction coefficient $J_{ij}$.

Figure 6:
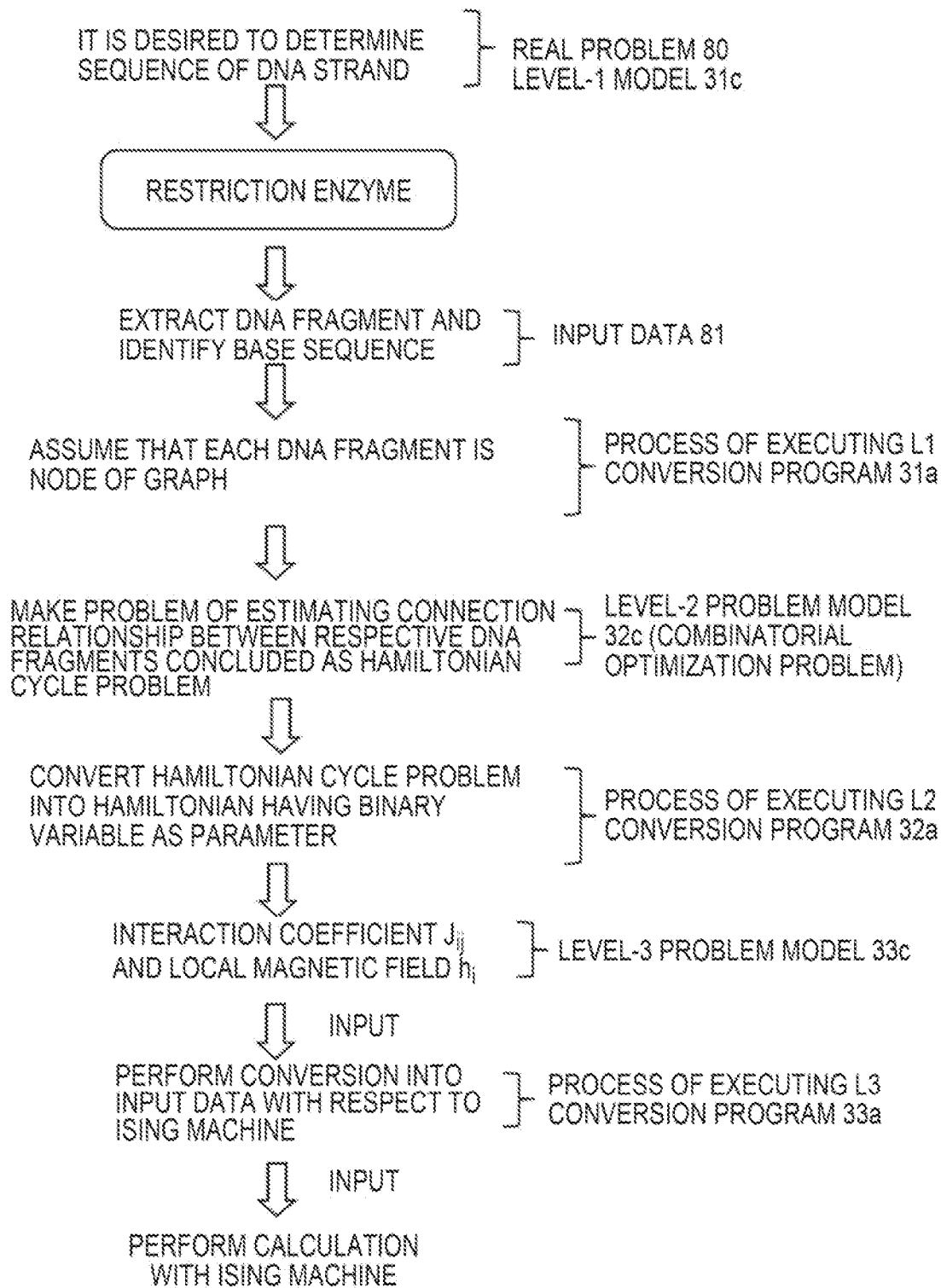
FIG. 6 is a diagram illustrating a second example of the level structure of the problem.

FIG. 6 illustrates an example of a level structure of a problem when the system according to the present embodiment is applied in a field of genome analysis (determination of a base sequence of a DNA strand).

In the example of FIG. 6, determining sequences of DNA fragments constituting a DNA strand corresponds to the real problem 80. A user cleaves a target DNA strand into a large number of DNA fragments in a laboratory or the like. The DNA strand can be cleaved, for example, by using a restriction enzyme. Then, the user extracts each of the DNA fragments and identifies a base sequence of each of the DNA fragments. Data of the base sequence of the extracted DNA fragment corresponds to the input data 81.

The user can describe the real problem 80 using a natural language, for example. The described real problem 80 corresponds to the level-1 problem model 31c. At this time, the user can utilize the level-1 modeling tool 31. The level-1 modeling tool 31 indicates, for example, items necessary for determining the base sequence of the DNA strand and a template, a sample, a past problem description example, or the like indicating a content that needs to be input to each of the items. For this reason, the user can accurately and completely describe the real problem 80.

Assuming that the respective DNA fragments are nodes of a graph, a problem of estimating the connection relationship among the respective DNA fragments can be described as a Hamiltonian cycle problem. The user can use the level-2 modeling tool 32 to describe the Hamiltonian cycle problem based on data of the base sequence related to the plurality of DNA fragments as a problem model. Here, the Hamiltonian cycle problem corresponds to the level-2 problem model 32c. However, if the user can omit the description of the level-1 problem model 31c, the user may directly describe the Hamiltonian cycle problem (the level-2 problem model 31c) without describing the level-1 problem model 32c.

After describing the problem model, the user can use the programming tool 34 to develop a program (conversion program) for converting the input data 81 (data of the base sequence of the plurality of DNA fragments) of the real problem 80 into the Hamiltonian cycle problem at Level 2. This conversion program corresponds to the L1 conversion program 31a.

Figure 7:
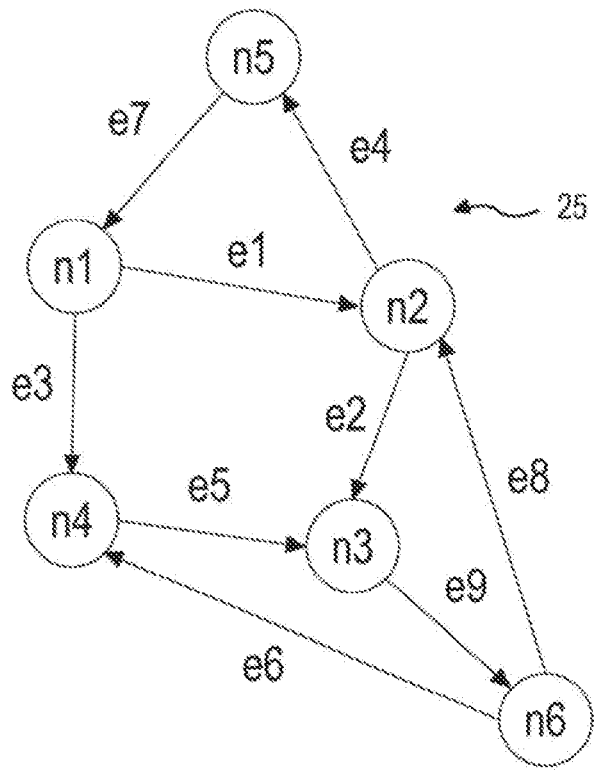
FIG. 7 is a diagram illustrating an example of a Hamiltonian cycle problem.

FIG. 7 illustrates an example of the Hamiltonian cycle problem. A directed graph 25 is illustrated on the upper side of FIG. 7. In addition, a table 26 in which the directed graph 25 is numerically expressed is illustrated on the lower side of FIG. 7. A node connected with an edge toward another node can be confirmed by referring to a field in which a value of the table 26 is +1. For example, the directed graph 25 includes an edge toward a node n2 and an edge toward a node n4, from a node n1. When a row related to "n1" in the table 26 is confirmed, values of fields of a column "n2" and a column "n4" are +1.

Similarly, a node connected with an edge toward the own node can be confirmed by referring to a field in which a value of the table 26 is −1. For example, the directed graph 25 includes an edge from the node n2 to a node n3 and an edge from the node n4 to the node n3. When a row related to "n3" in the table 26 is confirmed, values of fields of the column "n2" and the column "n4" are −1. Although FIG. 7 illustrates the directed graph, but this is merely an example. For example, an undirected graph may be used instead of the directed graph in the Hamiltonian cycle problem of FIG. 6.

Hereinafter, the description returns to FIG. 6 again. The user needs to convert the Hamiltonian cycle problem into a data format that can be input to a quantum-related computer in order to solve the Hamiltonian cycle problem using the quantum-related computer. For example, in a case where the quantum-related computer is an Ising machine, the user needs to convert the Hamiltonian cycle problem into an Ising model having a binary variable as a parameter. Therefore, the user describes Formula (1) of the Ising model corresponding to the Hamiltonian cycle problem using the level-3 modeling tool 33. Here, Formula (1) of the Ising model corresponds to the level-3 problem model 33c. Then, the user can use the programming tool 34 to develop a program for converting the Hamiltonian cycle problem into Formula (1) while referring to the Hamiltonian cycle problem (the level-2 problem model 32c) and Formula (1) of the Ising model (the level-3 problem model 33c). This conversion program corresponds to the L2 conversion program 32a of FIG. 2.

The L2 conversion program 32a makes it possible to automatically calculate the interaction coefficient $J_{ij}$ and the local magnetic field $h_i$ in Formula (1) of the Ising model corresponding to any Hamiltonian cycle problem. Here, the interaction coefficient $J_{ij}$ and the local magnetic field $h_i$ correspond to the level-3 problem model 33c in FIG. 2. The user can further develop the L3 conversion program 33a for converting data corresponding to the level-3 problem model 33c into a data format that can be input to the quantum-related computer (for example, the Ising machine). The user can develop the L3 conversion program 33a by a method similar to that in the above description of FIG. 3.

The user can also develop the L1 to L3 inverse conversion programs 31b to 33b using the programming tool 34. The inverse conversion programs can also be developed by methods similar to those in the above description of FIG. 3. The L3 inverse conversion program 33b converts data of a solution output from the quantum-related computer (for example, the Ising machine) into a solution $(s_1, s_2, \ldots,$ and $s_m)$ of Formula (1) of the Ising model. The L2 inverse conversion program 32b converts the solution $(s_i, s_2, \ldots,$ and $s_m)$ of the Ising model into a solution to the Hamiltonian cycle problem. Then, the L1 inverse conversion program 31b converts the solution to the Hamiltonian cycle problem into the connection relationship among the plurality of DNA fragments, which is a solution to the real problem 80. As a result, the user can determine the base sequence of the DNA strand.

As described above, when the L1 to L3 conversion programs 31a to 33a and the L1 to L3 inverse conversion programs 31b to 33b corresponding to the real problem 80 are developed, a conversion process necessary for the user to use the quantum-related computer is automatically performed. Here, the conversion process includes a process of converting the input data 81 of the real problem 80 into the data format that can be input to the quantum-related computer, and a process of converting the solution output from the quantum-related computer into the solution 82 to the real problem.

As illustrated in the example of FIG. 6, the conversion process in three stages or two stages may be performed to convert the real problem 80 into the data format that can be input to the quantum-related computer.

Figure 8:
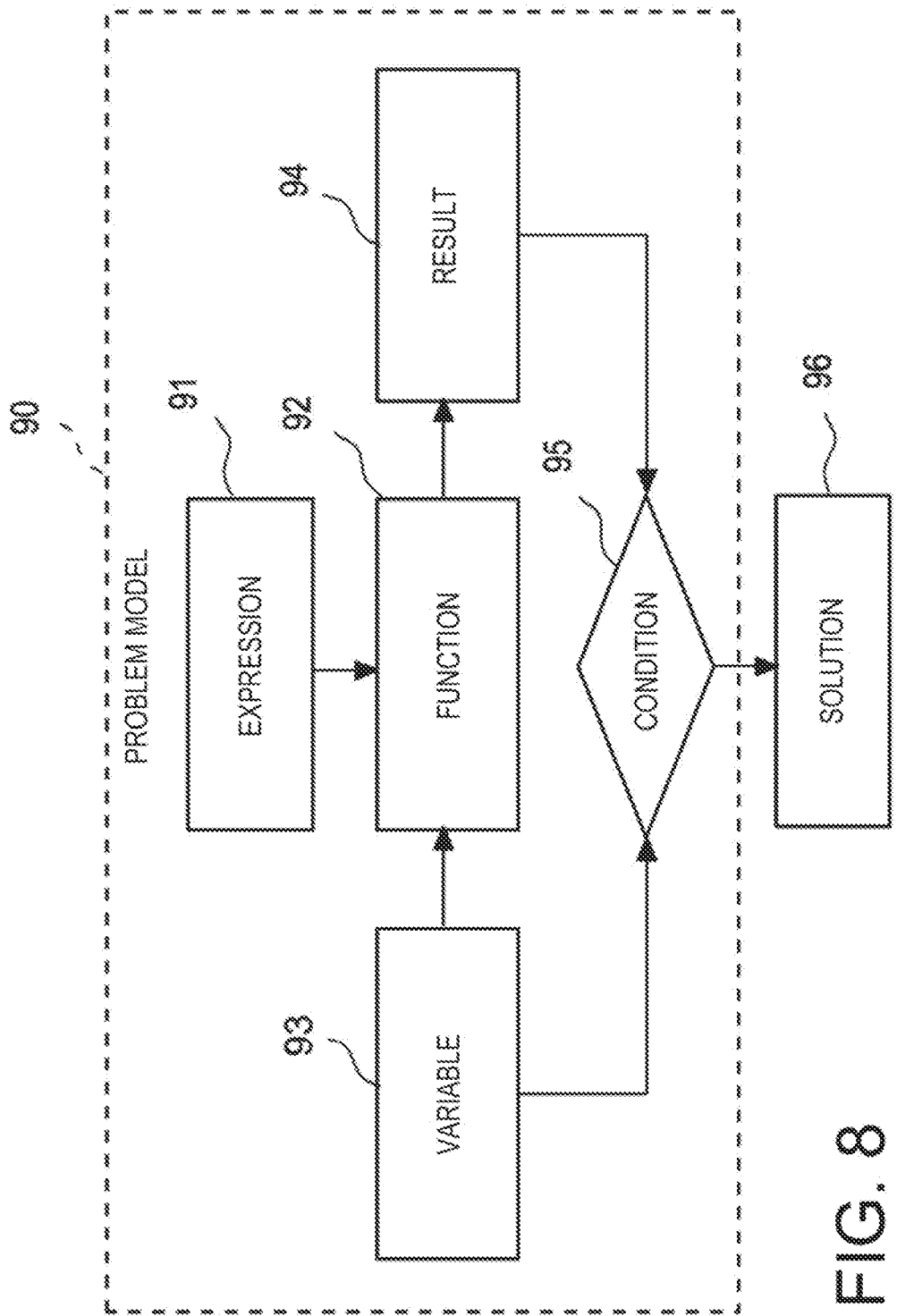
FIG. 8 is a diagram illustrating a general configuration example of a problem model.

FIG. 8 illustrates a general structure example of a problem model. Each problem model (for example, the problem models 31c to 33c in FIG. 2) may have a structure similar to that in FIG. 8.

A problem model 90 in FIG. 8 includes each description of an expression 91, a function 92, a variable 93, a result 94, and a condition 95. The expression 91 specifies one or a plurality of targets to which the problem model 90 is applied. Function 92 indicates a function, action, or an operation provided by the target specified by the expression 91. The variable 93 is one or a plurality of variables (for example, information, a substance, energy, a value, or the like) that is likely to be input to the function 92. The result 94 indicates one or a plurality of results performed by the function 92 or one or a plurality of results output from the function 92 with an input of the variable 93. Here, the result includes, for example, information, a substance, energy, a value, or the like. The condition 95 indicates a condition to be applied to the result 94 in order to determine the applicability of the result 94. In the problem model 90, the variable 93 used when the result 94 satisfying the condition 95 is obtained can serve as a solution 96 to a problem.

In FIG. 8, the expression 91, the function 92, the variable 93, the result 94, and the condition 95 are illustrated in different blocks for convenience of the description of the structure of the problem model. In actual problem models, however, there is a case where the descriptions of the expression 91, the variable 93, and the result 94 are included in the description of the function 92, for example. In addition, there is also a case where the condition is implicitly determined and is not explicitly described in the actual problem models. In this manner, the actual problem models may have differences from the structure of FIG. 8. The problem model according to the present embodiment also includes models having such differences from the structure of FIG. 8.

For example, in Formula (1) of the Ising model (the level-3 problem model 33c in FIG. 2), a spin arranged on a two-dimensional lattice point is an application target. It can be said that the Hamiltonian H on the left side of Formula (1) corresponds to the description of the result 94, and the polynomial on the right side corresponds to the description of the function 92. Then, it can be said that the coefficient matrix $J_{ij}$ and the vector $h_i$ on the right side correspond to the description of the expression 91, and the spins (binary variables) $s_i$ and $s_j$ correspond to the description of the variable 93. Then, an optimal condition of the Ising model is that the result 94 (Hamiltonian H) becomes the minimum value although not explicitly indicated in Formula (1). This optimal condition corresponds to the condition 95. For this reason, values of the variable 93 (Spins $s_i$ and $s_j$) used when the Hamiltonian H becomes the minimum value correspond to the solution 96 to the Ising model. As such, the level-3 problem model 33c may include all the descriptions of the expression 91, the function 92, the variable 93, the result 94, and the condition 95.

In the case where determining the base sequence of the DNA strand is the real problem 80 as illustrated in FIG. 6, the level-1 problem model 31c may describe the real problem 80 in a natural language, for example. In this case, a target to which the level-1 problem model 31c is applied is one DNA strand formed by connecting all of the plurality of DNA fragments. The level-1 problem model 31c includes descriptions of the base sequences of the plurality of DNA fragments, which serve as the input data 81 of the real problem 80. It can be said that the descriptions of the base sequences of the plurality of DNA fragments correspond to the expression 91. In addition, in a case where the level-1 problem model 31c includes a description of a structure of the DNA strand that "All the DNA fragments are connected to any other DNA fragment", it can be said that the description corresponds to the function 92. In addition, the level-1 problem model 31c may include a description of a correlation between two DNA fragments that are likely to be connected to each other, for example, "If a base sequence at one end of one fragment is the same as a base sequence at one end of the other fragment, the two fragments can be connected to each other at the ends having the same base sequence". This description defines "A combination of a possible connection between DNA fragments" (although indirectly), and thus, can be said to correspond to the description of the variable 93. In addition, when "All the DNA fragments are connected to any other DNA fragment" (the description of the function 92) with "A combination of a possible connection between DNA fragments" (the description of the variable 93), a linkage of one or more DNA fragments is generated. This corresponds to the result 94. It can be said that the description of the result 94 is included in the description of the function 92. In addition, the level-1 problem model 31c may include a description of a condition "A result obtained by connecting all the DNA fragments needs be one strand". This description can be said to correspond to the condition 95. As such, the level-1 problem model 31c may include all the descriptions of the expression 91, the function 92, the variable 93, the result 94, and the condition 95.

A description of the Hamiltonian cycle problem (the level-2 problem model 32c) used for determining the base sequence of the DNA strand in FIG. 7 may include all the descriptions of the expression 91, the function 92, the variable 93, the result 94, and the condition 95. In addition, some descriptions may be implicit matters, and are not necessarily explicit. In the table 26 of FIG. 7, it can be said that the nodes n1, n2, and so on correspond to the expression 91. In addition, values (−1/0/+1) in the table 26 indicate the connection relationship between a certain node and another node, and correspond to the variable 93 of the problem model 90.

Any column having the value of +1 is selected while referring to any row in the table 26. This corresponds to a process of identifying an edge from a certain node to another node since the row of the table 26 is associated with to any of the nodes n1 to n6. For example, the node n2 (edge e1) or the node n4 (edge e3) whose value is +1 can be selected while referring to the row of the node n1. Next, a row of a node corresponding to an identified column is referred to. For example, in a case where the node n2 is selected, a row corresponding to the node n2 is referred to, and any column whose value is +1 is selected. Then, a row of a node corresponding to the selected column is referred to. If the above-described processing is executed for all the rows of the table 26, a path passing through all the nodes of the directed graph 25 can be obtained. This corresponds to the function 92 of the problem model 90.

In addition, a set of fields whose values are +1 selected by the above-described processing corresponds to a path passing through all the nodes of the directed graph 25. Therefore, it can be said that the set of fields whose values are +1 selected by the above-described processing corresponds to the result 94 of the problem model 90. In addition, obtaining one path in the result 94 corresponds to the condition 95 of the problem model 90. In this manner, the level-2 problem model 32c may include all the descriptions of the expression 91, the function 92, the variable 93, the result 94, and the condition 95.

As described above, a problem model at any level can be described by a structure including elements (the expression 91, the function 92, the variable 93, the result 94, and the condition 95) of the problem model 90 illustrated in FIG. 8. The modeling tools 31 to 33 at the respective levels illustrated in FIG. 2 support the user such that the user can describe a problem model at each level using the elements of the problem model in FIG. 8. For example, a template or a sample of a problem model presented to the user by the modeling tools 31 to 33 at the respective levels may include items necessary for identifying the expression 91, the function 92, the variable 93, the result 94, and the condition 95 and descriptions of contents to be input to the respective items. If the user describes a problem model based on the template or sample, the problem model including the elements of the expression 91, the function 92, the variable 93, the result 94, and the condition 95 can be created.

Hereinafter, each element of the system will be described with reference to FIG. 1 again.

The control unit 5 controls the quantum-related computers 11a to 11c. For example, the control unit 5 can transmit a command for starting a calculation process and a command for stopping the calculation process to the quantum-related computers 11a to 11c. In addition, the control unit 5 transmits and receives data to and from the quantum-related computers 11a to 11c. For example, the control unit 5 may transmit problem data converted into a format that can be input to the quantum-related computer by the conversion unit 4. In addition, the control unit 5 may acquire data of a solution calculated from the quantum-related computer. The downloaded solution data may be stored in the storage unit 8 or may be exchanged to the conversion unit 4. The command or data transmitted from the control unit 5 is transmitted to the quantum-related computers 11a to 11c via the communication circuit 7 and the network 20. Similarly, the control unit 5 can acquire data from the quantum-related computer via the communication circuit 7 and the network 20.

The user may operate the interface provided by the management unit 6 to designate a quantum-related computer to be used for calculation, or may designate a use condition of the quantum-related computer. It is possible to designate the quantum-related computer to be used for calculation and designate the use condition of the quantum-related computer by using a control script 51. For example, when the user designates the use condition of the quantum-related computer, the control unit 5 may generate or update the control script 51 using a control script generation tool 50 of FIG. 2. When the user designates the quantum-related computer to be used for calculation, the control unit 5 may update the control script 51 using the control script generation tool 50.

Note that the user may directly operate the control script generation tool 50 to create or update the control script 51. For example, the control script generation tool 50 may present a template including a content that needs to be described in the control script 51 to the user to support the user in describing the control script. In addition, the control script generation tool 50 may provide a function of automatically generating a script based on at least any of a parameter input by the user or an option selected by the user. As a result, the burden on the user can be reduced.

There is a case where the user divides a problem (for example, a combinatorial optimization problem) into a plurality of problems as described above. In this case, the user can select a quantum-related computer that solves the divided combinatorial optimization problems by using the control unit 5. In addition, in a case where the user obtains a solution to the problem in parallel using a plurality of quantum-related computers regardless of the presence or absence of the problem division, the user may select the quantum-related computers to be used by using the control unit 5. In a case where a plurality of quantum-related computers performs calculation, the user may designate the order in which the quantum-related computers obtain a solution by using the control unit 5. In addition, in a case where a quantum-related computer is added to the information processing system 10, the user can register the quantum-related computer as a usable machine via the control unit 5.

In addition, the user may designate an upper limit of power consumption, an upper limit of a memory area to be used, an upper limit of a calculation time, and the like by using the control unit 5. In addition, an initial solution, a condition for determining that calculation is completed, and a time evolution schedule may be designated depending on types of quantum-related computers.

The management unit 6 provides each user with an interface for operating the information processing system 10. The interface may be a web browser interface provided by a web server. In addition, the interface may be an API or a CLI, and the implementation thereof is not particularly limited. A type of a client application used in the client machine 22 of each user is not particularly limited. For example, each user may perform coding on a web browser or perform coding on an application providing an integrated development environment (IDE). In this case, the user operates the development unit 3 via the interface provided by the management unit 6. The user may operate the control unit 5 including the control script generation tool 50 via the interface provided by the management unit 6. In addition, the user may operate the conversion unit 4 via the interface of the management unit 6.

The communication circuit 7 is connected to the network 20 and the network 21. An example of the communication circuit 7 is an NIC that performs communication using Ethernet. Examples of the networks 20 and 21 include a TCP/IP network. The communication circuit 7 is connected to the quantum-related computers 11a to 11c via the network 20. In addition, the communication circuit 7 is connected to the client machine 22 and the external information processing system 23 via the network 21. A network configuration in FIG. 1 is an example, and a different configuration may be used. In addition, a communication standard and a type of a communication medium used in the network are not particularly limited.

The storage unit 8 provides a storage area capable of storing various types of data, such as data of the problem models at the respective levels, data of the conversion program 41 (sub-conversion programs at the respective levels), data of the inverse conversion program 42 (sub-inverse conversion programs at the respective levels), data of the control script 51, intermediate data for processing, and data of programs (for example, the programming tool 34, the modeling tools at the respective levels, and the control script generation tool 50) operating in the information processing device 1. The storage unit 8 may be, for example, a volatile memory such as an SRAM and a DRAM, or may be a nonvolatile memory such as a NAND, an MRAM, and an FRAM. In addition, the storage device may be a storage device such as a hard disk and an SSD, or an external storage device. That is, a type of the storage unit 8 is not particularly limited. In addition, the storage unit 8 may be a combination of a plurality of types of memories and storages.

The client machine 22 is an information communication terminal used by the user. Examples of the information communication terminal include a personal computer, a smartphone, a tablet, and a digital television. However, a device type is not particularly limited. Although only the single client machine 22 is illustrated in FIG. 1, the number of the client machines 22 may be more than this.

A plurality of users who use the information processing system 10 can share creation work of the problem models, the sub-conversion programs, and the sub-inverse conversion programs at the respective levels. That is, one user does not need to create the problem models, the sub-conversion programs, and the sub-inverse conversion programs at all the levels.

For example, each of the users may be responsible for creating a problem model at a level for which the user has expertise and experience, and another user may be responsible for creating a problem model at another level. For example, a user having a financial portfolio and expertise related thereto or a user having practical experience in portfolio design may focus on creating a problem model (for example, the level-1 (high-level) model 31c) that describes the real problem 80 of the financial portfolio. A problem model that describes the real problem 80 may be created by different users depending on related fields of the real problem 80, such as finance, logistics, transportation, and life science.

In addition, a user having expertise or practical experience in applied mathematics may focus on creating a problem model (for example, the level-2 (middle-level) model 32c) that describes a combinatorial optimization problem. A user having expertise in the quantum-related computers may focus on creating a problem model (for example, the level 3 (middle-level) model 33c) that describes data formats that can be input to the quantum-related computers. Users, different for each of types of the quantum-related computers, may be responsible for a problem model that describes the data formats that can be input to the quantum-related computers. As a result, it is possible to prepare the problem model in consideration of characteristics of the quantum-related computers. Note that one user may create problem models at a plurality of levels. For example, in a case where one user has knowledge and experience in a plurality of specialized fields or in a case where one user is a team including a plurality of members, it may be efficient for the one user to create problem models at a plurality of levels.

It is possible to appropriately modify or simplify a problem so as not to lose information necessary for solving the problem by determining a user who creates a problem model based on expertise and experience. In addition, it is possible to accurately define and describe the real problem 80. The work that each user is in charge of may be assigned by an administrator or the like, or a problem model to be created may be determined by each user's voluntary participation. In addition, the administrator or the like may request a user having specific expertise and experience to create a problem model.

When a user performs a problem model at a certain level, the user may create a sub-conversion program and a sub-inverse conversion program corresponding to the level. As a result, the user can perform coding based on his/her expertise and understanding of the problem model. In addition, the user who has performed the problem model at the certain level may cause another user to create the sub-conversion program and the sub-inverse conversion program corresponding to the level. For example, if there is a user who has abundant experience in coding with a specific programming language, the user may specialize in coding work.

There may be a user who designs, codes, and tests a library such as the support library and graph library described above. In addition, the user may prepare a template or a sample for describing a problem model and upload the template or sample to the information processing device 1.

The user can share products, such as the problem models, the sub-conversion programs, and the sub-inverse conversion programs at the respective levels, with another user who uses the information processing system 10. As a result, it is possible to reduce man-hours required to create the problem models, the conversion program 41, and the inverse conversion program 42. In addition, the user may share the created library, template, and sample with another user. As a result, the expertise and experience possessed by the user can be shared with the another user, and the work burden on the another user can be reduced.

In addition, even in a case where a type of a quantum-related computer to be used for calculation is changed, it is unnecessary to recreate the conversion program, the inverse conversion program, and the problem model at each level from the beginning by using the information processing system according to the present embodiment. For example, when a quantum-related computer of a different type from a previously used quantum-related computer is put into practical use, a type of a quantum-related computer to be used for calculation is likely to change. In such a case, it is sufficient to create a problem model, a low-level sub-conversion program, and a low-level sub-inverse conversion program corresponding to the quantum-related computer of the different type.

On the other hand, even if the type of the quantum-related computer to be used for calculation is changed, the user can continue to use the sub-conversion program and the sub-inverse conversion program at another level without any change. The conversion program 41 and the inverse conversion program 42 are divided into the plurality of levels, and can be recombined for each level. For this reason, even if the type of the quantum-related computer to be used for calculation is changed, the compatibility of developed software can be secured, and existing software assets can be inherited.

The external information processing system 23 transmits and receives data to and from the information processing system 10. For example, the external information processing system 23 transmits data of the real problem 80 including the input data 81 to the information processing system 10. In addition, the external information processing system 23 may download the solution 82 to the real problem from the information processing system 10. The external information processing system 23 can execute another processing based on the downloaded solution 82 to the real problem. A content of processing executed by the external information processing system 23 is not particularly limited. Note that only the single external information processing system 23 is illustrated in FIG. 1, but the number of the external information processing systems 23 may be more than this.

Figure 9:
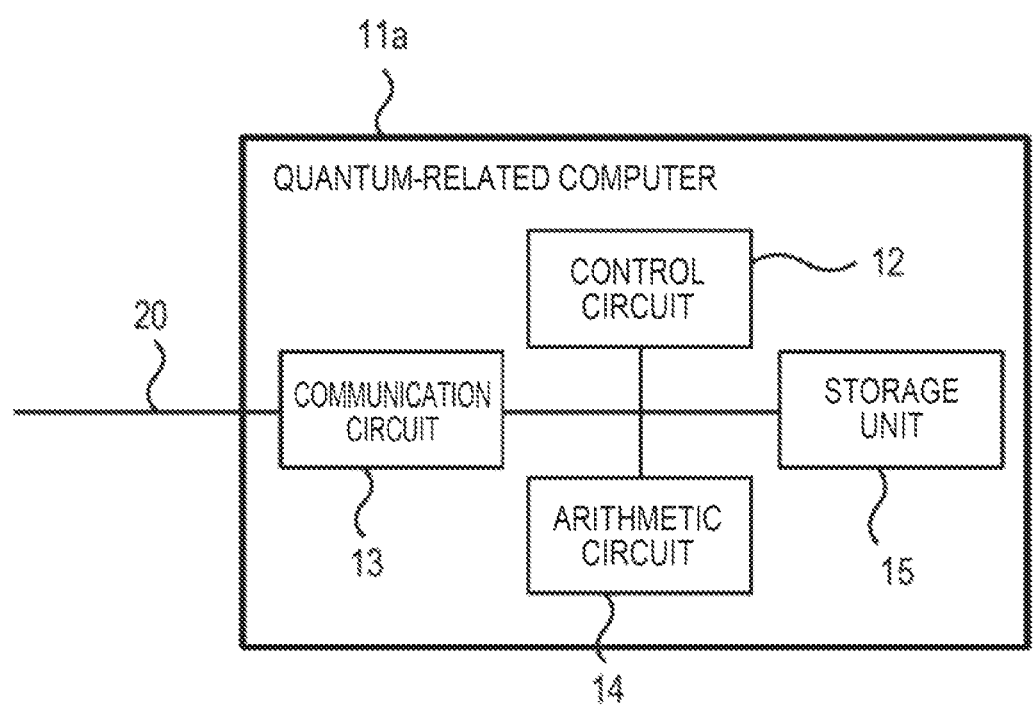
FIG. 9 is a block diagram illustrating a configuration example of a quantum-related computer.

FIG. 9 is a block diagram illustrating a configuration example of the quantum-related computer. The quantum-related computer 11a in FIG. 9 includes a control circuit 12, a communication circuit 13, a n arithmetic circuit 14, and a storage unit 15. The control circuit 12 controls the entire quantum-related computer 11a. For example, the control circuit 12 may receive various control signals from the outside via the communication circuit 13 and cause the arithmetic circuit 14 to start calculation. In addition, the control circuit 12 may perform control such as power management and cooling of each constituent element. The communication circuit 13 performs data communication with information processing equipment (for example, the information processing device 1) outside the quantum-related computer. The arithmetic circuit 14 executes the calculation based on input data in a format. A content of the calculation executed by the arithmetic circuit 14 depends on a type of the quantum-related computer. In addition, a configuration of the arithmetic circuit 14 also varies depending on the type of the quantum-related computer. The storage unit provides a storage area capable of storing necessary programs and data that is necessary for the calculation. A type and a configuration of a storage element or a storage device to be used are not particularly limited similarly to the storage unit 8 of the information processing device 1.

Heretofore, the configuration of the system according to the present embodiment has been described. Next, a data structure used in the system according to the present embodiment will be described.

Figure 10:
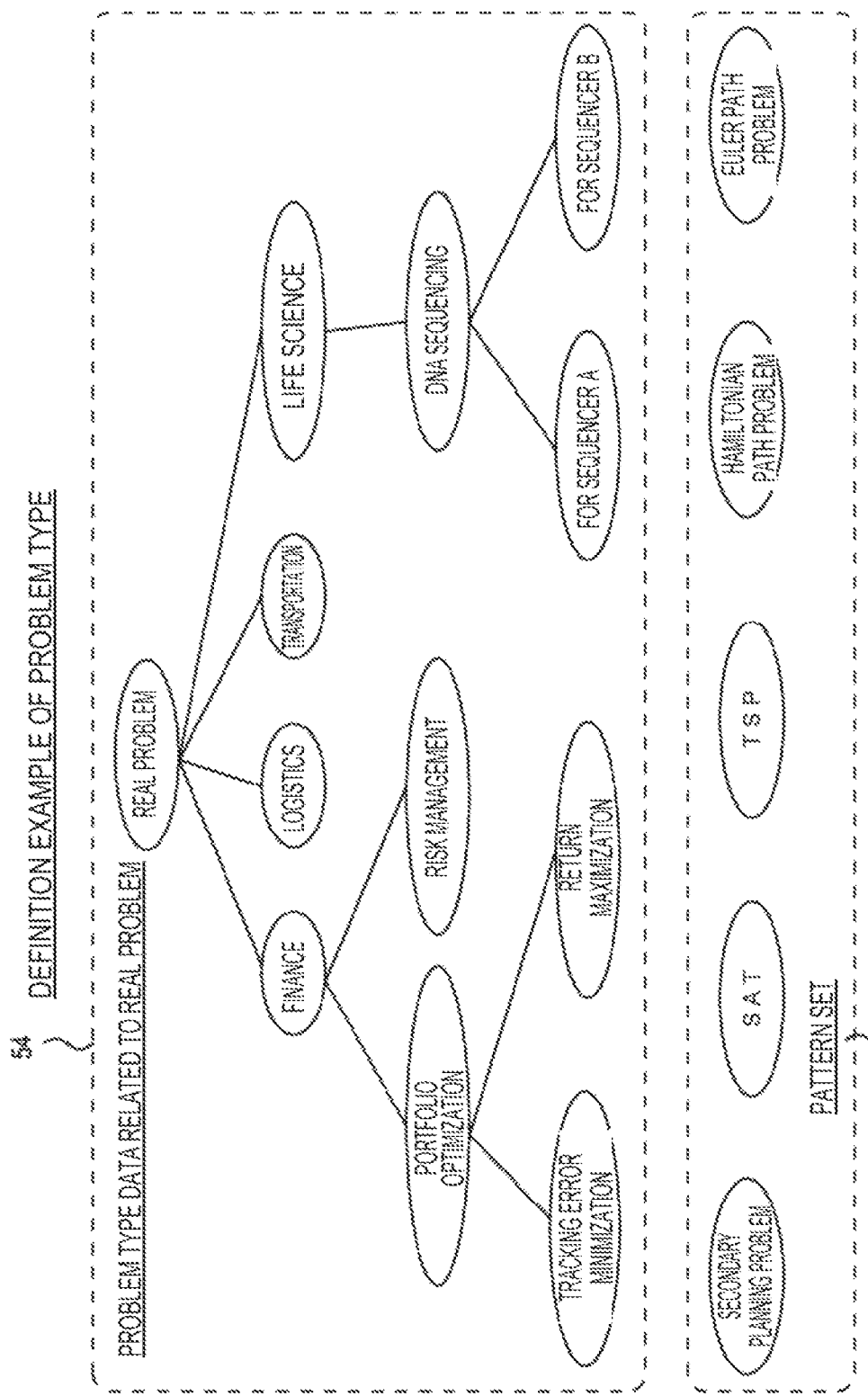
FIG. 10 is a diagram illustrating a definition example of a problem type.

FIG. 10 illustrates a definition example of a problem type. In a problem type data 54, a problem to be solved by the user is defined and classified. The problem type data 54 has a tree structure with the real problem 80 as a root node. At Depth 1, a "finance" node, a "logistics" node, a "transportation" node, and a "life science" node are defined. At Depth 1, the node is defined for each industry. At Depth 2, a "portfolio optimization" node and a "risk management" node are defined as child nodes of the "finance" node. Further, a "DNA sequencing" node is defined as a child node of the "life science" node at the same Depth 2.

At Depth 3, a "tracking error minimization" node and a "return maximization" node are defined as child nodes of the "portfolio optimization" node. Further, "for sequencer A" and "for sequencer B" are defined as child nodes of the "DNA sequencing" node at the same Depth 3. In this manner, the problem type data 54 classifies the real problem 80 based on the industry, a content, an application target, and the like. In addition, it can also be said that the respective nodes of the problem type data 54 define types of the real problem 80.

The conversion program 41 and the inverse conversion program 42 used in the real problem 80 related to a corresponding type may be identified by referring to the nodes of the problem type data 54. For example, pointers to the corresponding conversion program 41 and inverse conversion program 42 may be stored in the nodes. In addition, file names of the corresponding conversion program 41 and inverse conversion program 42 may be stored in the nodes. Note that a sub-conversion program and a sub-inverse conversion program may be referred to from each node.

The problem type data 54 in FIG. 10 is merely an example. Therefore, a type of the real problem 80 may be classified based on a viewpoint different from that in FIG. 10. For example, the real problem may be classified based on the number of times of conversion required to reach a data format that can be input to the quantum-related computer. In addition, the real problem 80 may be classified based on whether the real problem 80 can be modeled as a combinatorial optimization problem from the beginning. In addition, the tree structure in FIG. 10 is merely an example. Therefore, the depth of the tree structure and the number of child nodes may be different from those in FIG. 10. In addition, the type of the real problem 80 may be defined by a data structure other than the tree.

A pattern set 55*a* in FIG. 10 defines types of combinatorial optimization problems such as a boolean satisfiability testing (SAT), a traveling salesman problem (TSP), a Hamiltonian path problem, and an Euler path problem. In addition, the pattern set 55*a* may include an optimization problem that can be easily converted into the combinatorial optimization problem. For example, the pattern set 55*a* also includes a secondary planning problem. The secondary planning problem can be converted into the combinatorial optimization problem by discretizing a dependent variable and an objective variable.

In a case where the real problem 80 can be modeled as a specific combinatorial optimization problem from the beginning, the user may add a type of the combinatorial optimization problem to the pattern set 55*a*. In addition, in a case where the user converts the real problem 80 into a specific combinatorial optimization problem, the user may add a type of the combinatorial optimization problem to the pattern set 55*a*. Another data may be referred to from the pattern set 55*a*. For example, a pointer to or a file name of the conversion program 41 that performs conversion into each type of combinatorial optimization problem may be stored in the pattern set 55*a*.

Figure 11:
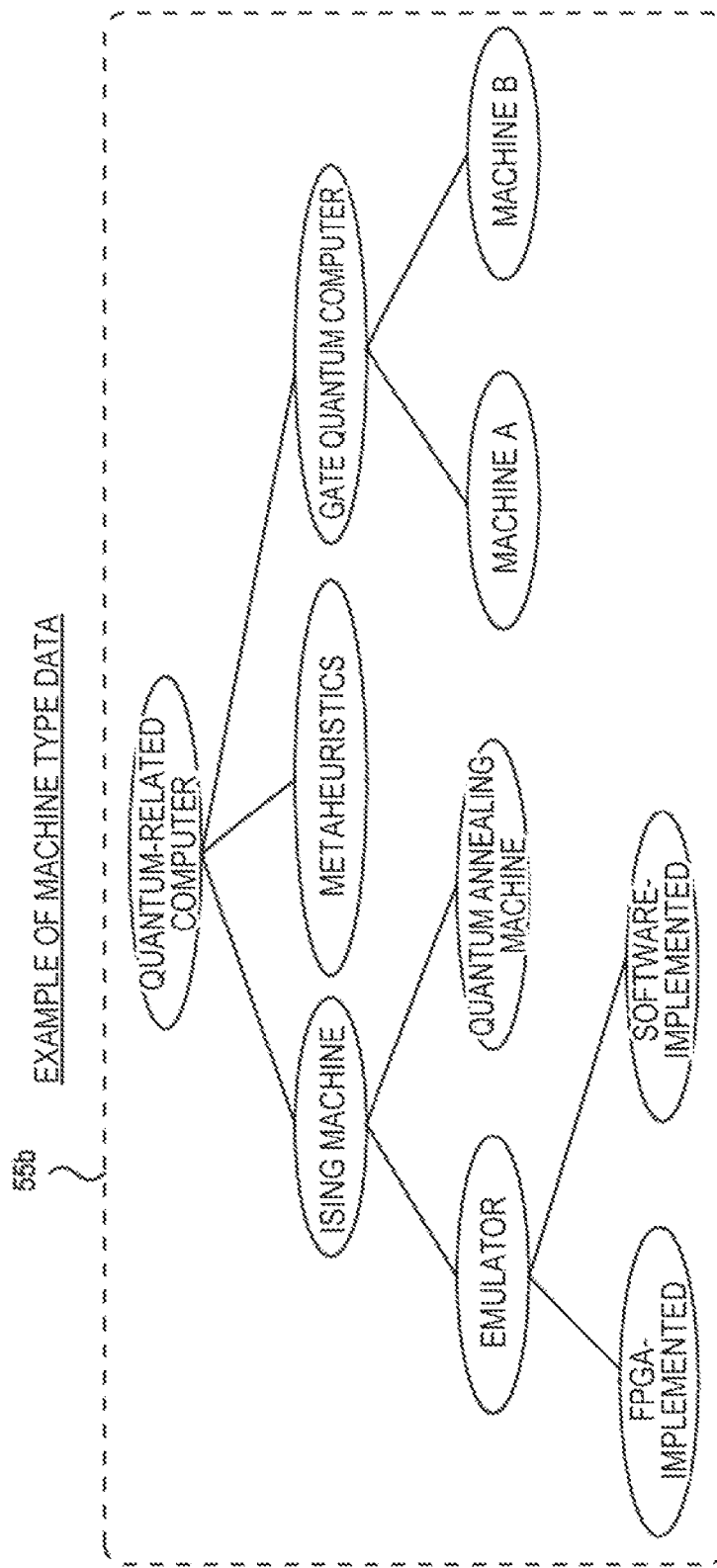
FIG. 11 is a diagram illustrating an example of machine type data.

Machine type data 55*b* in FIG. 11 defines a type of a quantum-related computer. The machine type data 55*b* has a tree structure with a "quantum-related computer" node as a root node. At Depth 1, a "Ising machine" node, a "metaheuristics" node, and a "gate quantum computer" node are defined. At Depth 2, a "emulator" node and a "quantum annealing machine" node are defined as child nodes of the "Ising machine" node. Further, a "machine A" node and a "machine B" node are defined as child nodes of the "gate quantum computer" node at the same Depth 2.

At Depth 3, a "FPGA-implemented" node and a "software-implemented" node are defined as child nodes of the "emulator" node. In this manner, the individual quantum-related computers are defined in the machine type data 55*b* based on a high-level classification performed on the quantum-related computers on the basis of the principle and a low-level classification such as a difference in implementation scheme.

Another data may be referred to from the machine type data 55*b*. For example, it may be configured such that the L3 conversion program 33*a* that performs conversion into a data format that can be input to a quantum-related computer related to a corresponding type can be referred to from each node. For example, a pointer to the L3 conversion program 33*a* may be stored in each node, or a file name of the L3 conversion program 33*a* may be stored in each node. In addition, in a case where a quantum-related computer of a different type from the other quantum-related computers is added to the information processing system 10, the user can update the machine type data 55*b*.

Figure 12:
FIG. 12 is a diagram illustrating an example of an L1 program table.

A table 56 in FIG. 12 is an example of an L1 program table. Each row of the table 56 corresponds to each of the L1 conversion programs 31*a* (L1 inverse conversion programs 31*b*). For example, the row with ID="L1001" stores a file name of each of the L1 conversion programs 31*a* (L1 inverse conversion programs 31*b*) to be used when it is desired to obtain a financial portfolio that maximizes return. In addition, each row of the table 56 also includes information on the classification of the real problem 80 based on the problem type data 54 and a technique applied by each of the L1 conversion programs 31*a* (L1 inverse conversion programs 31*b*).

A table 57 in FIG. 13 is an example of an L2 program table. Each row of the table 57 corresponds to each of the L2 conversion programs 32*a* (L2 inverse conversion programs 32*b*). For example, the row with ID="L2002" stores a file name of each of the L2 conversion programs 32*a* (L2 inverse conversion programs 32*b*) to be used when it is desired to obtain a financial portfolio that minimizes a tracking error. In addition, each row of the table 57 also includes information on the classification of the real problem 80 based on the problem type data 54 and a type of an optimization problem generated after the conversion by each of the L2 conversion programs 32*a*.

A table 58 in FIG. 14 is an example of an L3 program table. Each row of the table 58 corresponds to each of the L3 conversion programs 33a (L3 inverse conversion programs 33b). For example, the row with ID="L3001" stores file names of the L3 conversion program 33a that converts a Hamiltonian path problem into a format that can be executed by a quantum annealing machine and the L3 inverse conversion program 33b that performs inverse conversion thereof.

The program tables of FIGS. 12 to 14 conform to the level structure of the model case illustrated in FIG. 2. For this reason, when the level structure of the problem is different from that in FIG. 2, the program tables may be defined in formats different from those in FIGS. 12 to 14. In addition, data structures of FIGS. 10 to 14 can be stored in the storage unit 8. However, at least some of the data structures may be stored in an external storage device, and a storage destination of the data structure is not particularly limited.

Figure 15:
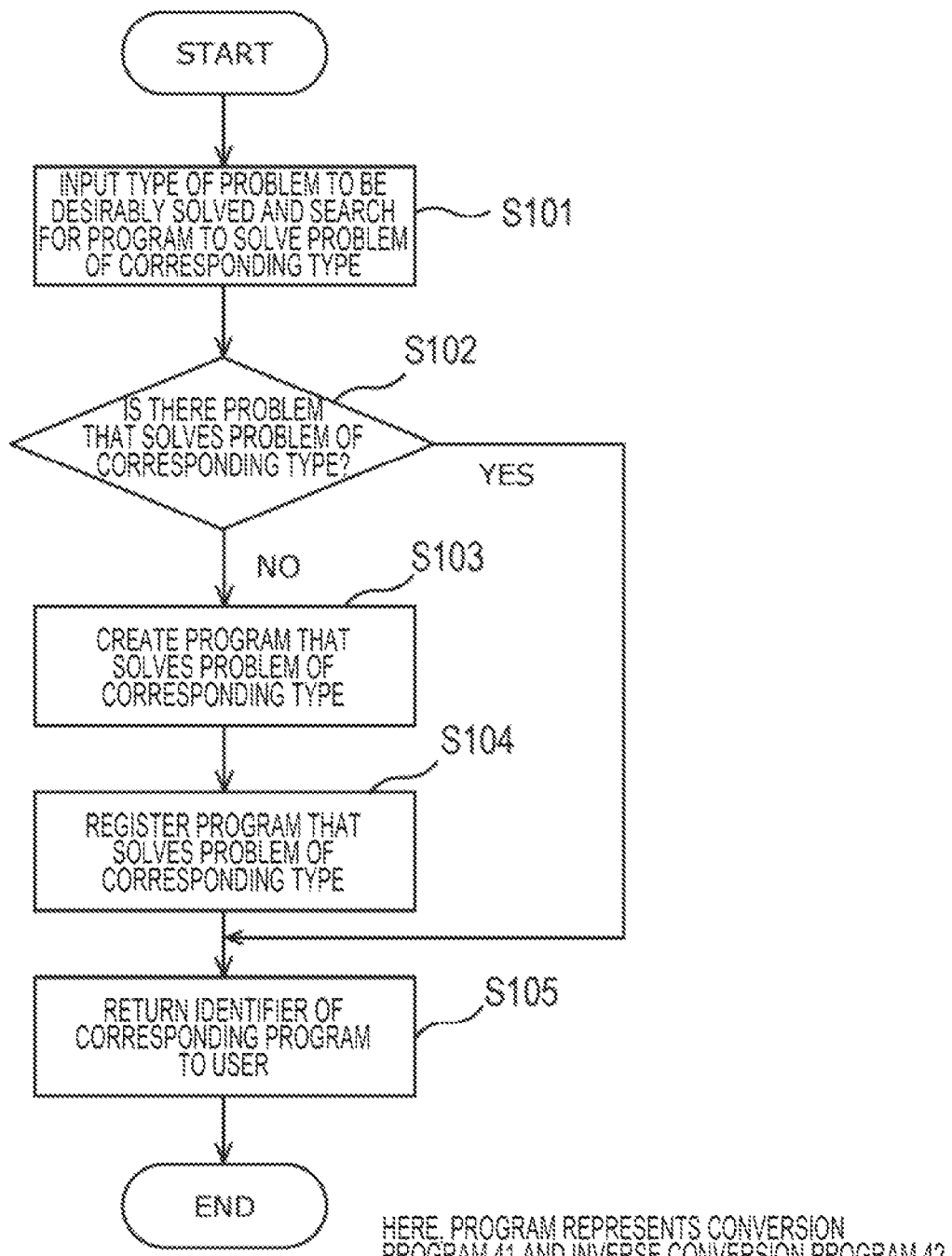
FIG. 15 is a flowchart illustrating an example of development of a program performed by an information processing system.

Next, a program development flow performed by an information system according to the present embodiment will be described. FIG. 15 is a flowchart illustrating an example of development of a program performed by the information processing system. Hereinafter, processing will be described with reference to FIG. 15.

First, a user inputs a type of a problem (second problem) to be desirably solved to the information processing device 1. Then, the information processing device 1 refers to the storage unit 8 and searches for a program to solve the problem of the corresponding type (step S101). Here, the problem to be desirably solved represents the real problem 80 in FIG. 2. In addition, the program to solve the problem represents the conversion program 41 and the inverse conversion program 42 illustrated in FIG. 2. As illustrated in FIG. 2, the conversion program 41 includes at least a low-level sub-conversion program (the L3 conversion program 33a). In addition, the inverse conversion program 42 includes at least a low-level sub-inverse conversion program (the L3 inverse conversion program 33b).

When a program that solves the problem of the corresponding type has been found as a result of the search by the information processing device 1 (YES in step S102), the information processing system 10 returns an identifier (ID) of the program that solves the problem of the corresponding type to the user (step S105). In addition, when no program that solves the problem of the corresponding type is found as a result of the search by the information processing device 1 (NO in step S102), the user creates a program that solves the problem of the corresponding type (step S103). In particular, the real problem 80 as a target to be created by the conversion program 41 and the inverse conversion program 42 is referred to as a first problem.

Then, the user registers the program that solves the problem of the corresponding type in the information processing device 1 (step S104). In step S104, a n identifier of the program is determined. In addition, the created program is stored in the storage unit 8 of the information processing device 1 together with the identifier of the program. At this time, at least any of the L1 program table, the L2 program table, and the L3 program table may be updated. When the table is updated, the ID is newly registered. Thereafter, the identifier of the program is returned to the user (step S105).

The conversion program 41 (including the sub-conversion program at any level) and the inverse conversion program 42 (including the sub-inverse conversion program at any level) may be executed on an information processing system other than the information processing system 10. Therefore, the program may be registered in the information processing system other than the information processing system 10 in step S104. Details of the processing executed in step S103 and the processing executed in step S104 will be described later.

First, the details of the processing executed in step S103 of FIG. 15 will be described. As described above, the number of times of conversion required to reach a format that can be executed by a quantum-related computer is different depending on a type of the real problem 80. Therefore, it is necessary to identify a level of a program that needs to be generated at the time of developing the program.

Figure 16:
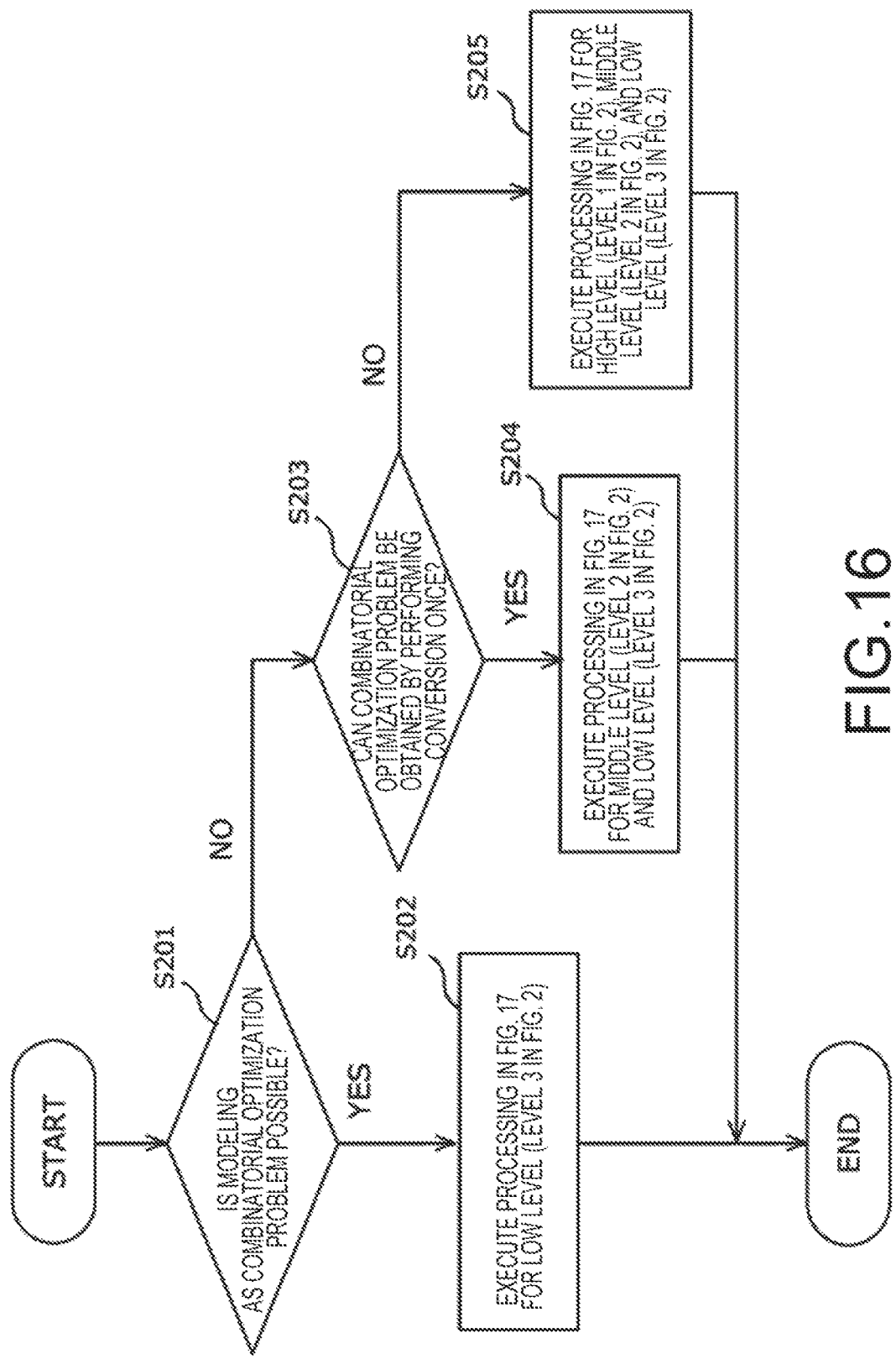
FIG. 16 is a flowchart illustrating an example of a process of identifying a level of a program that needs to be generated.

FIG. 16 is a flowchart illustrating an example of a process of identifying the level of the program that needs to be generated. Hereinafter, the process will be described with reference to FIG. 16. Note that details of a process in FIG. 17 will be described later.

Figure 17:
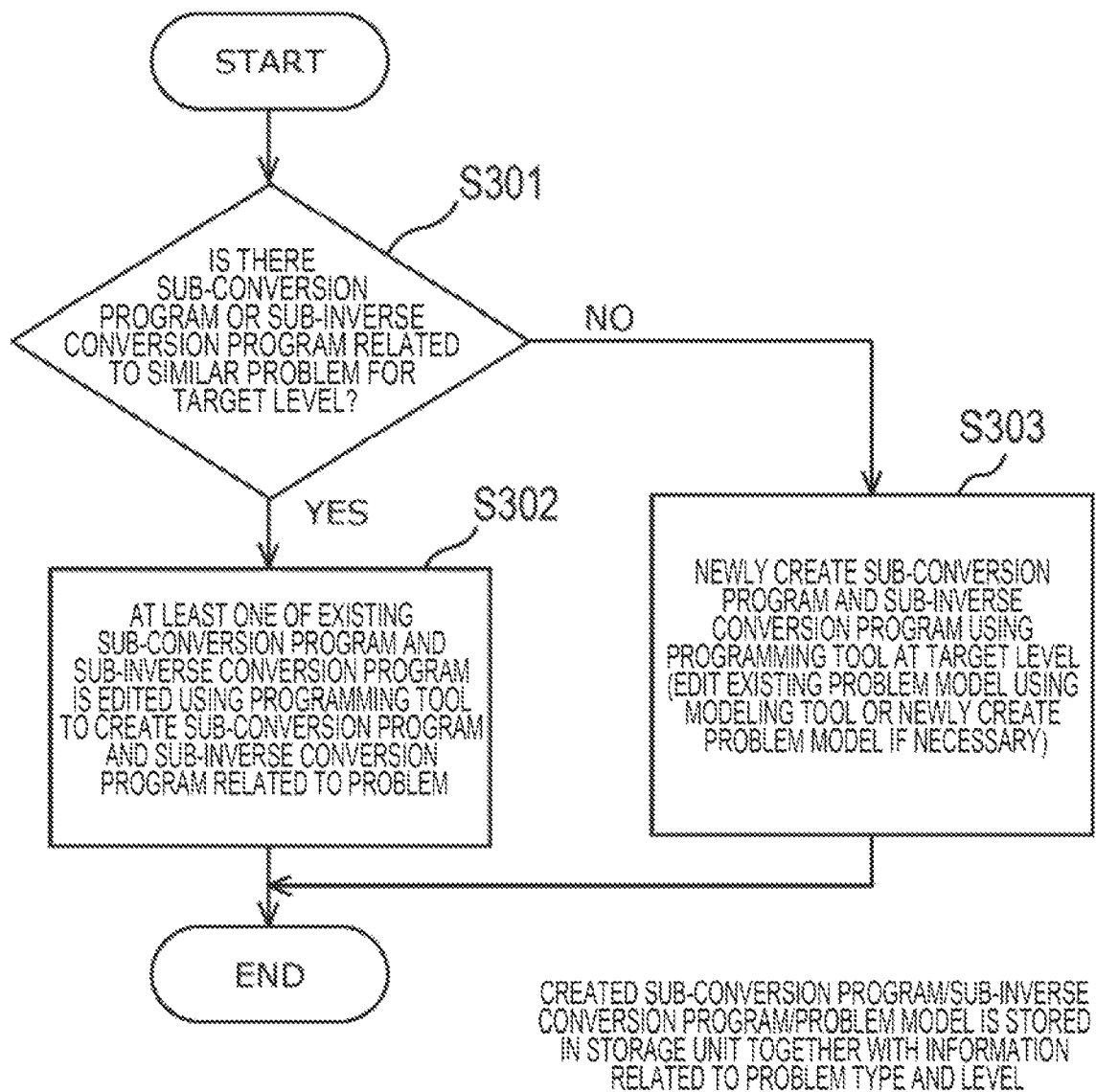
FIG. 17 is a flowchart illustrating an example of a procedure of creating a program according to a certain level.

First, it is determined whether the real problem 80 can be modelled as a combinatorial optimization problem from the beginning (step S201). When the real problem 80 can be modeled as the combinatorial optimization problem from the beginning (YES in step S201), the process in FIG. 17 is executed for a low level (Level 3 in FIG. 2) (step S202). If the modeling of the real problem 80 as the combinatorial optimization problem from the beginning is not possible (NO in step S201), it is determined whether the real problem 80 can be converted into the combinatorial optimization problem by performing conversion once (step S203).

When the real problem 80 can be converted into the combinatorial optimization problem by performing conversion once (YES in step S203), the process in FIG. 17 is executed for each of a middle level (Level 2 in FIG. 2) and the low level (Level 3 in FIG. 2) (step S204). When it is difficult to convert the real problem 80 into the combinatorial optimization problem by performing conversion once (NO in step S203), the process in FIG. 17 is executed for each of a high level (Level 1 in FIG. 2), the middle level (Level 2 in FIG. 2), and the low level (Level 3 in FIG. 2) (step S205).

Next, the processing executed in each of steps S202, S204, and S205 in FIG. 16 will be described. FIG. 17 is a flowchart illustrating an example of a process of generating a program at a certain level. Hereinafter, the process will be described with reference to FIG. 17.

First, it is determined whether a sub-conversion program or a sub-inverse conversion program related to a similar problem for a target level is stored in the storage unit 8 (step S301). Examples of the target level include a high level (Level 1 in FIG. 2), a middle level (Level 2 in FIG. 2), and a low level (Level 3 in FIG. 2). For example, in step S301, the similarity of the problem may be calculated by referring to the tree structure of the problem type data 54. When the similarity is greater than a threshold, it can be determined that the real problem 80 is similar to the problem for which the sub-conversion program or the sub-inverse conversion program has been created. When the distance between nodes when scanning the tree structure is less than a predetermined value, it can be determined that the problems are similar to each other. In addition, it may be determined that the problems are similar to each other when both of a node related to the real problem 80 and a node related to the problem for which the sub-conversion program or the sub-inverse conversion program has been created are child nodes of a certain node.

In addition, the similarity of the problem may be determined based on another criterion. For example, it may be determined that the two problems are similar to each other when types of combinatorial optimization problems generated after conversion are the same. In addition, in the case of the low-level problem, it may be determined that the two problems are similar to each other when types of quantum-related computers are the same. In addition, the similarity of the problem may be calculated by a technique different from the above to determine whether the problem is similar. For example, a full-text search for data associated with the respective nodes of the tree structure may be performed based on a keyword or a natural sentence indicating a characteristic of a problem, input by the user, to extract a similar problem. Here, an ambiguous search using synonyms may be performed in the full-text search. The development unit 3 may perform a search based on an input of the user and present at least one problem model to the user.

When the sub-conversion program or sub-inverse conversion program related to the similar problem for the target level is stored in the storage unit 8 (YES in step S301), the user edits at least any of the existing sub-conversion program and sub-inverse conversion program using the programming tool 34 at the target level to create a sub-conversion program and a sub-inverse conversion program related to the problem (step S302). For example, the development unit 3 of the information processing device 1 may present the user with information on the sub-conversion program and the sub-inverse conversion program related to the similar problem via the interface provided by the management unit 6. In a case where a plurality of similar sub-conversion programs are stored in the storage unit 8 for the target level, the user may edit any one of the sub-conversion programs to create a sub-conversion program or a sub-inverse conversion program. In addition, the user may edit the plurality of sub-conversion programs to create sub-conversion programs or sub-inverse conversion programs. The same applies to a case where a plurality of similar sub-conversion programs are stored in the storage unit 8 for the target level.

When the sub-conversion program or sub-inverse conversion program related to the similar problem for the target level is not stored in the storage unit 8 (NO in step S301), the user newly creates a sub-conversion program and a sub-inverse conversion program using the programming tool 34 (step S303). Note that when there is a process common to the existing sub-conversion program or sub-inverse conversion program regardless the similarity of the problem, the user may divert a part of the existing sub-conversion program or sub-inverse conversion program to create a sub-conversion program and a sub-inverse conversion program.

Note that a problem model related to the similar problem for the target level may be searched for by referring to the storage unit 8 when the sub-conversion program or sub-inverse conversion program related to the similar problem for the target level is not stored in the storage unit 8 (NO in step S301). Here, a criterion to be used for the problem similarity determination may be alleviated from that of step S301 to increase the probability that a problem model is extracted or the number of problem models to be extracted. An example of a method of alleviating the similarity determination criterion is a method of reducing the threshold of the similarity, but another method may be used. As a result, even when the sub-conversion program or sub-inverse conversion program related to the "similar" problem is not found, it is possible to increase the possibility that the user finds the problem model that can be referred to at the time of developing the sub-conversion program and the sub-inverse conversion program. When the problem model related to the similar problem or a problem model that can be used as a reference is found, the user can create the sub-conversion program and the sub-inverse conversion program while referring to information on the problem model, and thus, the burden on the development is reduced. That is, the development unit 3 may present at least one problem model to the user based on the similarity between the second problem (the real problem 80 that the user desires to solve) and the first problem (the real problem 80 for which the sub-conversion program or the sub-inverse conversion program has been created).

Note that there is also a case where the user determines that it is difficult to create the sub-conversion program and the sub-inverse conversion program without any change when referring to the found problem model described above. In this case, the user can use the modeling tool to edit the found problem model into a problem model further adapted to the second problem. Further, if any problem model related to the similar problem or any problem model that can be used as the reference is not found, the user can create a new problem model using the modeling tool.

Note that the programming tool 34 may include a program verification function. The program verification function enables the user to execute a program under development in each step of the development of the conversion program 41 and the inverse conversion program 42, compare an expected (correct) output with an obtained output, and test the program.

When the sub-conversion programs and the sub-inverse conversion programs can be created for all necessary levels, it can be said that the development of the conversion program 41 and the inverse conversion program 42 has been completed for a certain real problem 80. The user stores the created conversion program 41 and inverse conversion program 42 in the storage unit 8. Note that an access level may be set for the conversion program 41/inverse conversion program 42 (hereinafter, referred to as a program) created by each user. The access level may be set in accordance with an attribute of a third party.

For example, in a case where a certain user permits another user to use a program, the program created by the user is set to be accessible from the another user. That is, the user may set whether the program can be reused by the third party. In addition, each user may set a consideration for use when permitting another use (the third party) to reuse the program. An accelerator level may be determined based on a contract content of a user or the consideration paid by the user.

Figure 18:
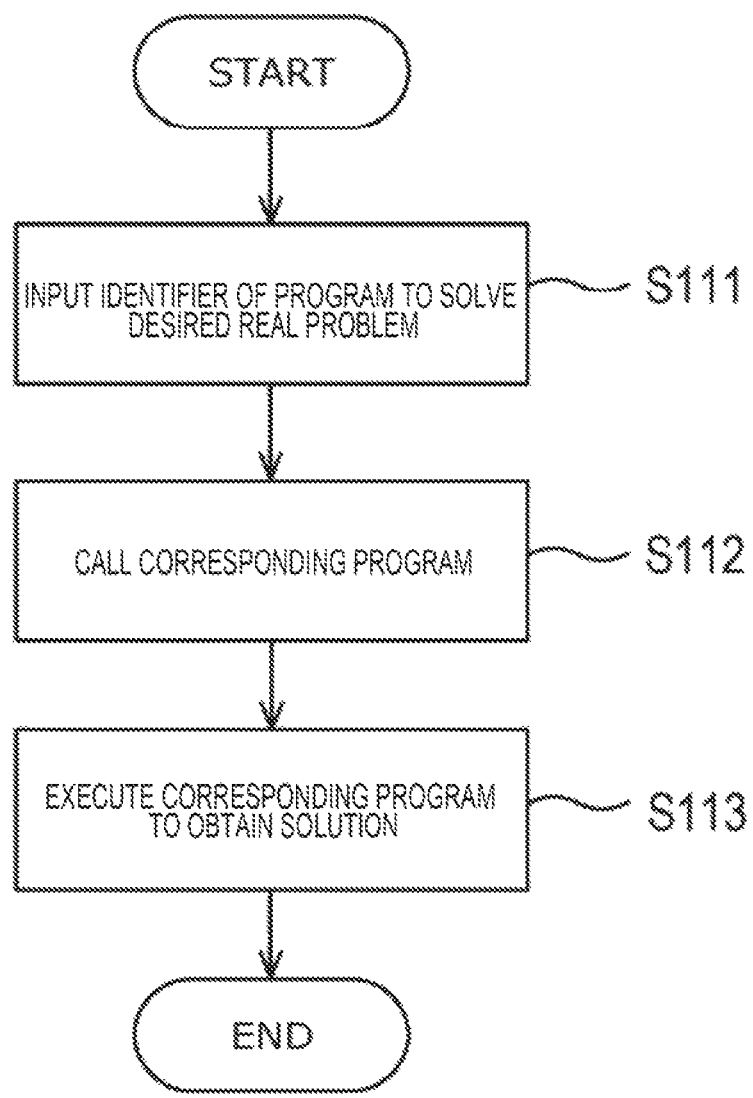
FIG. 18 is a flowchart illustrating an example of a process of executing a program in the information processing system.

FIG. 18 is a flowchart illustrating an example of a process of executing a program in the information processing system. Hereinafter, the process of executing a program in the information processing system according to the embodiment will be described with reference to FIG. 18.

First, a user inputs an identifier of a program to solve a desired real problem 80 (step S111). Note that the user may input a name and a use of the program instead of the identifier of the program. In this case, the name, use, and the like of the program are associated with the identifier of the program. Next, the information processing system calls a program corresponding to the input identifier (step S112). Then, the information processing system executes the corresponding program to obtain a solution (step S113).

Figure 19:
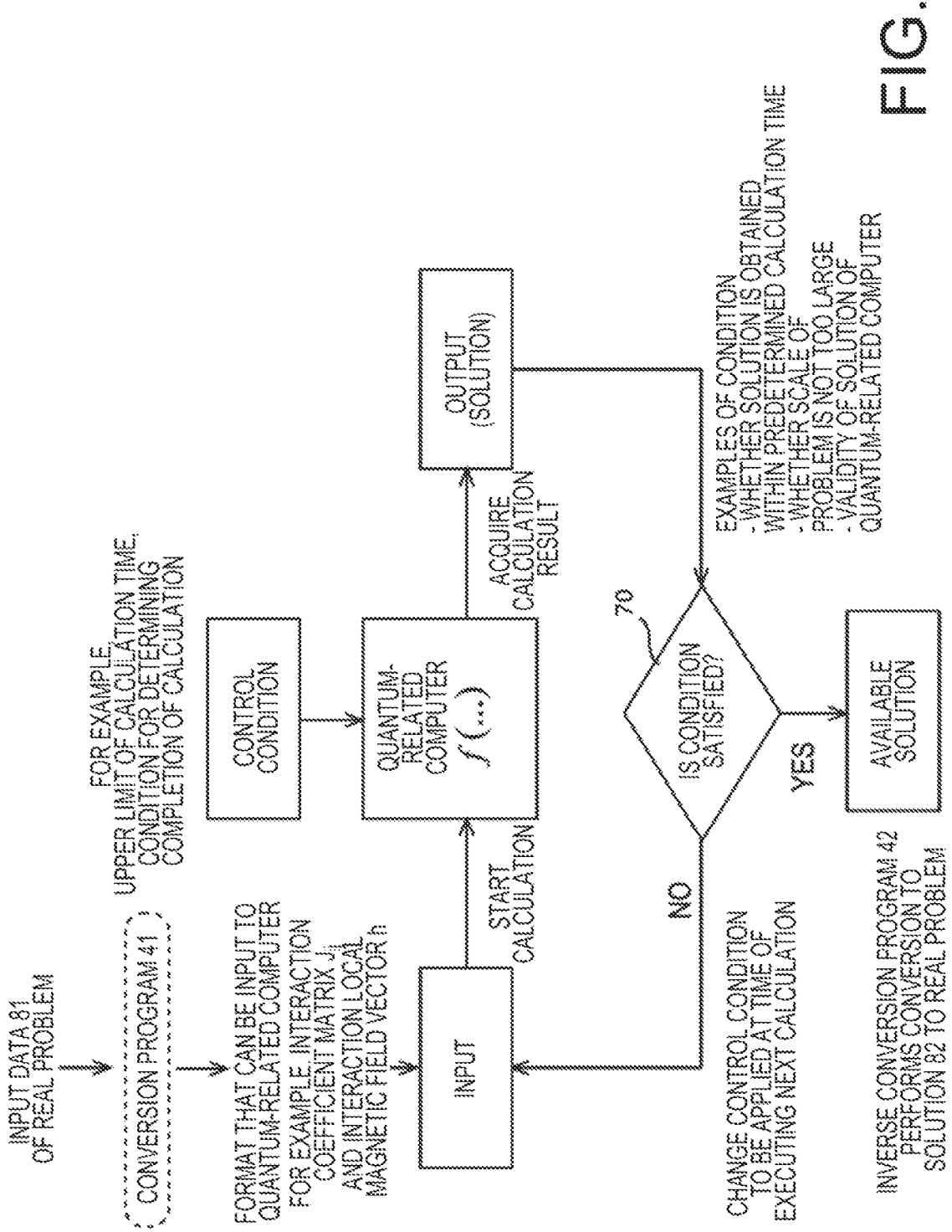
FIG. 19 is a diagram illustrating an example of a process of obtaining a solution to a problem using the information processing system.

FIG. 19 illustrates an example of a process of obtaining a solution to a problem using the information processing system. Hereinafter, the process will be described with reference to FIG. 19.

The conversion program 41 converts the input data 81 of the real problem into a data format that can be input to a quantum-related computer. For example, if the quantum-related computer is an Ising machine, the interaction coefficient $J_{ij}$ and the local magnetic field $h_i$ are input into the quantum-related computer. Then, the control unit 5 of the information processing device 1 causes the quantum-related computer to start calculation. At this time, the control unit 5 may control the quantum-related computer under a predetermined control condition. For example, the user may set upper limits of a calculation time, power usage, memory usage, and a use cost of the quantum-related computer. In this case, the control unit 5 stops a calculation process of the quantum-related computer when the upper limit of the calculation time is reached. In addition, the user may set a condition for determining that the calculation of the quantum-related computer is completed. In this case, the control unit 5 stops the calculation process of the quantum-related computer when the quantum-related computer satisfies the predetermined condition. Note that the user may stand by until the calculation of the quantum-related computer is completed without particularly setting any condition.

Note that the sub-conversion programs at the respective levels included in the conversion program 41 and the sub-inverse conversion programs at the respective levels included in the inverse conversion program 42 may have a function of designating an execution-time option or a parameter. In this case, when the user obtains a solution to the real problem 80, the user may designate a setting of the execution-time option or the parameter of the sub-conversion programs or sub-inverse conversion programs of at least some levels. As a result, even when a type of the quantum-related computer to be used for calculation is changed, the conversion program 41 or the inverse conversion program 42 can be optimized. The user can designate the execution-time option or the parameter of the sub-conversion program or sub-inverse conversion program at the low level by referring to information on the problem model at the high level. That is, the conversion unit 4 may be capable of designating a setting of the execution-time option or the parameter of the conversion program 41 or the inverse conversion program 42 at least some levels.

The above-described condition setting may be performed by the control script 51. The control script 51 may include information designating a quantum-related computer that executes calculation. The user may designate the quantum-related computer that executes calculation. The control script 51 may dynamically change an execution condition, such as the execution order, branching of processing, and the degree of parallelism, in accordance with an execution situation of the calculation. In addition, the control script 51 may have a function of acquiring necessary data in a case where data other than the real problem 80 is necessary for execution of the calculation. When the data necessary for execution of the calculation is not prepared, the control script 51 may cause the quantum-related computer to stand by. That is, the control unit 5 may cause the quantum-related computer to stand by until the condition set by the user is satisfied.

In addition, the control unit 5 may automatically select an available quantum-related computer. The control script 51 may designate a plurality of quantum-related computers as the quantum-related computer that executes calculation. At this time, the plurality of designated quantum-related computers are not necessarily of the same type. The control unit 5 may control at least any of the degree of parallelism, the execution order, and conditional branching of calculation processes performed by the plurality of quantum-related computers. The plurality of quantum-related computers execute at least a part of the solution-obtaining process for the common second problem. When the plurality of quantum-related computers execute calculation, the control script 51 may perform a process of selecting a solution calculated by any of the quantum-related computers based on a criterion designated by the user. The information processing device 1 may obtain the solution to the second problem based on the solution selected from at least any of solutions calculated by the plurality of quantum-related computers.

When the calculation by the quantum-related computer is ended or stopped, the control unit 5 acquires a calculation result from the quantum-related computer. Then, the control unit 5 confirms whether the calculation result satisfies the set condition. For example, the control unit 5 may determine whether the solution of the quantum-related computer has been obtained within a predetermined time. In addition, the control unit 5 may determine whether the scale of the problem input to the quantum-related computer is not too large based on the calculation result. The control unit 5 may verify the validity of the solution of the quantum-related computer. When the calculation result of the quantum-related computer satisfies the condition defined by the control script, the control unit 5 can determine that the calculation result is an available solution (determination 70).

When the control unit 5 determines that the calculation result of the quantum-related computer is the available solution (YES in determination 70), the inverse conversion program 42 may convert the calculation result of the quantum-related computer into the solution 82 to the real problem. When the control unit 5 determines that the calculation result of the quantum-related computer is not the available solution (NO in determination 70), the control unit 5 changes the control condition to be applied at the time of executing the next calculation.

For example, the control unit 5 may extend the upper limit of the calculation time of the quantum-related computer. In addition, the control unit 5 may change the condition for determining that the calculation of the quantum-related computer is completed. In addition, the control unit 5 may change the quantum-related computer that executes the next calculation. When a type of the quantum-related computer that executes the next calculation is changed, the low-level sub-conversion program (the L3 conversion program 41a) included in the conversion program 33 and the low-level sub-inverse conversion program (the L3 inverse conversion program 42b) included in the inverse conversion program 33 are replaced with each other. In addition, the number of quantum-related computers that execute the same calculation in parallel may be increased. The number of quantum-related computers that execute the calculation may be increased by dividing the problem. Note that the user may manually change the control condition to be applied at the time of executing the next calculation.

Then, the control unit 5 causes the quantum-related computer to re-execute the calculation based on the changed control condition. The control unit 5 causes the quantum-related computer to repeatedly execute the calculation until a solution that satisfies the condition is obtained (YES in determination 70). That is, the control unit 5 may cause the quantum-related computer to perform a solution-obtaining operation until the solution satisfying the condition set by the user is obtained.

A hardware configuration of a computer will be described hereinafter. Examples of the computer include a server, a client terminal, a microcomputer of embedded equipment, a tablet, a smartphone, a feature phone, and a personal computer. However, a function of the computer may be realized by a virtual machine (VM), a container, or the like.

Figure 20:
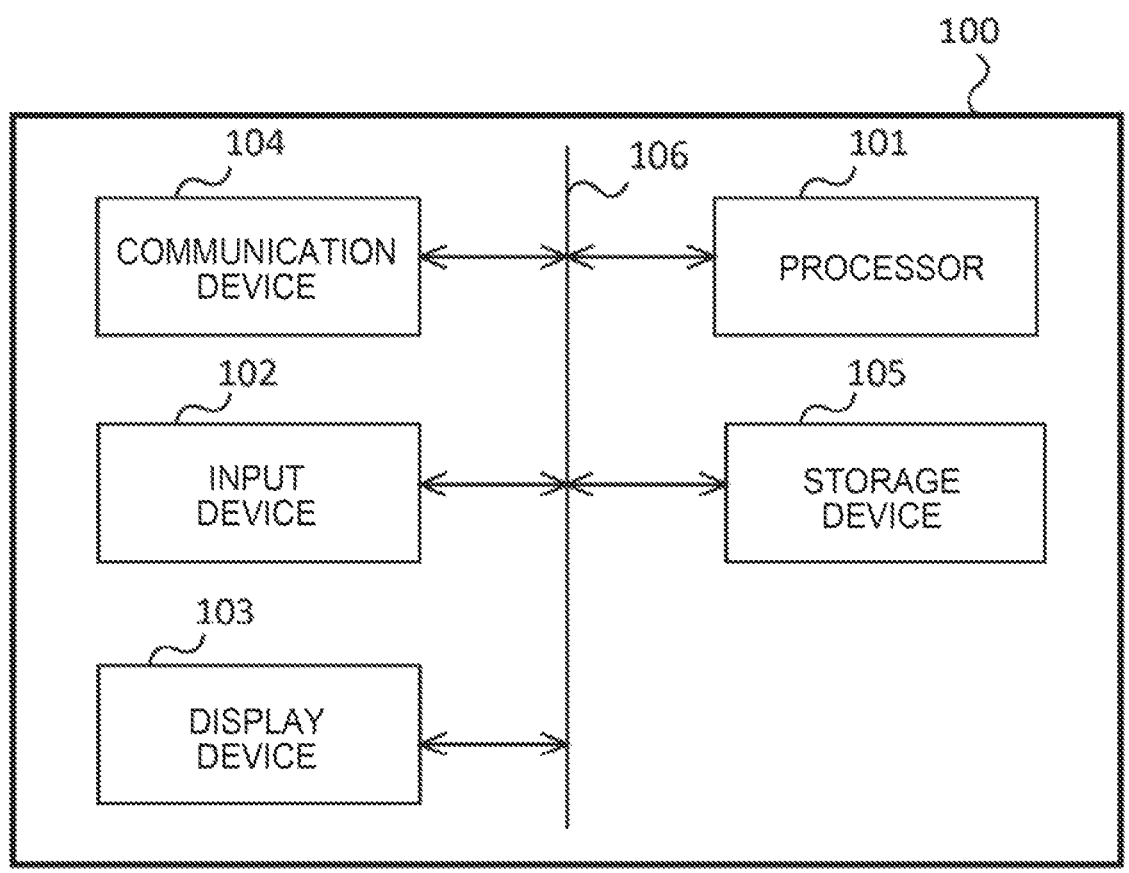
FIG. 20 is a block diagram illustrating a configuration example of a computer.

FIG. 20 is a diagram illustrating an example of a computer 100. The computer 100 in FIG. 20 includes a processor 101, a n input device 102, a display device 103, a communication device 104, and a storage device 105. The processor 101, the input device 102, the display device 103, the communication device 104, and the storage device 105 a re mutually connected by a bus 106.

The processor 101 is an electronic circuit which includes a control device and an operational device of the computer 100. As the processor 101, for example, a general-purpose processor, a central processing unit (CPU), a microprocessor, a digital signal processor (DSP), a controller, a microcontroller, a state machine, an application-specific integrated circuit, a field programmable gate array (FPGA), a programmable logic circuit (PLD), or a combination thereof may be used.

The processor 101 performs operational processing based on data and a program input from the respective devices (for example, the input device 102, the communication device 104, the storage device 105) connected thereto via the bus 106, and outputs an operational result and a control signal to the respective devices (for example, the display device 103, the communication device 104, and the storage device 105) connected thereto via the bus 106. Specifically, the processor 101 executes an operating system (OS) of the computer 100, a program, and the like, and controls the respective devices included in the computer 100.

The functions of the information processing device 1 or some types of quantum-related computers can be implemented in the computer 100 by using the program. The program is stored in a non-transitory tangible computer-readable storage medium. Examples of the above-described storage medium include an optical disk, a magneto-optical disk, a magnetic disk, a magnetic tape, a flash memory, and a semiconductor memory, but are not limited thereto. When the processor 101 executes the program, the computer 100 can provide the functions of the information processing device 1 or some types of quantum-related computers.

The input device 102 is a device configured to input information to the computer 100. Examples of the input device 102 include a keyboard, a mouse, and a touch panel, but the embodiment is not limited thereto. The user can perform various operations on the information processing system 10 by using the input device 102.

The display device 103 is a device configured to display an image and a video. Examples of the display device 103 include a liquid crystal display (LCD), a cathode-ray tube (CRT), an organic electroluminescence (EL) display, a projector, an LED display, and the like, but are not limited thereto. The display device 103 may display an operation screen of the information processing device 1, a calculation execution result of the quantum-related computer, and the like.

The communication device 104 is a device used by the computer 100 to communicate with an external device in a wireless or wired manner. Examples of the communication device 104 include a network interface card (NIC), a communication module, a modem, a hub, a router, and the like, but are not limited thereto. For example, the computer 100 may acquire the calculation result of the quantum-related computer via the communication device 104. In addition, in a case where the computer 100 (information processing device 1) is a server or the like installed in a data center or a machine room, the computer 100 may receive a command transmitted from a remote information communication terminal via the communication device 104, or may display a content of screen display on the remote information communication terminal.

The storage device 105 is a storage medium that stores the OS of the computer 100, a program, data necessary for execution of the program, data generated by executing the program, and the like. The storage device 105 includes a main storage device and an external storage device. Examples of the main storage device include a RAM, a DRAM, and an SRAM, but the embodiment is not limited thereto. In addition, examples of the external storage device include a hard disk, an optical disk, a flash memory, a magnetic tape, and the like, but the embodiment is not limited thereto. The problem type data 54, the pattern set 55$a$, the machine type data 55$b$, the program tables of the respective levels, data of the sub-conversion programs at the respective levels, data of the sub-inverse conversion programs at the respective levels, data of the modeling tools at the respective levels, data of the problem models at the respective levels, and data of the programming tool 34 may be stored in the storage device 105 or may be stored on an external server or storage.

Note that the computer 100 may include one or a plurality of processors 101, one or a plurality of input devices 102, one or a plurality of display devices 103, one or a plurality of communication devices 104, and one or a plurality of storage devices 105. In addition, a peripheral device, such as a printer and a scanner, may be connected to the computer 100.

The information processing device 1 and some types of quantum-related computers may be configured using the single computer 100 or may be configured using an information system in which a plurality of the computers 100 are connected to each other.

Further, the program may be stored in advance in the storage device 105 of the computer 100, may be stored in a storage medium outside the computer 100, or may be uploaded on the Internet. In any case, the functions of the information processing device or the Ising machine according to each of the above-described embodiments can be realized by installing and executing the program in the computer 100.

Second Embodiment

The information processing system according to the first embodiment supports solving the real problem that can be described as the combinatorial optimization problem using the quantum-related computer. In a second embodiment, an information processing system with enhanced applicability to the complexity of the real world will be described. Hereinafter, the information processing system according to the second embodiment will be described focusing on constituent elements and functions added to the constituent elements common to the first embodiment (for example, FIGS. 1, 2, and 9). A solution may be obtained using a QUBO solver similarly to the information processing system according to the first embodiment. When the solution is obtained by the QUBO solver, a quantum-related computer in the following description can be replaced with the QUBO solver.

A real problem that can be described as a combinatorial optimization problem ranges in a wide variety of fields in the real world such as, for example, finance, logistics, transportation, life science, chemistry, design, and manufacture. The application of a quantum-related computer to each field is expected to solve various social problems and promote the progress of science and technology. The quantum-related computer can be applied to solve problems in a vast number of fields while reflecting the complexity of the real world. Therefore, it is necessary to convert each of problems of a plurality of patterns in each field into a data format that can be input to the quantum-related computer. In addition, a user (especially, a developer of an application program (definition thereof will be described later) for each field needs to determine which type of combinatorial optimization problem (for example, a Hamiltonian path problem, a minimum path problem, a satisfiability problem, a knapsack problem, or the like) is used to model a problem. Not only knowledge related to the quantum-related computer and combinatorial optimization but also experience and know-how specific to each field are required in order to determine a method for modeling a problem and a method for converting a problem. It is required to facilitate the design of a program corresponding to each field in order to promote the utilization of the quantum-related computer.

Each of an organism (including a person), an object, an organization (for example, a team, a project, or a company), a community (for example, a village, a city, a region, or a country), a device (for example, an electronic circuit or a machine), a scheme (for example, a business plan), a product, and a service in the real world can be interpreted as a single system. The respective systems in the real world are mutually dependent and mutually affected. Therefore, it can be said that the real world forms one complex system including individual systems coupled to each other. For example, an operation/state of one system at any time or location sometimes affects an operation/state of another system. In addition, an operation/state of one system at any time or location may depend on an operation/state of the same system or another system at another time or location.

For this reason, it can be said that it is preferable to develop a program reflecting the dependency relationship and influence relationship between the systems in the real world, construct a service, and operate the service in order to improve the quality/performance of the service using the quantum-related computer and improve the convenience of the user.

Here, the service represents a service at least a part of which is realized by the information communication technology (for example, a program executed on a computer) and supports the life or business of the user. The service may be provided by the information processing system 10 including the quantum-related computer, or may be provided by another information processing system or computer. That is, it is assumed that a case of mentioning the "service" hereinafter includes both a service provided using the quantum-related computer and a service provided without using the quantum-related computer. In addition, a program used to provide the service is referred to as an application program. The application program providing the service using the quantum-related computer includes, for example, a process of converting a problem to be solved by the service into a data format that can be input to the quantum-related computer using the conversion program 41 in FIG. 2, a process of causing the quantum-related computer to calculate a solution, and a process of converting the solution calculated by the quantum-related computer into a solution to the problem using the inverse conversion program 42.

The service may be provided by one program. In addition, the service may be realized by a combination of a plurality of programs. For example, the service may be realized by a combination of programs respectively operating in a plurality of computers. For example, the service may be provided by a combination of a program operating on the information processing device 1, a program operating on a quantum computer, and a program operating on a server. However, the computer on which the application program is executed and the combination of the computers are not particularly limited.

Figure 21:
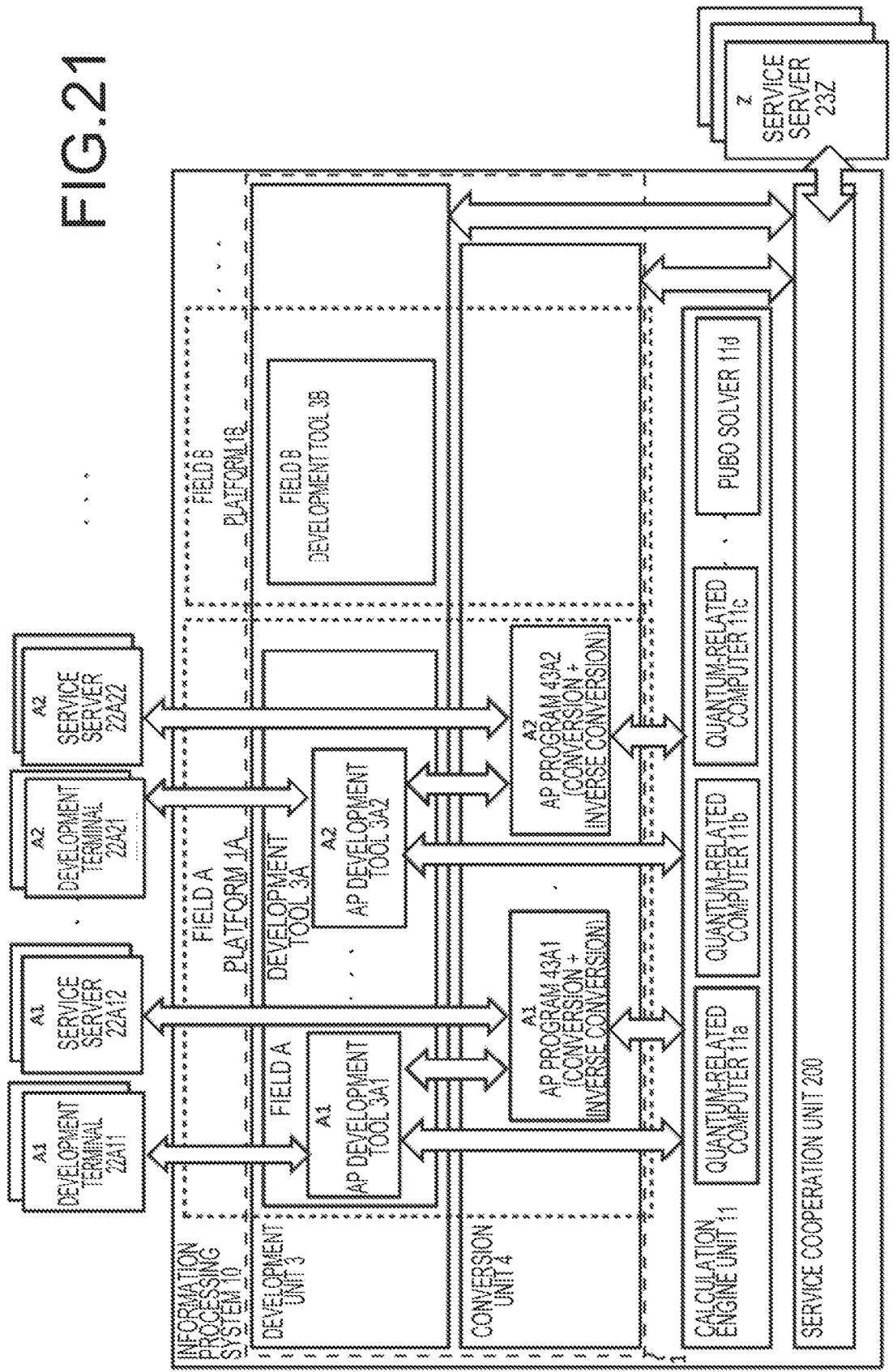
FIG. 21 is a block diagram illustrating a configuration example of the information processing system corresponding to a plurality of fields.
Figure 22:
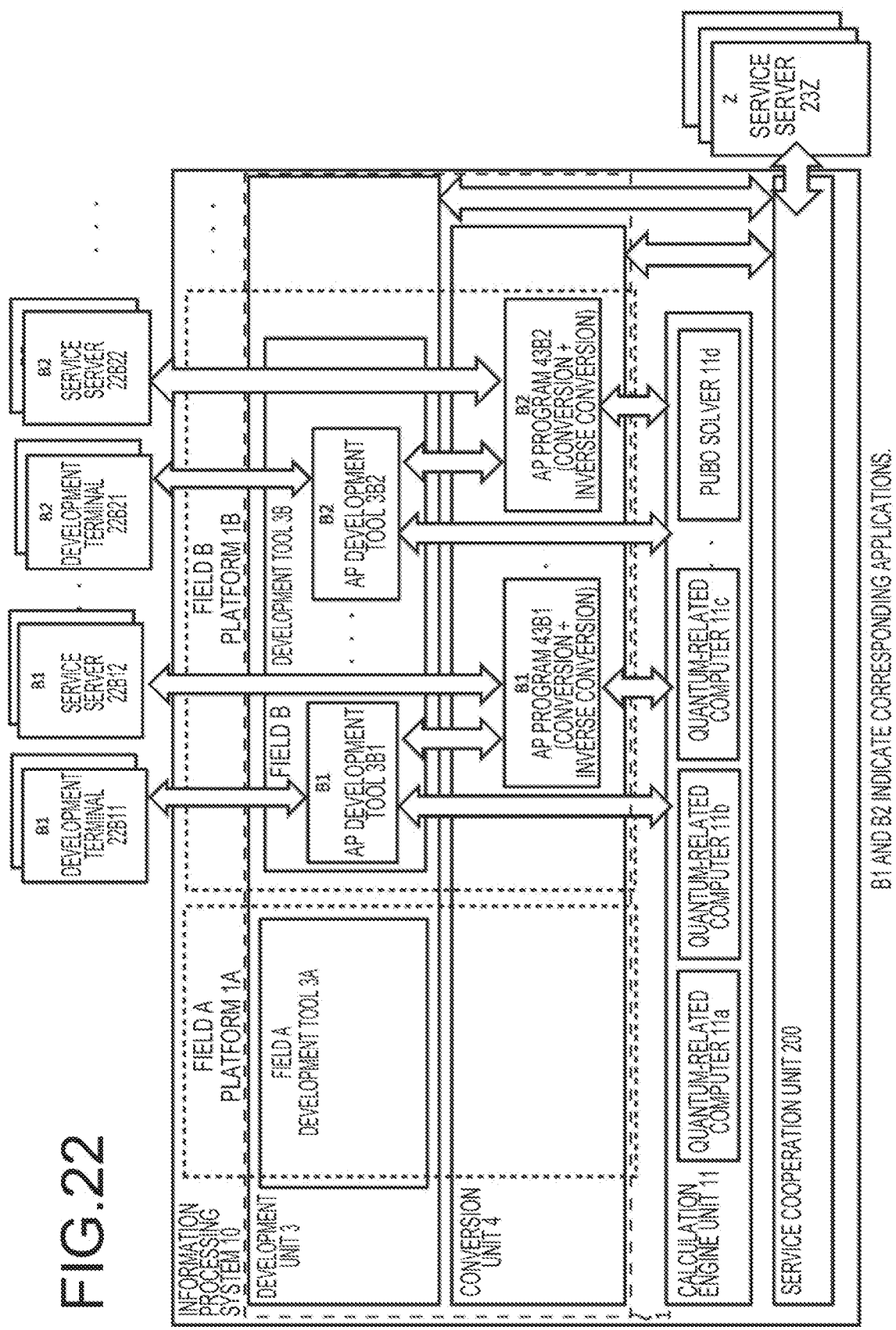
FIG. 22 is a block diagram illustrating the configuration example of the information processing system corresponding to the plurality of fields.

FIGS. 21 and 22 are block diagrams illustrating a configuration example of an information processing system corresponding to a plurality of fields. An information processing system 10 includes an information processing device 1. The information processing device 1 includes a development unit 3 and a conversion unit 4, and supports development of a service using a quantum-related computer. The development unit 3 executes an application development tool that supports development of application programs each of which provides at least any service. The conversion unit 4 executes at least one application program. The application program may provide one service. In addition, one application program may provide a plurality of services.

The application development tool includes at least one modeling tool and at least one programming tool. The modeling tool supports the user in creating at least one problem model corresponding to the service. The programming tool supports the user in designing the application program based on the problem model. The modeling tool executed by the development unit 3 may enable the user to describe, in stages, a plurality of problem models corresponding to different levels of a problem (target to be solved by the service) similarly to the first embodiment. In addition, the programming tool executed by the development unit 3 may enable the user to design a conversion program based on the plurality of problem models corresponding to different levels. In addition, the modeling tool executed by the development unit 3 may include a higher-level modeling tool and a low-level modeling tool. The high-level modeling tool enables the user to describe a high-level problem model in a high-level expression format. The low-level modeling tool enables the user to describe a low-level problem model in a low-level expression format.

The application program includes at least one conversion program and at least one inverse conversion program. The conversion program converts the problem, which is the target to be solved by the provided service, into a data format that can be input to the quantum-related computer. The inverse conversion program converts a solution of the quantum-related computer calculated for the problem into a solution to the problem. There is a case where a plurality of types of problems serve as targets to be solved by one service. In addition, there is also a case where the application program provides a plurality of services, and at least one problem is solved by each of the services. In these cases, the application program may include a plurality of combinations of a conversion program 41 and an inverse conversion program 42 respectively corresponding to the plurality of types of problems.

The information processing system 10 includes one or more platforms each of which is adapted to a certain field of the real world. The fields of the real world can be divided into a wide range of business areas to which the quantum-related computer is applied, such as financial business (for example, Fintech), genome-related business, logistics business, and transportation business. In FIGS. 21 and 22, a platform 1A for a field A and a platform 1B for a field B are illustrated. The field A is the financial business and the field B is the genome-related business. However, this method for classifying the fields is merely an example, and does not preclude use of different classification. In addition, the two platforms are illustrated in FIGS. 21 and 22, but the number of platforms may be more than this.

Each of the platforms 1A and 1B is realized by using functions of the development unit 3 and the conversion unit 4 of the information processing device 1 associated with the corresponding field. It is assumed that each platform related to each field includes at least one service. In FIG. 21, symbols A1 and A2 are illustrated at the tops of blocks indicating constituent elements. Symbols A1 and A2 indicate services associated with the corresponding constituent elements, respectively. For example, it is assumed that a service A1 is an exchange traded fund (ETF) service, and a service A2 is a high-frequency trading (HFT) service. However, the services A1 and A2 may be services different from these services.

Similarly, in FIG. 22, symbols B1 and B2 are illustrated at the tops of blocks indicating constituent elements. Symbols B1 and B2 also services associated with the corresponding constituent elements, respectively. For example, a service B1 is a genome analysis service, and a service B2 is a genome medical insurance service. However, the services B1 and B2 may be services different from these services. Note that each of FIGS. 21 and 22 illustrates the two services, but each platform may include the number of services different from this.

An external information processing device (for example, an information terminal such as a client machine 22 or a server of an external information processing system 23) can access the platforms 1A and 1B, develop the services related to the respective fields, and provide the respective services. FIG. 21 illustrates development terminals 22A11 and 22A21, and service servers 22A12 and 22A22. On the other hand, FIG. 22 illustrates development terminals 22B11 and 22B21 and service servers 22B12 and 22B22.

The development terminal 22A11 and the service server 22A12 may be used by a business operator that operates the service A1. Similarly, the development terminal 22A21 and the service server 22A22 may be used by a business operator that operates the service A2. The development terminal 22B11 and the service server 22B12 may be used by a business operator that operates the service B1. Similarly, the development terminal 22B21 and the service server 22B22 may be used by a business operator that operates the service B2. However, when business operators that develop and operate a service are different, a development terminal and a service server corresponding to the same service may be used by the different business operators.

A user (for example, a developer of each of application programs related to the services A1, A2, B1, and B2) develops the conversion programs 41 and the inverse conversion programs 42 used by the respective services by using the development terminals 22A11, 22A21, 22B11, and 22B21. As described in the first embodiment, the user can create a problem model using a modeling tool at each level, and design (code) corresponding conversion program and inverse conversion program. The service servers 22A12, 22A22, 22B12, and 22B22 perform front-end processing of the corresponding services, for example. However, a content of processing executed by the service server is not particularly limited. Note that the service server is not necessarily installed in order to provide each service.

The development unit 3 of the information processing device 1 provides services belonging to the field A and the field B or a group of tools necessary for the services A1, A2, B1, and B2. The group of tools includes a programming tool 34 and modeling tools at the respective levels of FIG. 2. In addition, the conversion unit 4 of the information processing system 10 executes the conversion program 41 and the inverse conversion program 42 used by the services belonging to the field A and the field B or the services A1, A2, B1, and B2.

A development tool 3A included in the platform 1A provides a development environment (for example, the modeling tools and the programming tool of FIG. 2) corresponding to the field A (financial business). In addition, a development tool 3B included in the platform 1B provides a development environment (for example, the modeling tools and the programming tool of FIG. 2) corresponding to the field B (genome-related business). Some (for example, a library, a module, a program, and data) of the development tools 3A and 3B may be common. However, at least some of the development tools 3A and 3B are different. A different part of the development tool enables design of an application program (for example, a conversion program an inverse conversion program at each level) that executes processing specific to each field.

For example, at least any of the number of levels of a modeling tool included in the development tool, the number of levels of a programming tool, a type of a combinatorial optimization problem (of a problem model) generated by the modeling tool, a type of a sample or a template of the problem model that can be referred to by the modeling tool, a function of the modeling tool, a function of the programming tool, a type of a programming language that can be used by the programming tool, a conversion program or an inverse conversion program that can be referred to by the programming tool may be different depending on a corresponding field.

The user can access the development tools 3A and 3B via the above-described development terminals and create services in the respective fields, the conversion programs and inverse conversion programs included in the application programs that provide the services, and the problem models.

The information processing device 1 may include an application program development tool (referred to as AP development tool) corresponding to a more specific service as a sub-set or an option configuration of the development tool related to each field. For example, an AP development tool 3A1 in FIG. 21 provides a development environment corresponding to the service A1 (ETF service). In addition, an AP development tool 3A2 provides a development environment corresponding to the service A2 (HFT service). An AP development tool 3B1 in FIG. 22 provides a development environment corresponding to the service B1 (genome analysis service). In addition, an AP development tool 3B2 provides a development environment corresponding to the service B2 (genome medical insurance service). Here, each of the development environments (AP development tools) includes the modeling tools and the programming tool of FIG. 2. The AP development tool supports development of an application program that provides any service.

The plurality of AP development tools may have a common part. In addition, it is assumed that at least some of the plurality of AP development tools are different in order to implement processing specific to each service (application program). Examples of a different part of the AP development tool include the number of levels of a modeling tool included in the development tool, the number of levels of a programming tool, a type of a combinatorial optimization problem (of a problem model) generated by the modeling tool, a type of a sample or a template of the problem model that can be referred to by the modeling tool, a function of the modeling tool, a function of the programming tool, a type of a programming language that can be used by the programming tool, a conversion program or an inverse conversion program that can be referred to by the programming tool.

The user can access the AP development tools 3A1, 3A2, 3B1, and 3B2 via the development terminals and create the respective services, the conversion program and inverse conversion programs used by the services, and the problem models.

The conversion unit 4 of information processing system 10 includes application programs (hereinafter, abbreviated as AP programs as necessary) 43A1, 43A2, 43B1, and 43B2 for the services A1, A2, B1, and B2. The AP programs 43A1, 43A2, 43B1, and 43B2 include the conversion programs 41 and the inverse conversion programs 42 corresponding to the services A1, A2, B1, and B2, respectively. That is, the AP program is a program used to provide any service. The conversion program 41 and the inverse conversion program 42 used by each of the services are created using the corresponding AP development tool.

Each of the AP programs converts a problem, which is a target to be solved by a service (corresponding to the real problem in the first embodiment), into a data format that can be input to a quantum-related computer, and causes the quantum-related computer to calculate a solution to the problem. In addition, each of the AP programs converts a solution calculated by the quantum-related computer into the solution to the problem which is the target to be solved by the service. For example, in FIGS. 21 and 22, a calculation engine unit 11 includes quantum-related computers 11a, 11b, and 11c, and a PUBO solver 11d. The service servers 22A12, 22A22, 22B12, and 22B22 can access the AP programs 43A1, 43A2, 43B1, and 43B2, respectively, and obtain solutions to problems which are targets to be solved by the corresponding services. As a result, each of the service servers can use the solution to the problem in the provided service. Note that, instead of the service server, the application program executed by the conversion unit 4 may use the solution to the problem in the provided service.

A service cooperation unit 200 of the information processing device 1 realizes cooperation between the plurality of services at the time of developing the AP programs and at the time of operating the services (at the time of executing the AP programs). Here, the cooperation between the services means that data is exchanged between the plurality of services. The data to be exchanged also includes data obtained by processing data supplied from a certain service. The service cooperation unit 200 is, for example, a constituent element of the information processing device 1, and is realized by a program executed on a processor. However, at least some of functions of the service cooperation unit 200 may be implemented by a hardware circuit. In addition, a computer that executes processing of the service cooperation unit 200 may be prepared separately from the information processing device 1. In this case, the computer corresponds to the service cooperation unit 200.

Figure 23:
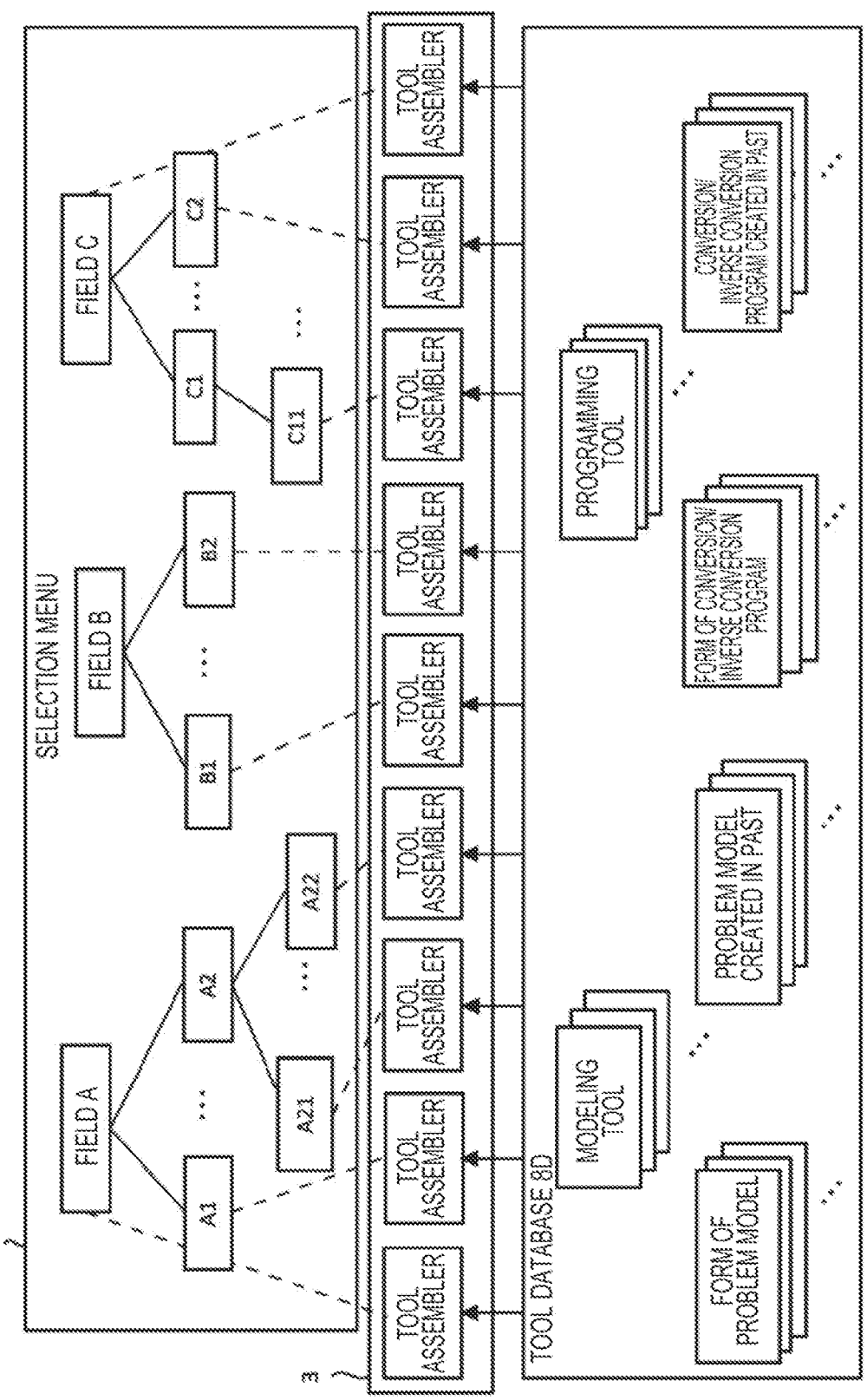
FIG. 23 is a diagram illustrating configuration examples of a selection menu and a tool database.

FIG. 23 illustrates configuration examples of a selection menu and a tool database. A selection menu 22M in FIG. 23 is displayed on displays of the development terminals 22A11, 22A21, 22B11, and 22B21, for example. The selection menu 22M includes a plurality of boxes in a hierarchical structure. At a first level of the hierarchical structure, boxes corresponding to fields A, B, and C are arranged. At a level below the boxes indicating the fields, boxes of services belonging to the respective fields are arranged. At a second level, boxes of services A1, A2, B1, B2, C1, and C2 are arranged. At a third level, boxes of services A21, A22, and C11 are arranged. The user of the development terminal can select a tool and data to be used for development of the AP program by clicking any box displaying a field name or a service name. The structure of the selection menu 22M is merely an example. Therefore, the development tool may be selected using an interface different from this.

When any box in the selection menu 22M is clicked, a tool assembler associated with the box refers to a tool database 8D and extracts a combination of the tool and data to be used. A function of the tool assembler is implemented in, for example, a program executed by the development unit 3.

The tool database 8D includes, for example, tools and data such as a modeling tool, a programming tool, a problem model sample, an existing problem model, a conversion program sample, an inverse conversion program sample, an existing conversion program, and an existing inverse conversion program. The tool database 8D is stored in a storage unit 8 of the information processing device 1, for example. However, the tool database 8D may be stored in another place such as an external storage.

For example, the tool database 8D may include a plurality of modeling tools with different levels, fields, functions, corresponding services, corresponding combinatorial optimization problems. In addition, the tool database 8D may include a plurality of programming tools with different levels, fields, functions, corresponding services, and available programming languages. Similarly, the tool database 8D may include a plurality of types of problem model samples, existing problem models, conversion program samples, inverse conversion program samples, existing conversion programs, and existing inverse conversion programs.

Since an optimal combination of a tool and data varies depending on a field to which a service belongs and a type of the service, different combinations of tools and data are extracted by the tool assembler depending on clicked boxes. Note that the function of the tool assembler may be included in the modeling tool and the programming tool executed by the development unit 3.

Figure 24:
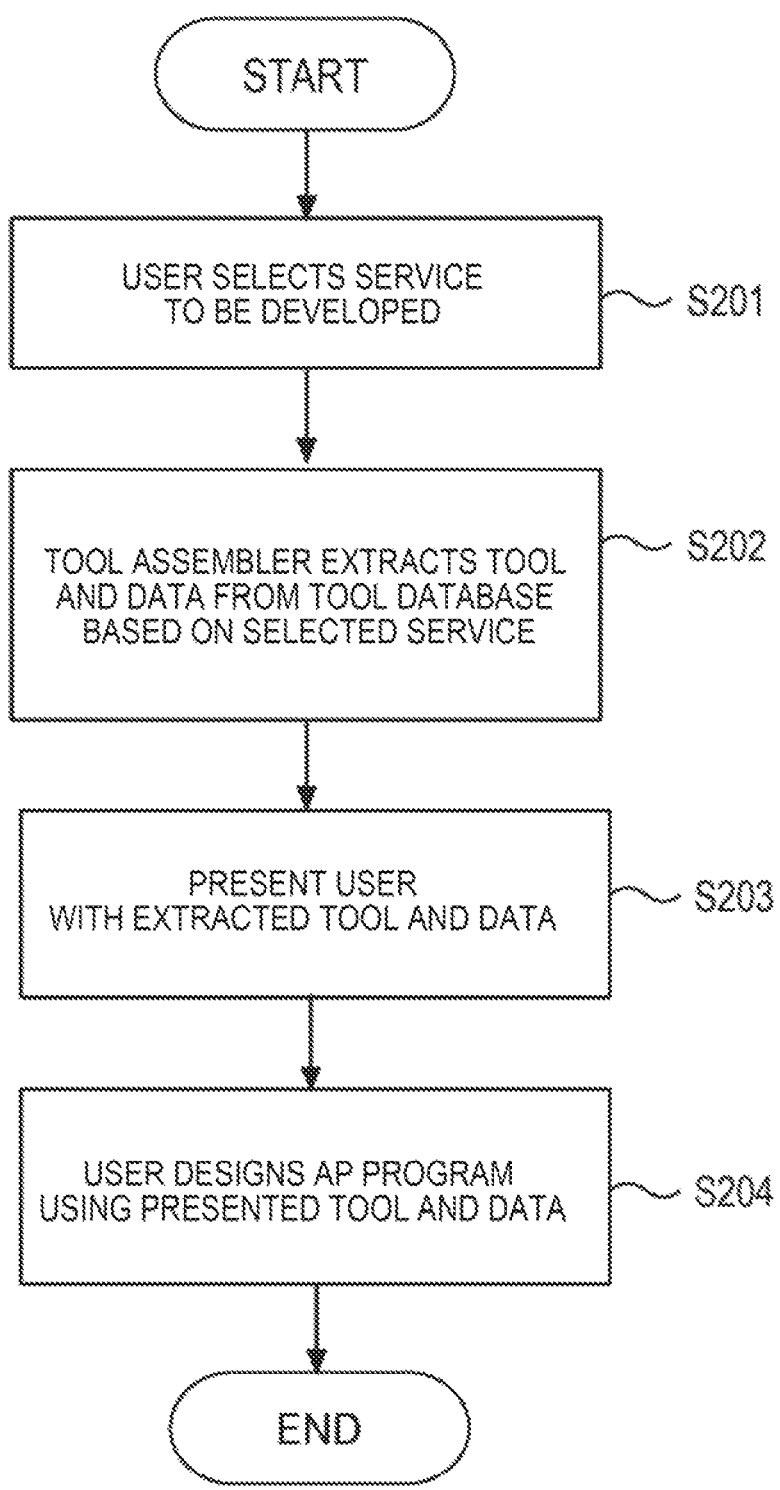
FIG. 24 is a flowchart illustrating an example of selection of a tool and data in accordance with a service to be developed.

FIG. 24 is a flowchart illustrating an example of selection of a tool and data in accordance with a service to be developed. Hereinafter, processing will be described with reference to FIG. 24.

First, the user selects a service to be developed (step S201). In step S201, a field to which the service belongs may be selected, or a type of the service may be selected. Although the service selection can be performed using the selection menu 22M in FIG. 23, the selection may be performed using another interface. Then, the tool assembler extracts corresponding tool and data from the tool database 8D based on the service selected by the user (step S202).

Next, the development unit 3 presents the extracted tool and data to the user (step S203). For example, the extracted tool and data may be displayed on a display of the client machine 22 used by the user as a tool and data which are available in development. However, the extracted tool and data may be presented by another method. Then, the user designs an application program using the presented tool and data (step S204).

That is, the modeling tool executed by the development unit 3 may select at least one problem model sample or at least one existing problem model from among a plurality of problem model samples or a plurality of existing problem models in accordance with the service to be developed by the user, and present the selected one to the user. In addition, the programming tool executed by the development unit 3 may select at least one conversion program sample, at least one inverse conversion program sample, at least one existing conversion program, or at least one existing inverse conversion program from among a plurality of conversion program samples, a plurality of inverse conversion program samples, a plurality of existing conversion programs, or a plurality of existing inverse conversion programs in accordance with the service to be developed by the user, and present the selected one to the user.

Figure 25:
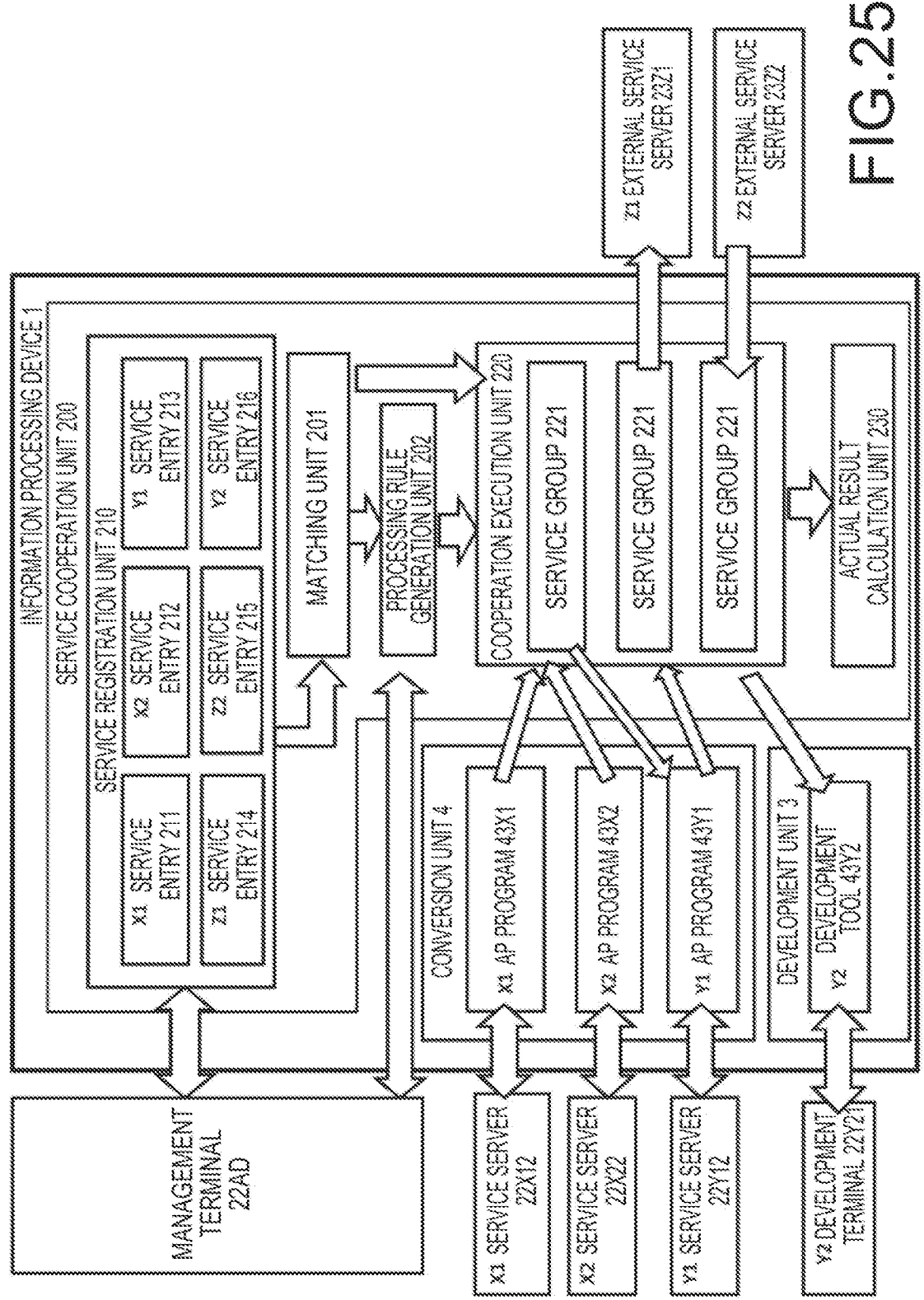
FIG. 25 is a block diagram illustrating a configuration example of a service cooperation unit.

FIG. 25 illustrates a configuration example of the service cooperation unit. FIG. 25 illustrates a configuration example of the information processing device 1 including the development unit 3, the conversion unit 4, and the service cooperation unit 200. The service cooperation unit 200 includes a service registration unit 210, a matching unit 201, a processing rule generation unit 202, a cooperation execution unit 220, and a result calculation unit 230. For example, the user can access the service cooperation unit 200 using a management terminal 22AD and perform various settings. Examples of the management terminal 22AD include an information terminal such as the client machine 22 in FIG. 1.

The user can access the service registration unit 210 of the service cooperation unit 200 and register information of services (referred to as service entries) that perform data exchange. The service entries are stored in the storage unit 8 of the information processing device 1, for example. However, the service entries may be stored in an external storage, and a place where the service entries are stored is not particularly limited.

The service entry includes, for example, the following fields.

(a) Service ID
(b) Data reception flag
(c) Data supply flag
(d) Reception data information
(e) Supply data information The service ID in (a) described above includes information for identifying a service. As the service ID, for example, a name of an AP program that provides the service, a host name of a server that executes at least a part of the AP program, or the like can be used. However, a service ID in another format may be used. The flag in (b) described above indicates whether a corresponding service uses data provided from another service or data obtained by processing the data. Data received from the outside by a service is referred to as reception data.

The flag in (c) described above indicates whether a corresponding service supplies data to another service. The reception data information in (d) described above indicates at least any of a content, a format (a combination of data items), or a condition of data that can be received by a corresponding service. In addition, the supply data information in (e) described above indicates at least any of a content, a format (a combination of data items), or a condition of data (supply data) that can be supplied to another service by a corresponding service. The conditions in the fields of (d) and (e) may include information on a consideration for data exchange. The information on the consideration may include at least any of an upper limit of the consideration, a lower limit of the consideration, or a range of the consideration. In addition, the conditions in the fields of (d) and (e) may include information on a period in which data is exchanged. For example, a specific time zone, day of the week, month, or season may be designated as the period in which data is exchanged. As a result, a certain service can exchange data with a different service depending on time.

A service that receives data from another service can use the reception data to specify a condition of a problem. The service may determine a coefficient of an objective function in the problem using, for example, the reception data. In addition, the service may also use the reception data to specify a constraint condition of the problem. Methods of using the reception data described herein are only examples. Therefore, the service may use the reception data for a different purpose.

A certain service can pass an obtained optimal solution of a problem to another service as the supply data. For example, a case is considered in which there are a first portfolio optimization service and a second portfolio optimization service. When a portfolio having a larger scale than that of the former service is proposed by the latter service by combining a plurality of financial products, an optimal solution obtained by the former service can be used as a condition of a problem in the latter service.

The service entry may further include the following fields.

(f) Industry Information
(g) Area information
(h) Priority matching information
(i) Matching avoidance information
(j) Pricing information The field of (f) described above includes a field to which a corresponding service belongs or a content of the service to be provided. In addition, the field of (g) described above includes information on a country, a region, a municipality, and an area which are targets of the corresponding service. The field of (h) specifies a service that preferentially supplies data to the corresponding service or a service that preferentially receives data supplied from the corresponding service. In addition, the field of (i) described above specifies a service that needs to avoid data exchange with the corresponding service. The field of (i) can be used, for example, in a case where it is difficult to exchange data with a specific service due to a law or a contract. In the fields of (h) and (i), the service may be specified in a format of the field of (f) or (g). In addition, the fields of (h) and (i) may include the service ID in (a).

The field of (j) includes information specifying a consideration for data exchange in a case where data exchange is performed for a fee. The consideration may be designated by, for example, a unit price of time, and the consideration may be designated depending on a size of data or the number of pieces of data. In addition, the consideration is not limited to a usage-based system, and may be designated by another method. Note that the data exchange between services may be performed free of charge, and a content of the consideration for the data exchange and the presence or absence of the consideration are not particularly limited.

The above-described fields of the service entry are merely examples. Therefore, the service entry does not necessarily include all of the above-described fields. In addition, the service entry may include another field. For example, the service entry may have a field including information on a scale of a service. The scale of the service is specified by, for example, the number of pieces of data, the number of subscribers of the service, the number of subscriptions, the number of accesses, and the number of servers. However, the scale of the service may be specified by a method different from this. For example, it is possible to set, as a requirement, that a cooperation destination service is larger than a certain scale in cooperation between services.

For a service for which the service entry has been registered, data can be exchanged with another service. Note that the user can update a content of the field of the service entry via the management terminal 22AD even after the registration of the service entry.

In the example of FIG. 25, service entries 211 to 216 are registered by the service registration unit 210. The service entries 211 to 216 correspond to services X1, X2, Y1, Z1, Z2, and Y2, respectively. Note that symbols of services corresponding to the respective constituent elements are described in FIG. 25. For example, the service X1 is provided by a program executed by a service server 22X12 and an AP program 43X1. In addition, the service X2 is provided by a program executed by a service server 22X22 and an AP program 43X2. The service Y1 is provided by a program executed by a service server 22Y12 and an AP program 43Y1. However, the service may be provided without using the program executed by the service server.

Solutions of problems converted by the AP programs 43X1, 43X2, and 43Y1 of the conversion unit 4 are calculated by the quantum-related computer (not illustrated in FIG. 25). In addition, the AP programs 43X1, 43X2, and 43Y1 of the conversion unit 4 convert the solutions calculated by the quantum-related computer into solutions to problems (the real problem 80 in the first embodiment) to be solved by the services.

A development tool 43Y2 of the development unit 3 is used for development of the service Y2 and includes a data exchange function. The data exchange function may be implemented in at least any of a modeling tool and a programming tool. In addition, a tool that performs data exchange may be separately prepared. A service developer may proceed with development of his/her own service by using products obtained at the time of developing other services being currently provided or data supplied by other services being currently provided. In this manner, a target to be matched by the data exchange function is not limited to a service in operation and may include a service under development.

The service Z1 is provided by a program executed by an external service server 23Z1. In addition, the service Z2 is provided by a program executed by an external service server 23Z2. The services Z1 and Z2 can be provided without using a problem and solution conversion function by the AP program of the conversion unit 4, which is different from the services X1, X2, and Y1. That is, it can be said that the services Z1 and Z2 are services provided without using the quantum-related computer. In this manner, the service that performs data exchange is not limited to the service provided using the quantum-related computer.

The matching unit 201 refers to the registered service entries and searches for a combination of services capable of data exchange. The matching unit 201 determines whether data exchange between services can be performed based on the content of the field of the service entry. For example, a combination of services whose conditions for data exchange are compatible (match) may be determined to be capable of data exchange. For example, when the data reception flag in (b) of a certain service is "TRUE", the matching unit 201 searches for another service that can supply necessary data based on the reception data information in (d). In addition, when the data supply flag in (c) of a certain service is "TRUE", the matching unit 201 searches for another service that requires data to be generated based on the supply data information in (e).

When the service entry includes the matching avoidance information in (i), a combination of services satisfying a condition designated in the corresponding field may be excluded from matching. In addition, when conditions for considerations are included in the reception data information in (d) and the supply data information in (e) of the service entry, cooperation between services may be established when the conditions for the considerations match.

The processing rule generation unit 202 generates a rule (referred to as a data processing rule) for processing data supplied from each service. The data processing rule is generated based on a content and a format of data to be supplied and a content and a format of data required by a service that receives the data. For example, when there is an unnecessary data item for a service that receives data from another service at the time of exchanging data, a rule for deleting the unnecessary data item is generated. In addition, there is a case where it is difficult to find a service that can supply data including all of data items required by a certain service. In such a case, the processing rule generation unit 202 generates a rule for combining data items of pieces of data supplied from a plurality of services. The data processing rule is stored in the storage unit 8 of the information processing device 1, for example. However, the data processing rule may be stored in another place.

Note that the processing rule generation unit 202 does not necessarily generate the data processing rule when data supplied from a service can be passed to another service without being processed at the time of exchanging data. In addition, the information processing device 1 does not necessarily include the processing rule generation unit 202. For example, the information processing device 1 does not necessarily generate the data processing rule, and data conversion may be performed based on a data processing rule designated by the user or an external information processing system.

Note that, when a plurality of services require the same combination of data items, the plurality of services may be supplied with data generated by the same service or data generated from the same combination of services. That is, a data exchange path (referred to as a data path) may be formed between one-to-many or many-to-many services without being limited to the one-to-one service in the cooperation between services. The matching unit 201 generates a service group based on a combination of services that can cooperate. The service group includes at least two services. As the service group is generated, a data path of data exchange between services is determined. The service group may include information specifying a service that provides data and a service that receives data, and a data processing rule. Data of the service group is stored in the storage unit 8 of the information processing device 1, for example. However, a place where the service group is stored is not particularly limited.

Note that the user may operate the management terminal 22AD to define the service group. In this case, the user may create the service group regardless of the content of the field of the service entry.

The cooperation execution unit 220 implements data exchange between services included in each service group according to a data path and a data processing rule specified by each service group. For example, three service groups 221, 222, and 223 are set in the cooperation execution unit 220 of FIG. 25. The service group includes, for example, at least one service (data supply service) that supplies data and at least one service (data reception service) that receives data. The service group may further include a data processing rule, that is. a procedure for converting supply data of the data supply service into reception data of the data reception service.

For example, the service group 221 includes data supply services X1 and X2 and a data reception service Y1. According to information of the service group 221, the cooperation execution unit 220 operates as follows, for example. First, the cooperation execution unit 220 acquires data supplied from the service X1 via the AP program 43X1. In addition, the cooperation execution unit 220 acquires data supplied from the service X2 via the AP program 43X2. Next, in the cooperation execution unit 220, the data supplied from the service X1 and the data supplied from the service X2 are converted according to a data processing rule of the service group 221. Then, the converted data is provided to the service Y1 via the AP program 43Y1.

For example, a case is assumed in which the service X1 is a car navigation service for an area A, the service X2 is a car navigation service for an area B, and the service Y1 is a digital signage service provided in the area A and the area B. In this case, data exchange according to a data path specified by the service group 221 described above is likely to be useful.

For example, the service group 222 includes a data supply service Y1 and a data reception service Z1. According to information of the service group 222, for example, the cooperation execution unit 220 acquires data supplied from the service Y1 via the AP program 43Y1. In the cooperation execution unit 220, the data supplied from the service Y1 is converted according to a data processing rule of the service group 222. The converted data is provided to the service Z1 executed by the external service server 23Z1.

For example, in a case where the service Y1 is a genome analysis service and the service Z1 is a disease diagnosis service or a pharmaceutical development support service, data exchange according to a data path specified by the service group 222 described above is likely to be useful.

For example, the service group 223 includes a data supply service Z2 and a data reception service Y2. According to information of the service group 223, for example, the cooperation execution unit 220 acquires data supplied from the service Z2 executed by the external service server 23Z2. In the cooperation execution unit 220, the data supplied from the service Z2 is converted according to a data processing rule of the service group 223. The converted data is passed to the development tool 43Y2 used for development of the service Y2.

For example, in a case where the service Z2 is a stock price data distribution service in operation and the service Y2 is a portfolio optimization service under development, it is possible to test and verify a program under trial using the data provided to the development tool 43Y2. When a service similar to the service Y2 has been already provided, it is possible to divert a product and reduce the number of development steps. Note that the service Z2 may be a price data providing service of a financial asset or an optimization service of a sub-financial portfolio having a smaller scale constituting a financial portfolio.

The service groups 221, 222, and 223 described above are merely examples for the description. Therefore, a service as a target of data exchange and or a data path may be different from these. Specific examples of the service and data exchange will be described later. In addition, a data path and a data processing rule between services may be determined by a method different from the above.

The result calculation unit 230 obtains a result value of data exchange between services. The result calculation unit 230 may obtain a result value based on time. For example, a period elapsed from the start of data exchange between services may be measured. In addition, the result calculation unit 230 may obtain a result value based on the amount of data. For example, a size of data supplied from a certain service to another service or the number of pieces of data may be measured. In addition, a size of a certain service received from another service or the number of pieces of data may be measured. Note that the information processing device 1 does not necessarily include the result calculation unit 230.

Note that a consideration based on the result value obtained by the result calculation unit 230 can be calculated when the pricing information in (j) is included in the service entry. The consideration may be calculated by the result calculation unit 230 of the information processing system 10. In addition, a consideration regarding data exchange may be calculated together with billing or/and settlement of the consideration in an external system, such as an Internet banking system or a system of a financial institution.

Figure 26:
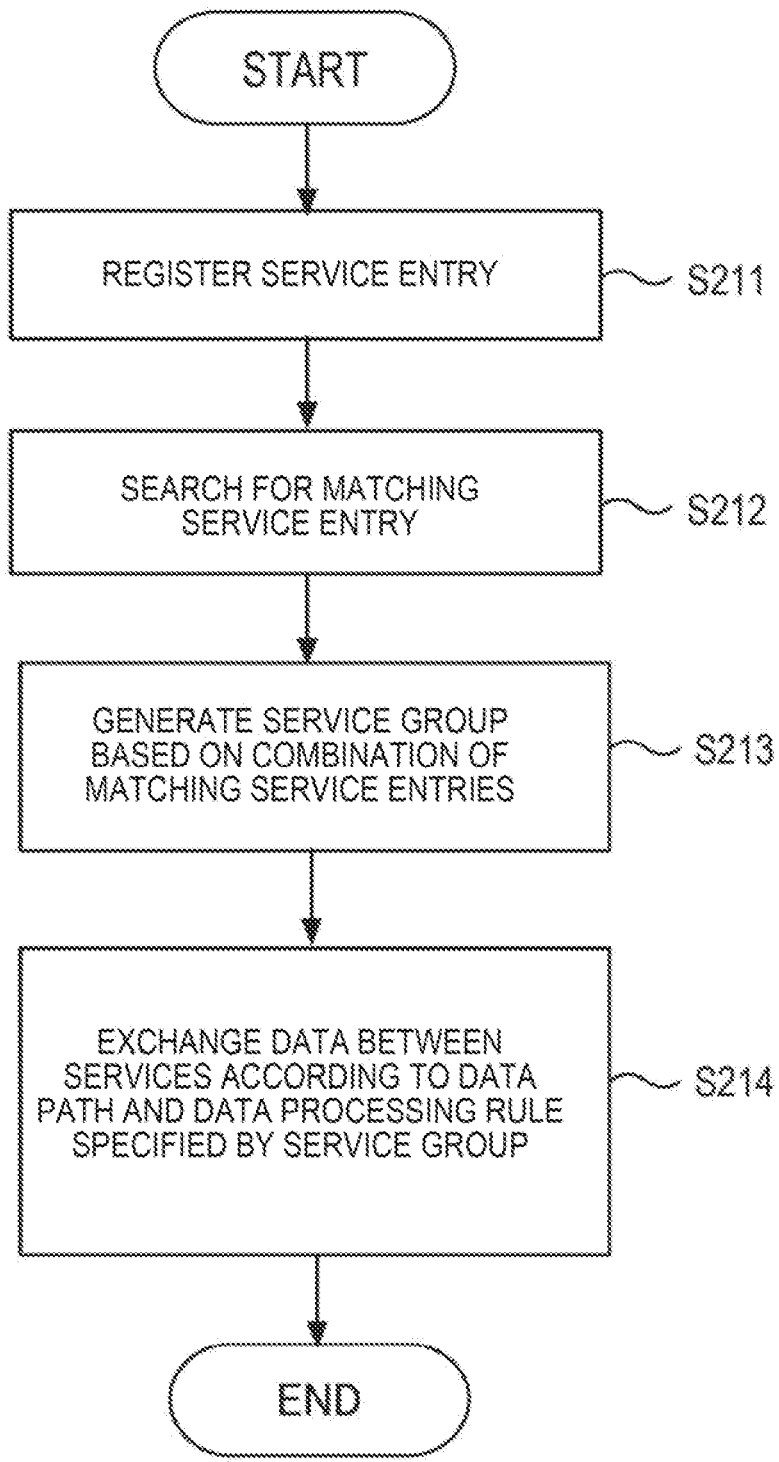
FIG. 26 is a flowchart illustrating an example of processing executed in cooperation between services.

FIG. 26 is a flowchart illustrating an example of processing executed in cooperation between services. Hereinafter, the processing will be described with reference to the flowchart of FIG. 26.

First, the service registration unit 210 registers a service entry (step S211). Next, the matching unit 201 searches for a matching service entry (step S212). Then, the matching unit 201 generates a service group based on a combination of matching service entries (step S213). Next, data is exchanged between the services according to a data path and a data processing rule specified by the service group (step S214).

Hereinafter, the configuration example of the information processing device 1 will be summarized with reference to FIG. 25. The information processing device 1 realizes cooperation between a plurality of services including at least one service using the quantum-related computer. The plurality of services that cooperate may include at least one service that does not use the quantum-related computer. The information processing device 1 includes the conversion unit 4 and the service cooperation unit 200. The conversion unit 4 executes at least one application program that provides at least one service. The service cooperation unit 200 performs data exchange between the plurality of services.

Each application program includes at least one conversion program and at least one inverse conversion program. The conversion program converts a problem, which is a target to be solved by the service, into a data format that can be input to the quantum-related computer. The inverse conversion program converts a solution of the quantum-related computer calculated for the problem into a solution to the problem. The service cooperation unit 200 may set a data path including at least one data supply service that supplies data and at least one data reception service that receives data, and perform data exchange between the data supply service and the data reception service according to the data path.

The information processing device 1 may include the development unit 3 (for example, FIG. 21 or FIG. 22). The development unit 3 executes at least one development tool that supports development of at least one service. The service cooperation unit 200 may perform data exchange between at least one data supply service and at least one development tool by setting a data path including at least one data supply service and at least one service developed using the development tool.

The service cooperation unit 200 may set the data path based on at least any of a content or a format of data that can be supplied by a service, a content or a format of data that can be received by a service, a service industry, a service area, a service scale, and a consideration for data exchange. In addition, the service cooperation unit 200 may process data supplied from at least one data supply service according to a predetermined rule, and then, pass the processed data to at least one data reception service.

The information processing device 1 may include the result calculation unit 230 that obtains a result value of data exchange between the plurality of services. The result value may include at least any of a period elapsed from the start of data exchange, a size of data, and the number of data. In addition, the result calculation unit 230 may calculate a consideration for data exchange between the plurality of services based on the result value.

Hereinafter, an application example of the information processing system according to the present embodiment will be described. First, a specific example of cooperation between services will be described.

Figure 27:
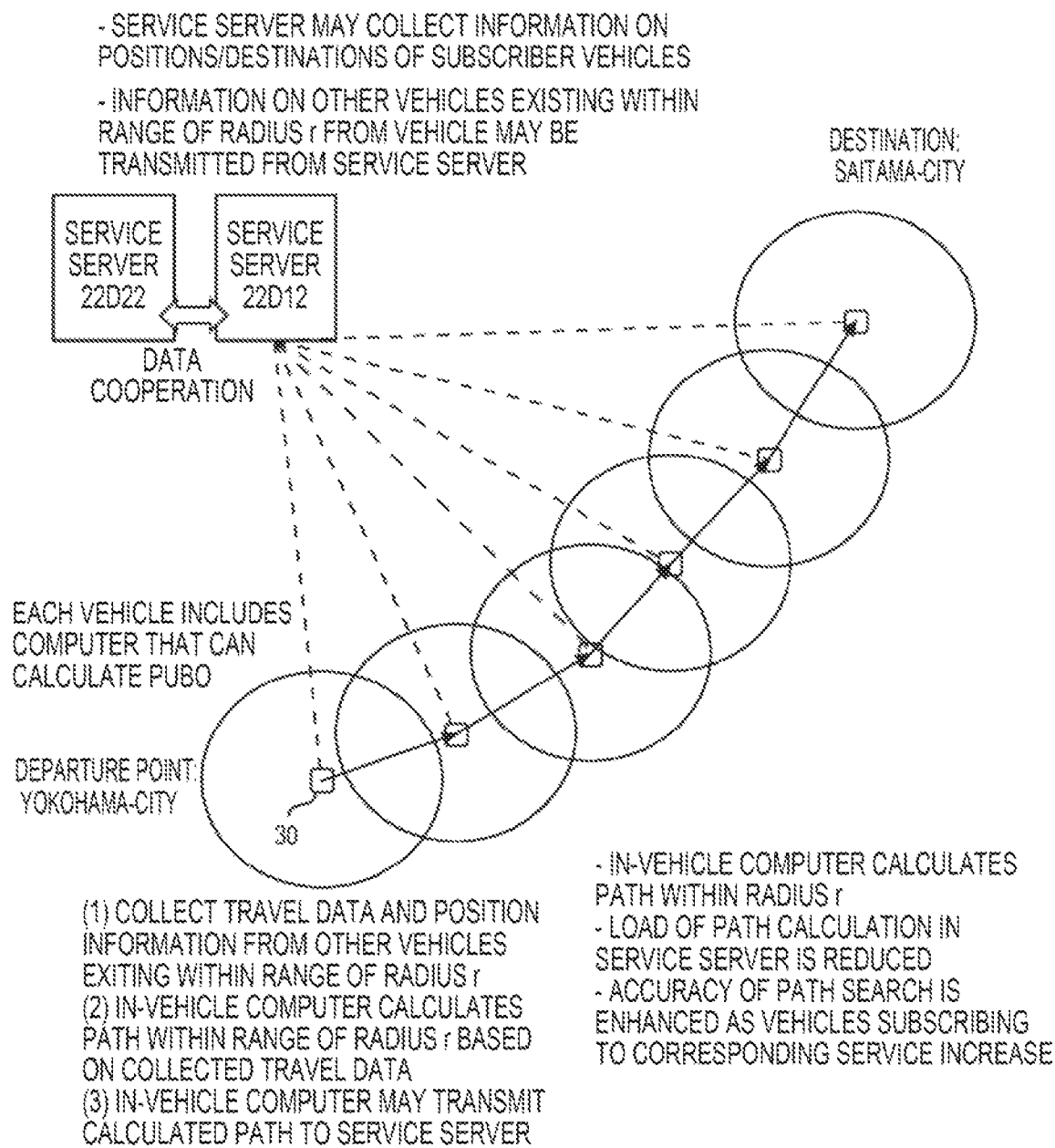
FIG. 27 is a diagram illustrating an example of a car navigation service.

FIG. 27 illustrates an example of a car navigation service. For example, a case is considered in which a path for an automobile from Yokohama-city (an example of a departure point) to Saitama-city (an example of a destination) is searched for. A travel distance between Yokohama-city and Saitama-city is about 60 km to 80 km. For this reason, a driver needs to drive for a long time of one hour or more. In addition, a large-scale urban area extends between Yokohama-city and Saitama-city, and there may be an extremely large number of travel path choices. Further, an optimal path varies greatly depending on the date and time and a condition since a road situation varies in real time. In such a case, even if a computer has once searched a path with the minimum required time, the road situation changes during traveling of the driver so that the required time for the searched path may increase. In addition, in the case where the distance between the departure point and the destination is long and the urban area extends between the departure point and the destination as in the example of FIG. 27, the amount of calculation required for searching for the optimal path becomes extremely large.

Therefore, the entire travel path between the departure point and the destination is not determined by one search in the car navigation service of FIG. 27. That is, a process of searching for an optimal travel path for the next section is repeatedly executed whenever traveling a partial section of the entire travel path. In addition, a path search is performed using calculation resources of computers mounted on a plurality of vehicles 30, respectively, using the car navigation service in order to avoid concentration of path search processes of the plurality of vehicles using the same service on a specific computer (for example, a service server).

That is, each of the vehicles 30 using the car navigation service of FIG. 27 is equipped with the conversion unit 4 (constituent element executing the application program) and the quantum-related computer or the PUBO solver illustrated in FIG. 21, 22, or 25. In this manner, the conversion unit 4 that executes the application program corresponding to the service and the quantum-related computer or the PUBO solver may be distributed and arranged in a plurality of places.

In addition, the plurality of vehicles 30 can transmit and receive data (for example, information on positions, speeds, and paths) to and from each other, and use data received from other vehicles for path calculation as will be described later. It can be said that a data transmission/reception function (which is provided by a wireless communication device 30W to be described later, for example) corresponds to the service cooperation unit 200 illustrated in FIG. 21, 22, or 25. The plurality of vehicles 30 may directly perform data communication with each other. In addition, the plurality of vehicles 30 may perform data communication via a service server 22C12. When the data communication is performed between the plurality of vehicles 30 via the service server 22C12, it can be said that the service server 22C12 corresponds to the service cooperation unit 200. In this manner, the cooperation between services may be performed between services of the same type (between the car navigation services used by the respective vehicles 30 in the example of FIG. 27) without being not limited to different types of services.

As described above, the information processing device 1 illustrated in FIG. 21, 22, or 25 may be realized by the plurality of computers arranged apart from each other. In this case, the plurality of computers are not limited to computers managed by a business operator that provides a service, and may include computers used by service users such as the vehicles 30 in FIG. 27.

For example, it is assumed that the driver of the vehicle 30 desires to travel between Yokohama-city and Saitama-city using a path with a short required time. For this reason, the path with the minimum required time is the optimal path in the example of FIG. 27. However, the path with the minimum required time is merely an example of the optimal path. For example, a path with the minimum travel distance, a path with the minimum running cost, or a path satisfying a plurality of conditions may be the optimal path.

Figure 28:
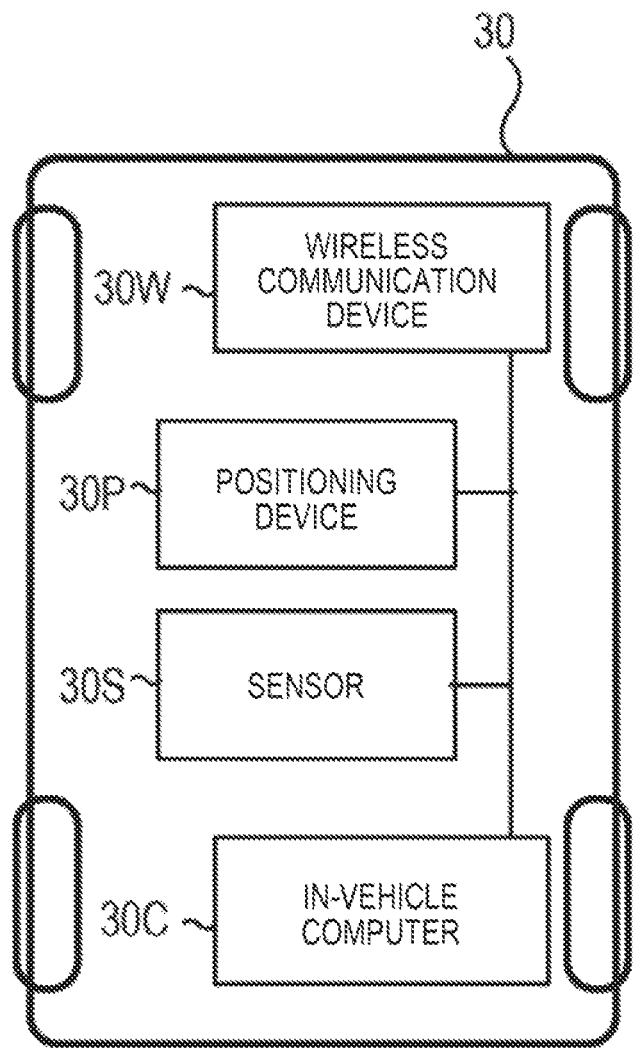
FIG. 28 is a diagram illustrating a configuration example of a vehicle that subscribes to the car navigation service.

FIG. 28 illustrates a configuration example of the vehicle 30 subscribing to the car navigation service. The vehicle 30 is equipped with an in-vehicle computer 30C, a wireless communication device 30W, a sensor 30S, and a positioning device 30P. The in-vehicle computer 30C is a computer (PUBO solver) capable of solving the polynomial unconstrained binary optimization (PUBO). The in-vehicle computer 30C may be, for example, a Neumann computer that executes a program, or may be a combination of a Neumann computer and a hardware circuit such as an FPGA, an ASIC, and a GPU. In addition, the in-vehicle computer 30C may be another type of computer. For example, the in-vehicle computer 30C may be a quantum-related computer.

The wireless communication device 30W is electrically connected to the in-vehicle computer 30C. The wireless communication device 30W realizes data communication with another wireless communication device. The wireless communication device 30W can use various mobile communication standards, but types of the standards to be used are not particularly limited. The in-vehicle computer 30C can perform data communication with an in-vehicle computer mounted on another vehicle or the service server 22C12 via the wireless communication device 30W.

The sensor 30S measures data (travel data) regarding a travel situation of the vehicle 30. Examples of the travel data include time-series speed data, an average speed within a certain period, the number of times of operating a brake, the number of times of depression of an accelerator, an image around the vehicle 30, or a combination thereof. However, a content of the travel data is not particularly limited. The positioning device 30P measures a position where the vehicle 30 is traveling. The positioning device 30P may be a receiver of a satellite positioning system (for example, a GPS). However, the positioning device 30P may measure the position where the vehicle 30 is traveling by another positioning system. The travel data measured by the sensor 30S and position information measured by the positioning device 30P are transmitted to an in-vehicle computer mounted on another vehicle via the wireless communication device 30W. The position information of the vehicle 30 measured by the positioning device 30P may be transmitted to the service server 22C12. As a result, the service server 22C12 can obtain the information on the positions of the respective vehicles subscribing to the car navigation service.

First, the in-vehicle computer 30C collects the travel data and the position information from other vehicles within a range of a radius r from the vehicle 30. As the radius r, for example, a value, such as 5 km and 10 km, can be used. However, any value may be used as the radius r. Then, the in-vehicle computer 30C calculates a path within the range of the radius r based on the collected travel data and position information. For example, the in-vehicle computer 30C can identify a road on which each vehicle is traveling by combining the position information and road data. Next, the in-vehicle computer 30C generates a weighted graph based on information on roads on which the other vehicles are traveling and the travel data. Then, the in-vehicle computer 30C can obtain a path by solving a shortest path problem in the weighted graph. However, such a calculation technique is merely an example. Therefore, a technique different from this may be used to calculate a path.

Note that the in-vehicle computer 30C may transmit a calculated path to the service server 22C12. In this case, when the vehicle 30 has traveled to the vicinity of the end of a previously calculated path, the in-vehicle computer 30C notifies the service server 22C12 of execution of calculation of the next path together with current position information. The service server 22C12 that has received the notification transmits a command to request transmission of position information and travel data to the other vehicles within the range of the radius r from the vehicle 30. The in-vehicle computer 30C that has received the position information and the travel data from the respective vehicles can calculate a path within the range of the radius r again.

The vehicle 30 can obtain the path from the departure point to the destination by repeatedly executing the above-described processing. In the service of FIG. 27, a part of the path from the departure point to the destination is calculated in each iteration. Since the position information and the travel data of the other vehicles are collected immediately before a path within the range of the radius r is calculated in each iteration, it is possible to minimize deterioration in quality of a path search result due to the change in the road situation. In addition, the accuracy of the path search can be improved as the number of vehicles subscribing to the service increases in the service of FIG. 27.

Here, the example of the car navigation service to which the vehicle driven by the driver subscribes has been described. However, the vehicle subscribing to the car navigation service is not necessarily the vehicle driven by the driver. For example, a vehicle that performs automatic driving may subscribe to the car navigation service. Note that FIG. 27 illustrates not only the service server 22C12 but also another service server 22D22. The service server 22D22 executes processing related to a service cooperating with the car navigation service of FIG. 27.

Figure 29:
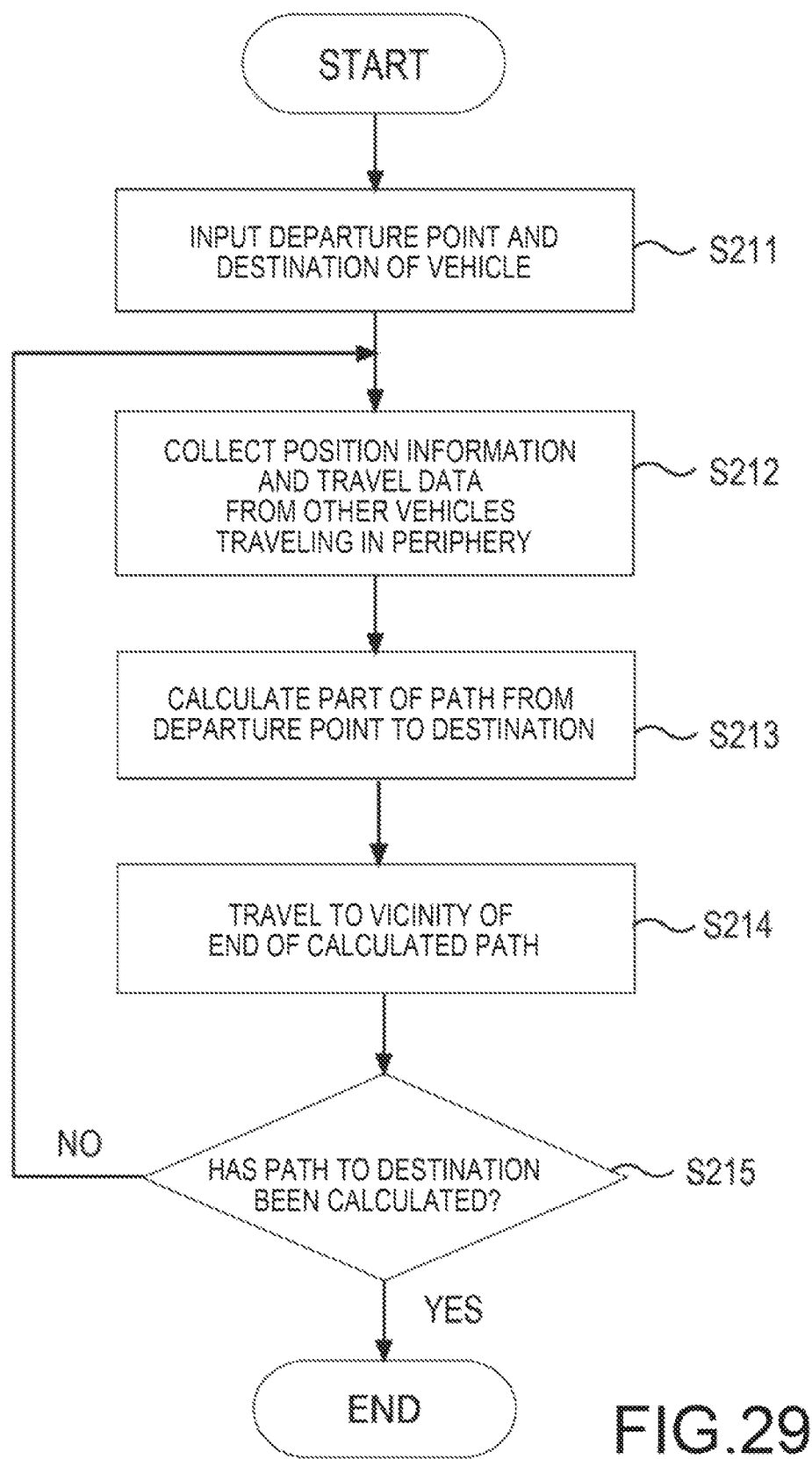
FIG. 29 is a flowchart illustrating an example of processing executed in the car navigation service.

FIG. 29 is a flowchart illustrating an example of processing executed in the car navigation service. Hereinafter, the processing will be described with reference to the flowchart of FIG. 29.

First, a departure point and a destination of a vehicle are input to the car navigation service (step S211). For example, a driver of the vehicle inputs the departure point and the destination via an interface of the in-vehicle computer 30C. The departure point and the destination can be input via, for example, a touch panel or a voice recognition device. However, a method for inputting the departure point and the destination is not particularly limited. Then, the in-vehicle computer 30C of the vehicle collects position information and travel data from other vehicles traveling in the periphery (step S212). In the example of FIG. 27, the position information and the travel data are collected from vehicles traveling within the range of the radius r from a vehicle searching for a path. However, the range of the radius r from the vehicle is merely an example of a method for identifying the other vehicles traveling around the vehicle. For example, position information and travel data may be collected from a vehicle from which a beacon signal is transmitted with strength equal to or greater than a threshold.

Next, the in-vehicle computer 30C of the vehicle calculates a part of the path from the departure point to the destination (step S213). In the example of FIG. 27, the path within the range of the radius r is calculated, but a range to be subjected to the path calculation may be different from this. Then, the vehicle travels to the vicinity of the end of the calculated path (step S214). When the vehicle travels to the vicinity of the end of the calculated path, the in-vehicle computer 30C determines whether the path to the destination has been calculated (step S215). When the path to the destination has been calculated (YES in step S215), the processing of the flowchart ends. When the path to the destination has not been calculated (NO in step S215), the processing returns to step S212, and the in-vehicle computer 30C of the vehicle collects position information and travel data from other vehicles traveling in the periphery.

That is, in the car navigation service, the quantum-related computer mounted on the vehicle may calculate a part of the path from the departure point to the destination based on the position information and the travel data collected from other vehicles traveling in the periphery of the vehicle.

Another specific example of the cooperation between services will be described later.

Figure 30:
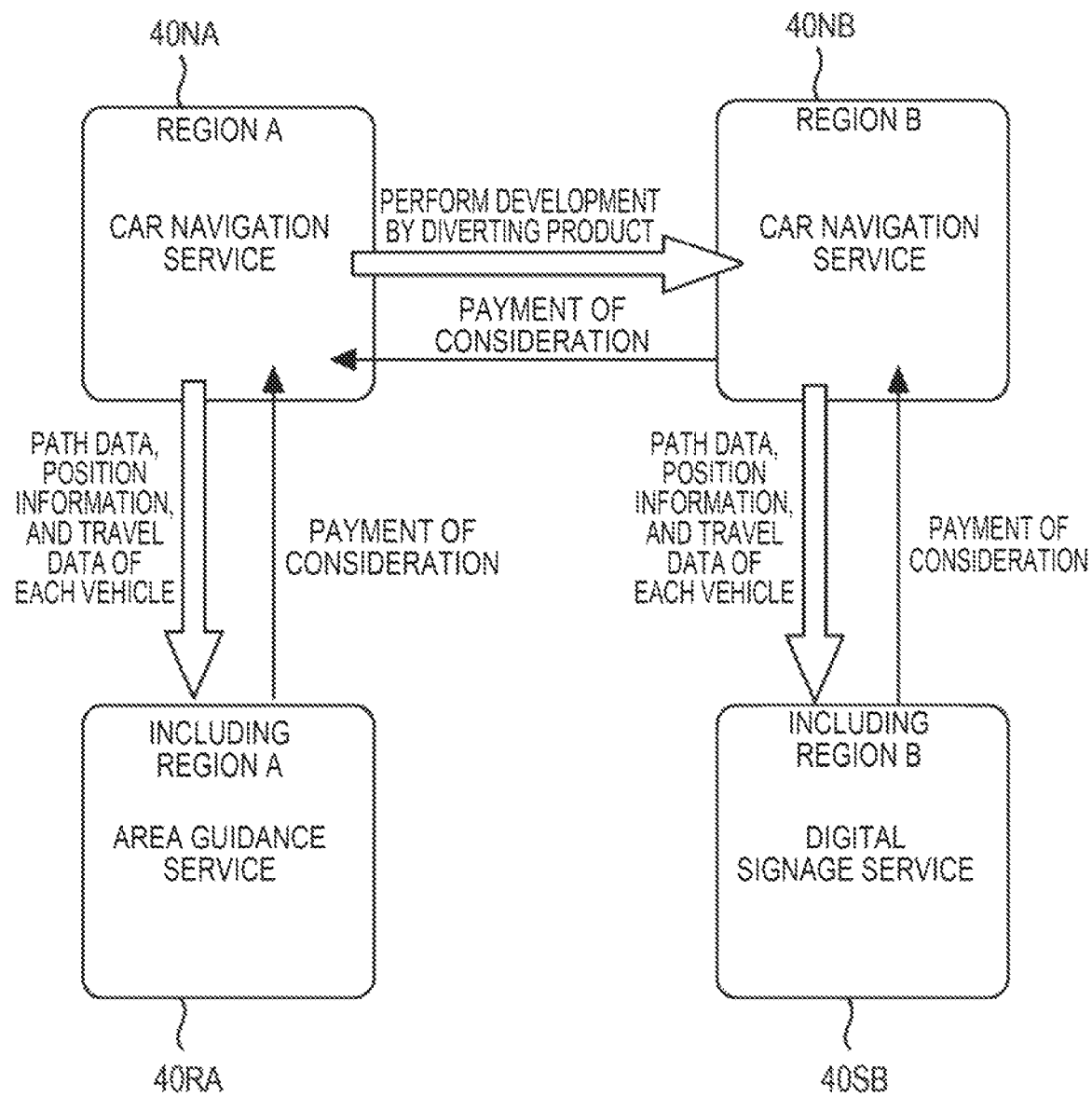
FIG. 30 is a diagram illustrating an example of cooperation between services including the car navigation service.

In FIG. 27 described above, the example of the cooperation between services of the same type (between the vehicles 30 using the car navigation service) has been mainly illustrated. FIG. 30 illustrates an example of cooperation performed between services provided in different areas. FIG. 30 illustrates services 40NA, 40NB, 40RA, and 40SB. The service 40NA is, for example, a car navigation service for a region A. The service 40NB is, for example, a car navigation service for a region B. The service 40RA is, for example, an area guidance service including the region A. The service 40SB is, for example, a digital signage service including the region B. A thick arrow between the respective services indicates an example of a data path. On the other hand, a thin arrow indicates an example of payment of a consideration.

The service 40NB is the same car navigation service as the service 40NA although a target area is different. Therefore, a business operator implementing the service 40NB can divert a product of development of the service 40NA (thick arrow) and perform efficient development work. Examples of the development product include a source code, a specification, a conversion program, an inverse conversion program, a problem model, and a control script, but another data may be diverted. The business operator implementing the service 40NB may pay a consideration for provision of the development product to a business operator who operates the service 40NA (thin arrow). Since such data exchange is performed, it is possible to reduce man-hours required for development of the service 40NB.

The service 40RA can receive path data, position information, and travel data of each vehicle from the service 40NA (thick arrow). A business operator who operates the service 40RA may pay a consideration for the data provision to the business operator who operates the service 40NA (thin arrow). The business operator who operates the service 40RA can improve the quality of the area guidance service by receiving the data provision. For example, it is possible to preferentially guide a restaurant, a shopping center, or the like in an area where peripheral roads are not congested. As a result, a driver who subscribes to the area guidance service can conduct affairs such as meals and shopping without being caught in excessive traffic congestion.

The service 40SB can receive path data, position information, and travel data of each vehicle from the service 40NB (thick arrow). A business operator who operates the service 40SB may pay a consideration for the data provision to the business operator who provides the service 40NB (thin arrow). The business operator who operates the service 40SB can determine a content to be displayed on digital signages scattered in the region B based on the density of vehicles traveling on each road in the region B and attributes (for example, age) of drivers of the vehicles. For example, it is possible to display a plurality of advertisements on digital signages in an area where the density of traveling vehicles is high, and to reduce the number of advertisements to be displayed on digital signages in an area where the density of traveling vehicles is low.

Hereinafter, an example in which a plurality of services belonging to a plurality of fields cooperate will be described.

Figure 31:
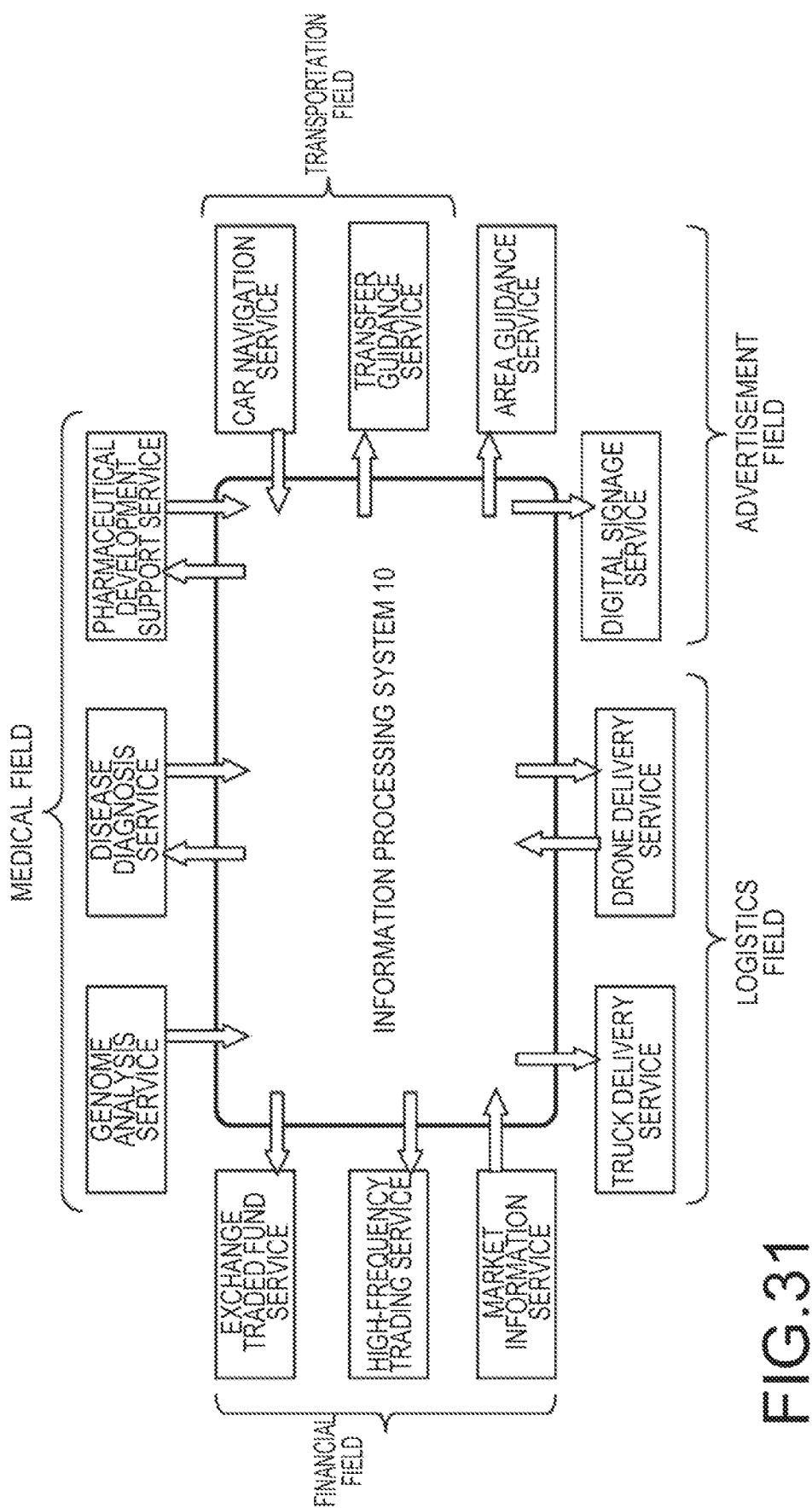
FIG. 31 is a diagram illustrating examples of cooperative services.

FIG. 31 illustrates examples of cooperating services. FIG. 31 illustrates, as the examples of the cooperating services, a genome analysis service, a disease diagnosis service, a pharmaceutical development support service, a car navigation service, a transfer guidance service, an area guidance service, a digital signage service, a drone delivery service, a truck delivery service, a market information service, a high-frequency trading service, and an exchange traded fund service. The respective services illustrated in FIG. 31 can form arbitrary data paths without being limited to the illustrated arrows. That is, a service group including a combination of arbitrary services can be created in the information processing system 10 of FIG. 31. For example, a certain service may be simultaneously included in a plurality of service groups.

Among them, the genome analysis service, the disease diagnosis service, and the pharmaceutical development support service belong to a medical field. In addition, the car navigation service and the transfer guidance service belong to a transportation field. The area guidance service and the digital signage service belong to an advertisement field. The drone delivery service and the truck delivery service belong to a logistics field. The market information service, the high-frequency trading service, and the exchange traded fund service belong to a financial field. In this manner, various services belonging to the plurality of fields may cooperate.

Note that the services illustrated in FIG. 31 are merely examples of services that can cooperate. All the services in FIG. 31 do not necessarily cooperate, and services different from those in FIG. 31 may cooperate. In addition, a service classification method illustrated in FIG. 31 is merely an example. Therefore, services may be classified by a method different from this. For example, one service may be simultaneously classified into a plurality of services.

When the information processing system according to the present embodiment is used, development of a program corresponding to each field is facilitated, and utilization of the quantum-related computer is promoted. In addition, it is possible to perform development of a program, construction of a service, and operation of the service while reflecting the dependency relationship and influence relationship between systems in the real world by using the information processing system according to the present embodiment. This contributes to improvement in quality and performance of services using the quantum-related computer and improvement in user convenience.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing device that supports obtaining a solution to a problem using a quantum-related computer, the information processing device comprising a processor configured to:

execute a modeling tool, which enables a user to describe at least one problem model for a first problem, and a programming tool which enables the user to design a conversion program for converting the first problem into a data format that is inputtable to the quantum-related computer using the at least one problem model, and enables the user to create an inverse conversion program for inversely converting a solution of the quantum-related computer calculated for the first problem into a solution to the first problem; and execute the conversion program for an input second problem and convert the second problem into the data format;

input the second problem converted into the data format to the quantum-related computer and acquire a solution of the quantum-related computer; and execute the inverse conversion program with the solution of the quantum-related computer calculated for the second problem as an input and output a solution converted by the inverse conversion program as a solution to the second problem, wherein the modeling tool executed by the processor enables the user to describe a plurality of the problem models corresponding to different levels for the first problem in stages, and the programming tool executed by the processor enables the user to design the conversion program based on the plurality of problem models corresponding to the different levels, the modeling tool executed by the processor includes a high-level modeling tool, which enables the user to describe the problem model at a high level in a high-level expression format, and a low-level modeling tool which enables the user to describe the problem model at a low level in a low-level expression format, and the problem model includes an expression indicating a target of the problem model, a function of the target, a variable to be input to the function, a result output from the function with the input of the variable, and a condition to be applied to the result.

2. The information processing device according to claim 1, wherein
the high-level expression format includes a natural language, a graph, a mathematical formula, or a combination of the natural language, the graph, and the mathematical formula.

3. The information processing device according to claim 1, wherein
the low-level expression format includes an Ising model or a Hamiltonian.

4. The information processing device according to claim 1, wherein
the modeling tool executed by the processor includes a middle-level modeling tool that enables the user to describe the problem model at a middle level in a middle-level expression format.

5. The information processing device according to claim 4, wherein
the middle-level expression format includes a mathematical formula, a graph, a table, or a combination of the mathematical formula, the graph, and the table which mathematically represents one or more types of combinatorial optimization problems.

6. The information processing device according to claim 4, wherein
the middle-level modeling tool enables the user to divide and describe the problem model at the middle level into a plurality of sub-problem models.

7. The information processing device according to claim 1, wherein
the processor enables the user to create the conversion program and the inverse conversion program for each type of the quantum-related computer.

8. The information processing device according to claim 7, wherein
the processor selects the conversion program and the inverse conversion program to be executed based on a type of the quantum-related computer to be used for calculation.

9. The information processing device according to claim 1, wherein
the processor enables the user to create a high-level sub-conversion program for converting the first problem into a high-level model including an objective function and a high-level sub-inverse conversion program for converting a solution of the high-level model into the solution to the first problem.

10. The information processing device according to claim 1, comprising
a storage unit that stores one or more of the conversion programs or one or more of the inverse conversion programs,
wherein the processor presents the user with at least one of the conversion programs or at least one of the inverse conversion programs read from the storage unit to support the user in developing the conversion program or the inverse conversion program for the first problem.

11. The information processing device according to claim 1, comprising
a storage unit that stores one or more of the conversion programs or one or more of the inverse conversion programs,
wherein the processor sets whether a third party is allowed to reuse the conversion program or the inverse conversion program.

12. The information processing device according to claim 1, comprising
a storage unit that stores one or more of the conversion programs or one or more of the inverse conversion programs,
wherein the processor sets an access level of the conversion program or the inverse conversion program in accordance with an attribute of a third party.

13. The information processing device according to claim 1, comprising
a storage unit that stores one or more of the conversion programs or one or more of the inverse conversion programs,
wherein the processor sets a consideration for use of the conversion program or the inverse conversion program by a third party.

14. The information processing device according to claim 1, wherein
the processor presents the user with at least one of the problem models to support the user in describing the problem model for the first problem.

15. The information processing device according to claim 1, wherein
the processor presents the user with at least one of the problem models based on similarity between the second problem and the first problem.

16. The information processing device according to claim 1, wherein
the processor executes a search based on an input of the user and presents the user with at least one of the problem models.

17. The information processing device according to claim 1, wherein
the processor presents the user with a template or a sample of the problem model to support the user in describing the problem model for the first problem.

18. The information processing device according to claim 1, wherein
the processor executes a program for automatically performing at least a part of modeling work of the problem model, and supports the user in describing the problem model for the first problem.

19. The information processing device according to claim 1, wherein
the problem model includes an expression indicating a target of the problem model, a function of the target, a variable to be input to the function, a result output from the function with the input of the variable, and a condition to be applied to the result.

20. The information processing device according to claim 1, wherein
the processor presents the user with a template of a script including a control condition of the quantum-related computer by the processor to support the user in describing the script.

21. The information processing device according to claim 1, comprising
a storage unit that stores a script including a control condition of the quantum-related computer by the processor and a program for generating the script,
wherein the processor executes the program and automatically generates the script based on at least any of a parameter input by the user or an option selected by the user.

22. The information processing device according to claim 1, wherein
the quantum-related computer is at least any computer among a computer using a quantum annealing phenomenon, a computer emulating the quantum annealing phenomenon, a gate quantum computer, and a computer executing a metaheuristic algorithm.

23. The information processing device according to claim 1, wherein
the first problem and the second problem are optimization of a financial portfolio.

24. The information processing device according to claim 1, wherein
the first problem and the second problem are determination of a base sequence of a DNA strand based on base sequences of a plurality of DNA fragments cleaved from the DNA strand.

25. The information processing device according to claim 1, wherein
the processor causes the quantum-related computer to perform a solution-obtaining operation until a solution satisfying a condition set by the user is obtained.

26. The information processing device according to claim 1, wherein
the processor causes the quantum-related computer to stand by until a condition set by the user is satisfied.

27. The information processing device according to claim 1, wherein
the processor designates a setting of an execution-time option or a parameter of the conversion program or the inverse conversion program in at least some levels.

28. An information processing system comprising:
the information processing device according to claim 1; and
at least any quantum-related computer among a computer using a quantum annealing phenomenon, a computer emulating the quantum annealing phenomenon, a gate quantum computer, and a computer executing a metaheuristic algorithm, the quantum-related computer being connected to the information processing device.

29. The information processing system according to claim 28, comprising
a plurality of the quantum-related computers,
wherein the plurality of quantum-related computers execute at least a part of a solution-obtaining process for the second problem that is common.

30. The information processing system according to claim 29, wherein
the information processing device obtains a solution to the second problem based on the solution selected from at least any of solutions calculated by the plurality of quantum-related computers.

31. The information processing system according to claim 29, wherein
the information processing device controls at least any of parallelism, an execution order, and conditional branching of calculation processes performed by the plurality of quantum-related computers.

* * * * *